United States Patent
Jepsen

(10) Patent No.: US 10,451,876 B2
(45) Date of Patent: *Oct. 22, 2019

(54) ENHANCED VISUAL PERCEPTION THROUGH DISTANCE-BASED OCULAR PROJECTION

(71) Applicant: FACEBOOK TECHNOLOGIES, LLC, Menlo Park, CA (US)

(72) Inventor: Mary Lou Jepsen, Sausalito, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,796

(22) Filed: Mar. 9, 2016

(65) Prior Publication Data

US 2017/0039906 A1   Feb. 9, 2017

Related U.S. Application Data

(60) Provisional application No. 62/246,117, filed on Oct. 25, 2015, provisional application No. 62/200,481, filed on Aug. 3, 2015.

(51) Int. Cl.
*G02B 3/00*   (2006.01)
*G02B 5/18*   (2006.01)
(Continued)

(52) U.S. Cl.
CPC ....... *G02B 27/0172* (2013.01); *G02B 3/0056* (2013.01); *G02B 3/0062* (2013.01);
(Continued)

(58) Field of Classification Search
CPC ....................................................... G02F 1/29
See application file for complete search history.

(56) References Cited

U.S. PATENT DOCUMENTS 4,769,750 A   9/1988  Matsumoto et al.
5,016,282 A   5/1991  Tomono et al.
(Continued)

FOREIGN PATENT DOCUMENTS

JP          57207217 A      12/1982
WO     WO2013/144311 A1   10/2013

OTHER PUBLICATIONS

Jepsen, Office Action, U.S. Appl. No. 15/065,772, dated Jun. 29, 2017, 16 pgs.
(Continued)

*Primary Examiner* — Ryan A Lubit
(74) *Attorney, Agent, or Firm* — Morgan, Lewis & Bockius LLP

(57) ABSTRACT

A display device includes a two-dimensional array of tiles. Each tile includes a two-dimensional array of pixels and an electro-optic element of a two-dimensional array of electro-optic elements. The device includes one or more processors configured to: obtain an image of an object; activate at least a subset of the two-dimensional array of tiles for outputting a collective pattern of light that includes at least a portion of the image of the object; and activate at least a subset of the two-dimensional array of electro-optic elements for projecting the collective pattern of light. At least the subset of the two-dimensional array of electro-optic elements is configured to have a focal length, that is selected based on proximity of the object in a distance model, for projecting the collective pattern of light.

15 Claims, 36 Drawing Sheets

(51) Int. Cl.
*G02B 26/02* (2006.01)
*G02B 26/08* (2006.01)
*G02B 27/00* (2006.01)
*G02B 27/01* (2006.01)
*G02B 27/30* (2006.01)
*G02F 1/133* (2006.01)
*G02F 1/1333* (2006.01)
*G02F 1/29* (2006.01)
*G06F 3/01* (2006.01)
*G06T 19/00* (2011.01)
*G09G 3/00* (2006.01)
*G09G 3/34* (2006.01)
*G09G 3/36* (2006.01)
*G09G 5/00* (2006.01)
*G09G 5/10* (2006.01)

(52) U.S. Cl.
CPC .......... *G02B 5/1842* (2013.01); *G02B 26/02* (2013.01); *G02B 26/0875* (2013.01); *G02B 27/0093* (2013.01); *G02B 27/0101* (2013.01); *G02B 27/0179* (2013.01); *G02B 27/30* (2013.01); *G02F 1/13306* (2013.01); *G02F 1/13336* (2013.01); *G02F 1/29* (2013.01); *G06F 3/013* (2013.01); *G06T 19/006* (2013.01); *G09G 3/002* (2013.01); *G09G 3/3426* (2013.01); *G09G 3/36* (2013.01); *G09G 5/003* (2013.01); *G09G 5/10* (2013.01); *G02B 2027/014* (2013.01); *G02B 2027/015* (2013.01); *G02B 2027/0118* (2013.01); *G02B 2027/0123* (2013.01); *G02B 2027/0132* (2013.01); *G02B 2027/0147* (2013.01); *G02B 2027/0152* (2013.01); *G02B 2027/0178* (2013.01); *G02B 2027/0187* (2013.01); *G02F 2001/291* (2013.01); *G02F 2001/294* (2013.01); *G02F 2203/24* (2013.01); *G09G 3/003* (2013.01); *G09G 2320/028* (2013.01); *G09G 2340/0407* (2013.01); *G09G 2354/00* (2013.01)

(56) References Cited

U.S. PATENT DOCUMENTS

| | | | |
|---|---|---|---|
| 5,414,559 A | 5/1995 | Burghardt et al. | |
| 5,619,373 A | 4/1997 | Meyerhofer et al. | |
| 5,742,262 A | 4/1998 | Tabata et al. | |
| 5,748,375 A | 5/1998 | Yamana | |
| 5,758,940 A | 6/1998 | Ogino et al. | |
| 5,883,606 A | 3/1999 | Smoot | |
| 6,133,687 A | 10/2000 | Clarke | |
| 6,140,980 A | 10/2000 | Spitzer et al. | |
| 6,215,593 B1 | 4/2001 | Bruce | |
| 6,381,072 B1 | 4/2002 | Burger | |
| 7,573,640 B2 | 8/2009 | Nivon et al. | |
| 7,701,648 B2 | 4/2010 | Amano et al. | |
| 8,218,212 B2 | 7/2012 | Kroll et al. | |
| 8,611,004 B2 | 12/2013 | Newell | |
| 8,941,932 B2 | 1/2015 | Kamiyarma et al. | |
| 9,335,548 B1 | 5/2016 | Cakmakci et al. | |
| 9,810,909 B2 | 11/2017 | Kang et al. | |
| 2001/0043163 A1 | 11/2001 | Waldern et al. | |
| 2002/0033442 A1 | 3/2002 | Toko et al. | |
| 2002/0158813 A1 | 10/2002 | Kiyokawa et al. | |
| 2003/0025881 A1 | 2/2003 | Hwang | |
| 2004/0108971 A1 | 6/2004 | Waldern et al. | |
| 2004/0227703 A1 | 11/2004 | Lamvik et al. | |
| 2004/0252277 A1 | 12/2004 | Chmielewski, Jr. et al. | |
| 2005/0142303 A1 | 6/2005 | Ota et al. | |
| 2006/0050398 A1 | 3/2006 | Gurevich et al. | |
| 2006/0066785 A1 | 3/2006 | Moriya | |
| 2006/0103924 A1 | 5/2006 | Katz | |
| 2007/0035829 A1 | 2/2007 | Woodgate et al. | |
| 2007/0252074 A1 | 11/2007 | Ng | |
| 2008/0106489 A1 | 5/2008 | Brown et al. | |
| 2008/0239420 A1 | 10/2008 | McGrew | |
| 2008/0297898 A1 | 12/2008 | Martin | |
| 2009/0021716 A1 | 1/2009 | Wangler et al. | |
| 2009/0052838 A1* | 2/2009 | McDowall | G03B 13/02 385/18 |
| 2009/0128899 A1 | 5/2009 | Newell | |
| 2009/0296188 A1 | 12/2009 | Jain et al. | |
| 2010/0141905 A1 | 6/2010 | Burke | |
| 2011/0025955 A1* | 2/2011 | Bos | G02F 1/134309 349/95 |
| 2011/0057930 A1 | 3/2011 | Keller | |
| 2011/0069254 A1 | 3/2011 | Takama et al. | |
| 2011/0249452 A1 | 10/2011 | Chen et al. | |
| 2012/0075569 A1 | 3/2012 | Chang et al. | |
| 2012/0188467 A1 | 7/2012 | Escuti et al. | |
| 2012/0242615 A1 | 9/2012 | Teraguchi et al. | |
| 2013/0021226 A1* | 1/2013 | Bell | G02B 3/0006 345/8 |
| 2013/0038935 A1 | 2/2013 | Moussa et al. | |
| 2013/0107145 A1 | 5/2013 | Ueki et al. | |
| 2013/0114850 A1 | 5/2013 | Publicover et al. | |
| 2013/0187836 A1 | 7/2013 | Cheng et al. | |
| 2013/0214301 A1 | 8/2013 | Yamada et al. | |
| 2013/0218270 A1 | 8/2013 | Blanckaert et al. | |
| 2013/0234935 A1 | 9/2013 | Griffith | |
| 2013/0242555 A1 | 9/2013 | Mukawa | |
| 2013/0286053 A1 | 10/2013 | Fleck et al. | |
| 2013/0335795 A1 | 12/2013 | Song et al. | |
| 2014/0085865 A1 | 3/2014 | Yun et al. | |
| 2014/0118829 A1 | 5/2014 | Ma et al. | |
| 2014/0140653 A1 | 5/2014 | Brown et al. | |
| 2014/0168034 A1* | 6/2014 | Luebke | G02B 27/017 345/8 |
| 2014/0240342 A1 | 8/2014 | Xu et al. | |
| 2014/0267205 A1 | 9/2014 | Nestorovic | |
| 2014/0267958 A1 | 9/2014 | Sugita et al. | |
| 2014/0361957 A1 | 12/2014 | Hua et al. | |
| 2014/0375541 A1* | 12/2014 | Nister | G06F 3/013 345/156 |
| 2014/0375913 A1 | 12/2014 | Jen et al. | |
| 2015/0015814 A1* | 1/2015 | Qin | G02B 27/2214 349/13 |
| 2015/0049390 A1 | 2/2015 | Lanman et al. | |
| 2015/0077618 A1 | 3/2015 | Ueno | |
| 2015/0085259 A1 | 3/2015 | Schreiber et al. | |
| 2015/0091789 A1 | 4/2015 | Alzate | |
| 2015/0124315 A1 | 5/2015 | Sasahara | |
| 2015/0138451 A1 | 5/2015 | Amitai | |
| 2015/0173846 A1 | 6/2015 | Schneider | |
| 2015/0185699 A1 | 7/2015 | Yamamoto et al. | |
| 2015/0205014 A1 | 7/2015 | Akasaka | |
| 2015/0205132 A1 | 7/2015 | Osterhout | |
| 2015/0262424 A1 | 9/2015 | Tabaka et al. | |
| 2015/0287206 A1 | 10/2015 | Ebisawa | |
| 2015/0312558 A1* | 10/2015 | Miller | G02B 27/017 348/54 |
| 2015/0338660 A1 | 11/2015 | Mukawa | |
| 2016/0018645 A1 | 1/2016 | Haddick | |
| 2016/0033769 A1 | 2/2016 | Kang et al. | |
| 2016/0062121 A1 | 3/2016 | Border et al. | |
| 2016/0131918 A1* | 5/2016 | Chu | G02F 1/134309 359/316 |
| 2016/0147074 A1 | 5/2016 | Kobayashi et al. | |
| 2016/0191890 A1 | 6/2016 | Kawano et al. | |
| 2016/0259198 A1 | 9/2016 | Yi et al. | |
| 2016/0274365 A1 | 9/2016 | Bailey | |
| 2016/0314564 A1 | 10/2016 | Jones et al. | |
| 2016/0327798 A1 | 11/2016 | Xiao | |
| 2016/0349414 A1 | 12/2016 | Rudmann et al. | |
| 2017/0010473 A1 | 1/2017 | Ide | |
| 2017/0010488 A1 | 1/2017 | Klug et al. | |
| 2017/0018215 A1 | 1/2017 | Black et al. | |
| 2017/0019602 A1 | 1/2017 | Dopilka et al. | |
| 2017/0031435 A1 | 2/2017 | Raffle et al. | |
| 2017/0038589 A1 | 2/2017 | Jepsen | |

(56) References Cited

U.S. PATENT DOCUMENTS

| | | |
|---|---|---|
| 2017/0038590 A1 | 2/2017 | Jepsen |
| 2017/0038591 A1 | 2/2017 | Jepsen |
| 2017/0038834 A1 | 2/2017 | Wilson et al. |
| 2017/0038836 A1 | 2/2017 | Jepsen et al. |
| 2017/0039904 A1 | 2/2017 | Jepsen |
| 2017/0039905 A1 | 2/2017 | Jepsen et al. |
| 2017/0039906 A1 | 2/2017 | Jepsen |
| 2017/0039907 A1 | 2/2017 | Jepsen |
| 2017/0039960 A1 | 2/2017 | Jepsen |
| 2017/0075421 A1 | 3/2017 | Na et al. |
| 2017/0091549 A1 | 3/2017 | Gustafsson et al. |
| 2017/0108697 A1 | 4/2017 | El-Ghoroury et al. |
| 2017/0139213 A1 | 5/2017 | Schmidtlin |
| 2017/0293148 A1 | 10/2017 | Park et al. |
| 2017/0336626 A1 | 11/2017 | Hayashi et al. |
| 2018/0046859 A1 | 2/2018 | Jarvenpaa |

OTHER PUBLICATIONS

Shi, Office Action, U.S. Appl. No. 15/347,684, dated Jun. 29, 2017, 13 pgs.

Jepsen, Notice of Allowance, U.S. Appl. No. 15/065,772, dated Jan. 29, 2018, 8 pgs.

Jepsen, Final Office Action, U.S. Appl. No. 15/065,772, dated Nov. 3, 2017, 16 pgs.

Jepsen, Office Action, U.S. Appl. No. 15/065,778, dated Oct. 27, 2017, 29 pgs.

Jepsen, Office Action, U.S. Appl. No. 15/065,780, dated Oct. 27, 2017, 20 pgs.

Jepsen, Office Action, U.S. Appl. No. 15/065,785, dated Oct. 27, 2017, 21 pgs.

Jepsen, Office Action, U.S. Appl. No. 15/065,790, dated Nov. 8, 2017, 24 pgs.

Shi, Final Office Action, U.S. Appl. No. 15/347,684, dated Nov. 6, 2017, 12 pgs.

Shi, Notice of Allowance, U.S. Appl. No. 15/347,684, dated Jan. 24, 2018, 5 pgs.

Schmidtlin, Office Action, U.S. Appl. No. 15/270,803, dated Nov. 29, 2017, 26 pgs.

Jepsen, Notice of Allowance, U.S. Appl. No. 15/065,778, dated Apr. 9, 2018, 12 pgs.

Jepsen, Final Office Action, U.S. Appl. No. 15/065,780, dated Mar. 28, 2018, 17 pgs.

Jepsen, Final Office Action, U.S. Appl. No. 15/065,785, dated Mar. 28, 2018, 17 pgs.

Jepsen, Office Action, U.S. Appl. No. 15/065,817, dated Mar. 29, 2018, 11 pgs.

Jepsen, Final Office Action, U.S. Appl. No. 15/065,790, dated Apr. 18, 2018, 17 pgs.

Shi, Office Action, U.S. Appl. No. 15/226,815, dated Apr. 5, 2018, 15 pgs.

Shi, Office Action, U.S. Appl. No. 15/226,820, dated Mar. 28, 2018, 10 pgs.

Lanman et al., "Near-Eye Light Field Displays," ACM Transactions on Graphics, vol. 32, No. 6, Article 220, Publication Date: Nov. 2013, 10 pgs.

Jepsen, Office Action, U.S. Appl. No. 15/065,780, dated Jul. 9, 2018, 21 pgs.

Jepsen, Office Action, U.S. Appl. No. 15/065,811, dated May 11, 2018, 17 pgs.

Jepsen, Office Action, U.S. Appl. No. 15/065,813, dated May 17, 2018, 12 pgs.

Jepsen, Office Action, U.S. Appl. No. 15/967,451, dated Jun. 15, 2018, 13 pgs.

Shi, Office Action, U.S. Appl. No. 15/347,684, dated Jul. 11, 2018, 11 pgs.

Shi, Office Action, U.S. Appl. No. 15/347,685, dated Jun. 26, 2018, 11 pgs.

Schmidtlin, Notice of Allowance, U.S. Appl. No. 15/270,803, dated May 2, 2018, 11 pgs.

Shroff, Office Action, U.S. Appl. No. 15/395,107, dated May 14, 2018, 11 pgs.

Blais, Francois, "Review of 20 years of range sensor development," Journal of Electronic Imaging, Jan. 2004, vol. 13(1), pp. 231-243.

Jepsen, Final Office Action, U.S. Appl. No. 15/065,780, dated Dec. 4, 2018, 23 pgs.

Jepsen, Office Action, U.S. Appl. No. 15/065,817, dated Dec. 27, 2018, 11 pgs.

Jepsen, Notice of Allowance, U.S. Appl. No. 15/065,790, dated Aug. 15, 2018, 13 pgs.

Jepsen, Office Action, U.S. Appl. No. 15/065,785, dated Sep. 13, 2018, 21 pgs.

Jepsen, Final Office Action, U.S. Appl. No. 15/065,811, dated Dec. 13, 2018, 8 pgs.

Jepsen, Notice of Allowance, U.S. Appl. No. 15/065,811, dated Feb. 13, 2019, 9 pgs.

Jepsen, Final Office Action, U.S. Appl. No. 15/065,813, dated Dec. 18, 2018, 15 pgs.

Jepsen, Office Action, U.S. Appl. No. 15/065,813, dated Apr. 1, 2019, 15 pgs.

Jepsen, Final Office Action, U.S. Appl. No. 15/967,451, dated Oct. 11, 2018, 17 pgs.

Jepsen, Notice of Allowance, U.S. Appl. No. 15/967,451, dated Feb. 25, 2019, 9 pgs.

Shi, Notice of Allowance, U.S. Appl. No. 15/347,684, dated Jan. 7, 2019, 7 pgs.

Shi, Notice of Allowance, U.S. Appl. No. 15/226,815, dated Sep. 24, 2018, 9 pgs.

Shi, Final Office Action, U.S. Appl. No. 15/226,820, dated Aug. 6, 2018, 13 pgs.

Shi, Notice of Allowance, U.S. Appl. No. 15/226,820, dated Nov. 19, 2018, 10 pgs.

Shi, Office Action, U.S. Appl. No. 15/347,691, dated Nov. 1, 2018, 10 pgs.

Shi, Notice of Allowance, U.S. Appl. No. 15/347,691, dated Feb. 27, 2019, 7 pgs.

Shi, Office Action, U.S. Appl. No. 15/347,672, dated Feb. 21, 2019, 12 pgs.

Shroff, Final Office Action, U.S. Appl. No. 15/395,107, dated Dec. 12, 2018, 13 pgs.

Shroff, Office Action, U.S. Appl. No. 15/395,107, dated Mar. 15, 2019, 15 pgs.

Schmidtlin, Office Action, U.S. Appl. No. 15/422,403, dated Sep. 19, 2018, 21 pgs.

Schmidtlin, Final Office Action, U.S. Appl. No. 15/422,403, dated Jan. 29, 2019, 24 pgs.

* cited by examiner

ENHANCED VISUAL PERCEPTION THROUGH DISTANCE-BASED OCULAR PROJECTION

RELATED APPLICATIONS

This application claims the benefit of, and priority to, U.S. Provisional Patent Application Ser. No. 62/200,481, filed Aug. 3, 2015 and U.S. Provisional Patent Application Ser. No. 62/246,117, filed Oct. 25, 2015, both of which are incorporated by reference herein in their entireties. This application is related to U.S. patent application Ser. No. 15/065,772, entitled "Tile Array for Near-Ocular Display", filed Mar. 9, 2016, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience. In addition, the head-mounted displays should be low power, to ensure a long battery life.

The above deficiencies and other problems associated with conventional head-mounted displays are reduced or eliminated by the disclosed display devices. In some embodiments, the device is a head-mounted display device. In some embodiments, the device is portable.

In accordance with some embodiments, a display device includes a two-dimensional array of tiles. Each tile includes a two-dimensional array of pixels. Each pixel is configured to output light so that the two-dimensional array of pixels outputs a respective pattern of light. Each tile also includes an electro-optic element, of a two-dimensional array of electro-optic elements, configured to direct at least a portion of the respective pattern of light from the two-dimensional array of pixels to a pupil of an eye of a user. The display device also includes one or more processors coupled with the two-dimensional array of tiles and configured to: obtain an image of an object; activate at least a subset of the two-dimensional array of tiles for outputting, from at least the subset of the two-dimensional array of tiles, a collective pattern of light that includes at least a portion of the image of the object; and activate at least a subset of the two-dimensional array of electro-optic elements for projecting the collective pattern of light. At least the subset of the two-dimensional array of electro-optic elements is configured to have a focal length, that is selected based on proximity of the object in a distance model, for projecting the collective pattern of light.

In accordance with some embodiments, a method is performed at a display device comprising a two-dimensional array of tiles. Each tile includes a two-dimensional array of pixels. Each pixel is configured to output light so that the two-dimensional array of pixels outputs a respective pattern of light. Each tile also includes an electro-optic element, of a two-dimensional array of electro-optic elements, configured to direct at least a portion of the respective pattern of light from the two-dimensional array of pixels to a pupil of an eye of a user. The method includes obtaining an image of an object; activating at least a subset of the two-dimensional array of tiles for outputting, from at least the subset of the two-dimensional array of tiles, a collective pattern of light that includes at least a portion of the image of the object; and activating at least a subset of the two-dimensional array of electro-optic elements for projecting the collective pattern of light. At least the subset of the two-dimensional array of electro-optic elements is configured to have a focal length, that is selected based on proximity of the object in a distance model, for projecting the collective pattern of light.

In accordance with some embodiments, a computer readable storage medium stores one or more programs for execution by one or more processors of a display device comprising a two-dimensional array of tiles, each tile comprising: a two-dimensional array of pixels, each pixel being configured to output light so that the two-dimensional array of pixels outputs a respective pattern of light. The display device also includes an electro-optic element, of a two-dimensional array of electro-optic elements, configured to direct at least a portion of the respective pattern of light from the two-dimensional array of pixels to a pupil of an eye of a user. The one or more programs include instructions for obtaining an image of an object; activating at least a subset of the two-dimensional array of tiles for outputting, from at least the subset of the two-dimensional array of tiles, a collective pattern of light that includes at least a portion of the image of the object; and activating at least a subset of the two-dimensional array of electro-optic elements for projecting the collective pattern of light. At least the subset of the two-dimensional array of electro-optic elements is configured to have a focal length, that is selected based on proximity of the object in a distance model, for projecting the collective pattern of light.

Thus, the disclosed embodiments provide compact and light display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays.

The disclosed embodiments, by utilizing a combination of a pixel array and a microlens (called herein a "tile"), provide display devices (including those that can be head-mounted) that are compact and light. In addition, display devices with an array of tiles can provide a large field of view, thereby improving user experience with the display devices.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first tile could be termed a second tile, and, similarly, a second tile could be termed a first tile, without departing from the scope of the various described embodiments. The first tile and the second tile are both tiles, but they are not the same tile.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
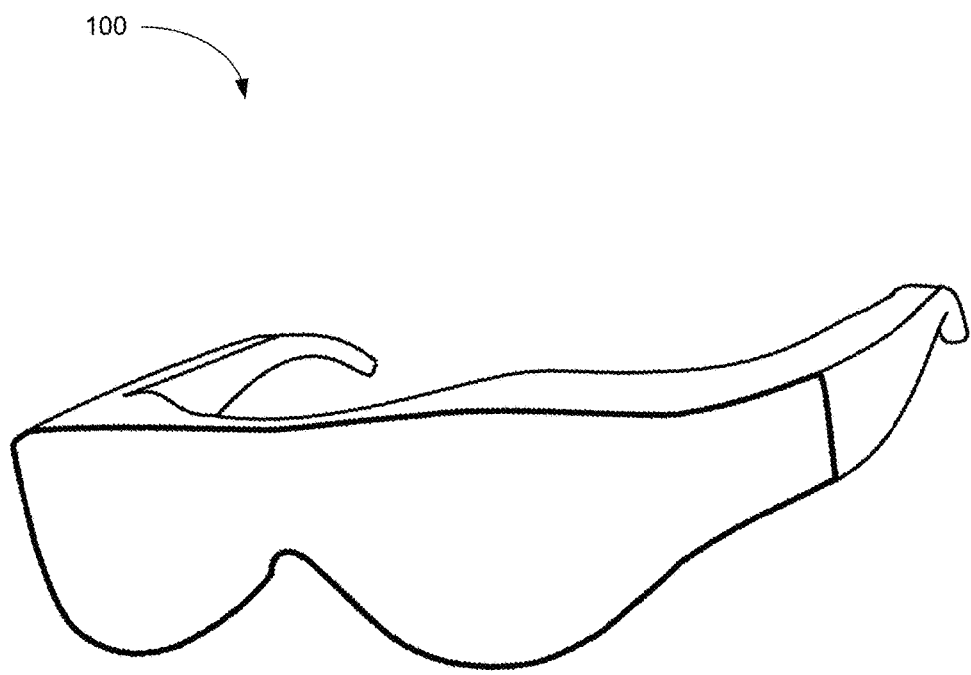
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
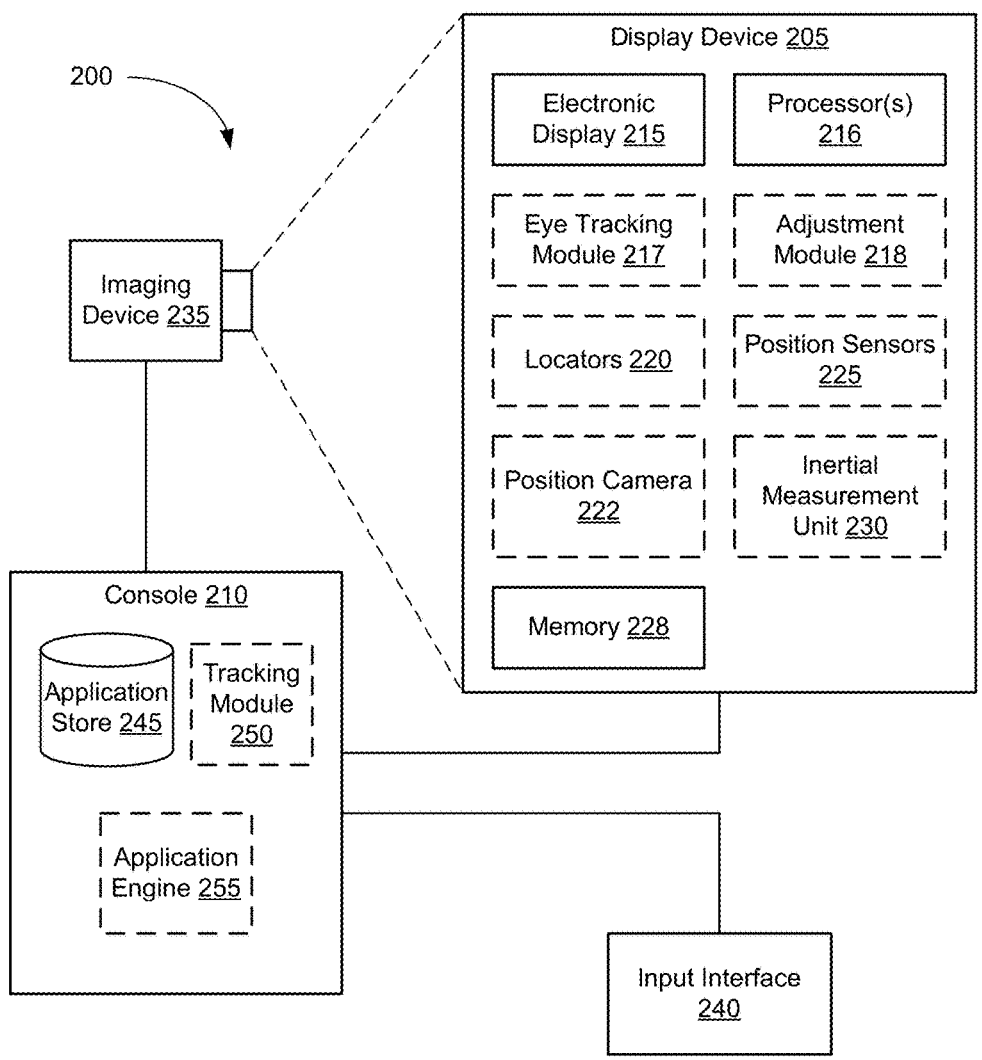
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:

instructions for activating at least a subset of a two-dimensional array of tiles for outputting, from at least the subset of the two-dimensional array of tiles, a collective pattern of light that is directed to a pupil of an eye of a user;

instructions for, prior to activating at least the subset of the two-dimensional array of tiles, selecting the subset of the two-dimensional array of tiles for activation;

instructions for directing the light from each pixel that outputs light to a pupil of an eye of a user; and instructions for activating at least the subset of the two-dimensional array of tiles include instructions for activating less than all of the tiles of the two-dimensional array of tiles.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). As discussed in detail below with regard to FIGS. 3A-3I, an adjustable electronic display element is comprised of a display element, one or more integrated microlens arrays, or some combination thereof. The adjustable electronic display element may be flat, cylindrically curved, or have some other shape.

In some embodiments, the display element includes an array of light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind an array of microlenses, and are arranged in groups. Each group of pixels outputs light that is directed by the microlens in front of it to a different place on the retina where light from these groups of pixels are then seamlessly "tiled" to appear as one continuous image. In some embodiments, computer graphics, computational imaging and other techniques are used to pre-distort the image information (e.g., correcting for the brightness variations) sent to the pixel groups so that through the distortions of the system from optics, electronics, electro-optics, and mechanicals, a smooth seamless image appears on the back of the retina, as described below with respect to FIGS. 4A and 4B. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

The microlens arrays are arrays of lenslets that direct light from the arrays of light emission devices (optionally through the emission intensity arrays) to locations within each eyebox and ultimately to the back of the user's retina(s). An eyebox is a region that is occupied by an eye of a user, located in proximity to display device 205 (e.g., a user wearing display device 205), for viewing images from display device 205. In some cases, the eyebox is represented as a 10 mm×10 mm square (see, e.g., FIG. 3D). In some embodiments, a lenslet is a conventional passive lens (e.g., glass lens, plastic lens, etc.) or an active lens (e.g., liquid crystal lens, liquid lens, etc.). In some embodiments, display device 205 dynamically adjusts the curvature and/or refractive ability of active lenslets to direct light to specific locations within each eyebox (e.g., location of pupil). In some embodiments, one or more of the microlens arrays include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. This sends a discrete image to the display that will tile subimages together thus a coherent stitched image will appear on the back of the retina. A small portion of each image is projected through each lenslet in the lenslet array. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenslets in the microlens arrays, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups or "tiles" to match divergence of the light source array and the magnification of the group of pixels as it transverses through the optical system and fully fills the lenslet. In some embodiments, adjustment module 218 determines, for a given position of an eye, which pixels are turned on and which pixels are turned off, with the resulting image being seamlessly tiled on the eye's retina.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
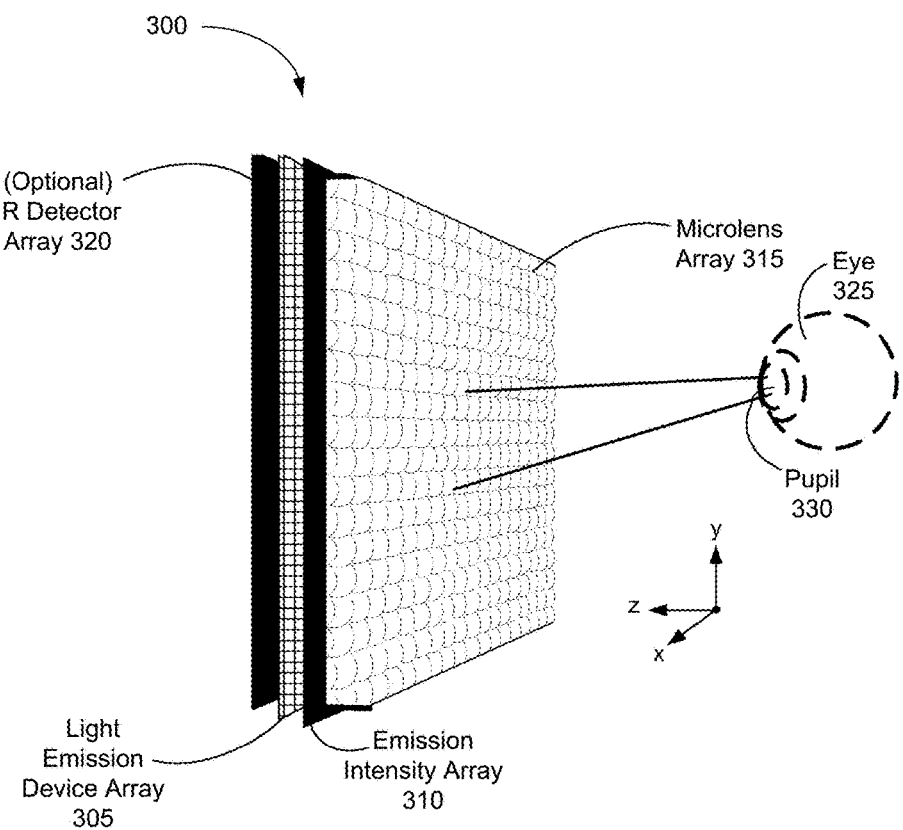
FIG. 3A is an isometric view of an adjustable electronic display element of a display device in accordance with some embodiments.

FIG. 3A is an isometric view of an adjustable electronic display element 300 of display device 205, in accordance with some embodiments. In some other embodiments, adjustable electronic display element 300 is part of some other electronic display (e.g., digital microscope, etc.). In some embodiments, adjustable electronic display element 300 includes light emission device array 305, emission intensity array 310, microlens array 315, and IR detector array 320. In some other embodiments, adjustable electronic display element 300 includes a subset or superset of light emission device array 305, emission intensity array 310, microlens array 315, and IR detector array 320 (e.g., adjustable electronic display element 300 includes an adjustable light emission device array that includes individually adjustable pixels and microlens array 315, without a separate emission intensity array).

Light emission device array 305 emits image light and optional IR light toward the viewing user. Light emission device array 305 may be, e.g., an array of LEDs, an array of microLEDs, an array of OLEDs, or some combination thereof. Light emission device array 305 includes light emission devices that emit light in the visible light (and optionally includes devices that emit light in the IR).

Emission intensity array 310 is configured to selectively attenuate light emitted from light emission array 305. In some embodiments, emission intensity array 310 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner emission intensity array 310 is able to control what portion of the image light emitted from light emission device array 305 is passed to the microlens array 315. In some embodiments, display device 205 uses emission intensity array 310 to facilitate providing image light to a location of pupil 330 of eye 325 of a user, and minimize the amount of image light provided to other areas in the eyebox.

Microlens array 315 receives the modified image light (e.g., attenuated light) from emission intensity array 310, and directs the modified image light to a location of pupil 330. Microlens array 315 includes a plurality of lenslets. In some embodiments, microlens array 315 includes one or more diffractive optics. A lenslet may be a conventional passive lens (e.g., glass lens, plastic lens, etc.) or an active lens. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from emission intensity array 310 to pupil 330.

Optional IR detector array 320 detects IR light that has been retro-reflected from the retina of eye 325, a cornea of eye 325, a crystalline lens of eye 325, or some combination thereof. IR detector array 320 includes either a single IR sensor or a plurality of IR sensitive detectors (e.g., photodiodes). While IR detector array 320 in FIG. 3A is shown separate from light emission device array 305, in some embodiments, IR detector array 320 may be integrated into light emission device array 305.

In some embodiments, light emission device array 305 and emission intensity array 310 make up a display element. Alternatively, the display element includes light emission device array 305 (e.g., when light emission device array 305 includes individually adjustable pixels) without emission intensity array 310. In some embodiments, the display element additionally includes IR array 320. In some embodiments, in response to a determined location of pupil 335, the display element adjusts the emitted image light such that the light output by the display element is refracted by microlens array 315 toward the location of pupil 335, and not toward other locations in the eyebox.

Figure 3B:
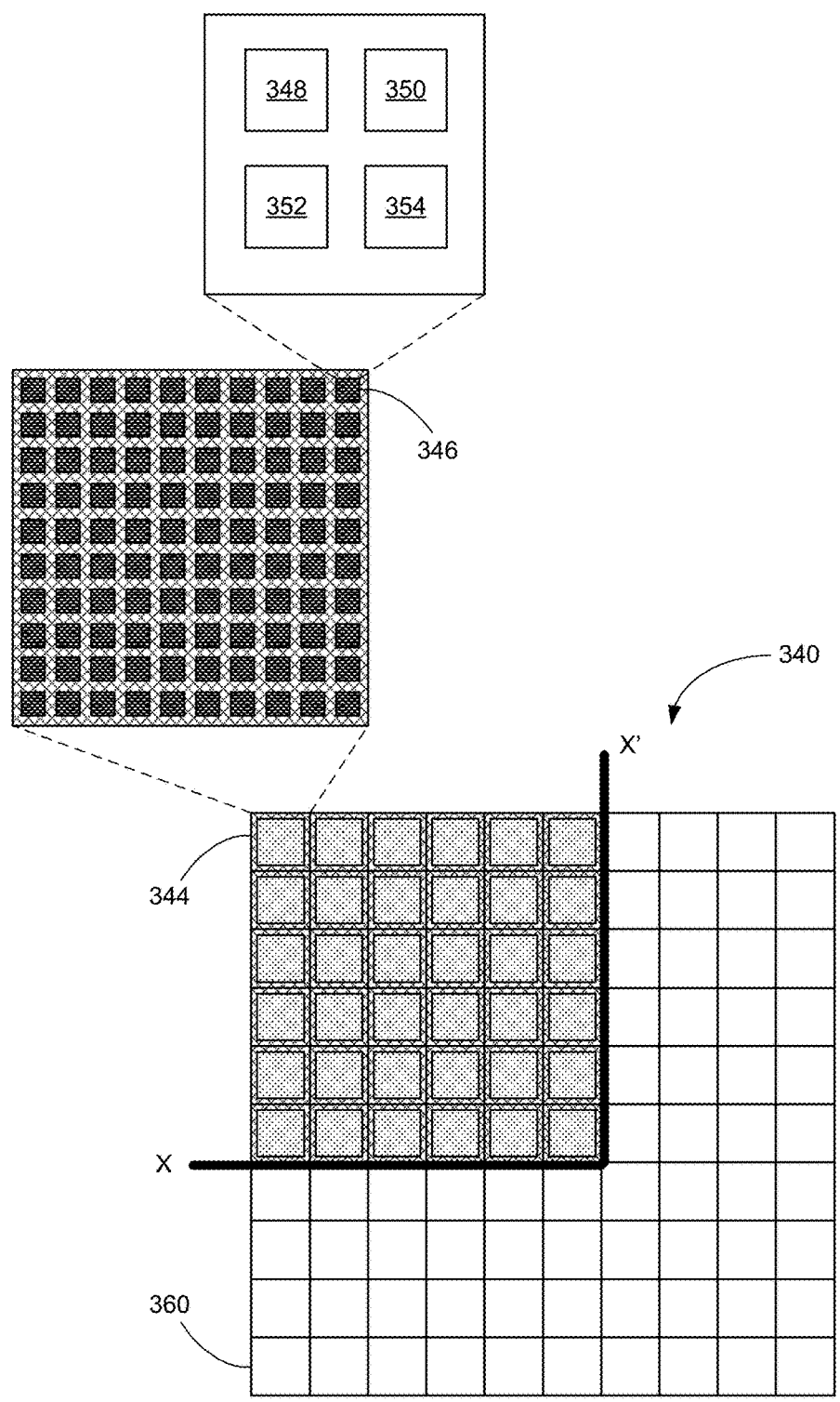
FIG. 3B is a partial cross-sectional view of the adjustable electronic device in accordance with some embodiments.

FIG. 3B is a partial cross-sectional view of adjustable electronic device 340 in accordance with some embodiments.

Adjustable electronic device 340 includes a two-dimensional array of tiles 360 (e.g., 10-by-10 array of tiles 360, as shown in FIG. 3B). In some cases, each tile has a shape of a 1-mm-by-1-mm square, although tiles of different sizes and/or shapes can be used. In some embodiments, the two-dimensional array of tiles 360 is arranged on a flat surface. In some other embodiments, the two-dimensional array of tiles 360 is arranged on a curved surface or a surface of any other shape. Although FIG. 3B shows a square array of tiles 360, in some other embodiments, the two-dimensional array of tiles 360 may have a rectangular shape, or any other shape (e.g., a rasterized circle or a rasterized ellipse). In addition, a different number of tiles 360 may be used depending on the desired performance of the display device (e.g., a field of view).

As explained above, tile 360 includes a lens. In some embodiments, lenses for the two-dimensional array of tiles are provided in a form of a microlens array (e.g., microlens array 315 in FIG. 3A). In FIG. 3B, a portion of the microlens array is not shown (e.g., an upper-left portion of the microlens array indicated by the line XX') to illustrate groups of pixels located behind it.

FIG. 3B also illustrates that each tile 360 includes a two-dimensional array 344 of pixels 346 (e.g., 10-by-10 array of pixels). In some other embodiments, the tiles 360 may include different numbers of pixels (e.g., 40-by-40 pixels).

In some embodiments, the two-dimensional array 344 of pixels 346 does not encompass the entire surface of tile 360, as shown in FIG. 3B. In such embodiments, a portion of tile 360 (e.g., an area along a periphery of tile 360) not covered by the pixels 346 includes electronic circuits for operating pixels 346 on tile 360 (e.g., adjusting individual pixels 346 and/or subpixels to turn on or off).

In FIG. 3B, each pixel 346 includes a plurality of subpixels (e.g., subpixel 348, 350, 352, and 354), where each subpixel corresponds to a respective color. For example, each pixel may include three subpixels, each subpixel outputting light of one of red, green, and blue colors. In another example, each pixel may include four subpixels, each subpixel outputting to one of red, green, blue, and yellow colors (e.g., subpixel 348 outputs red light, subpixel 350 outputs green light, subpixel 352 outputs blue light, and subpixel 354 outputs yellow light). In some cases, this is enabled by placing different color filters in front of the subpixels. In some embodiments, the subpixels in each pixel have the same size (e.g., the red subpixel, the green subpixel, and the blue subpixel have the same size), while in some other embodiments, the subpixels have different sizes (e.g., to compensate for different intensities of light of different colors).

In some embodiments, each tile 360 in the two-dimensional array of tiles has a same configuration. For example, each tile may have the same shape and size, and include a same number of pixels. In some embodiments, tiles in the two-dimensional array of tiles have different configurations (e.g., tiles having one of two different configurations are alternated).

In some embodiments, each tile includes a two-dimensional array of lenses. For example, the tile may have the same number of pixels and lenses so that each pixel is coupled with a respective lens. In some embodiments, each single lens is integrated with a respective pixel (e.g., each single lens is placed on, or included as part of, the respective pixel).

Figure 3C:
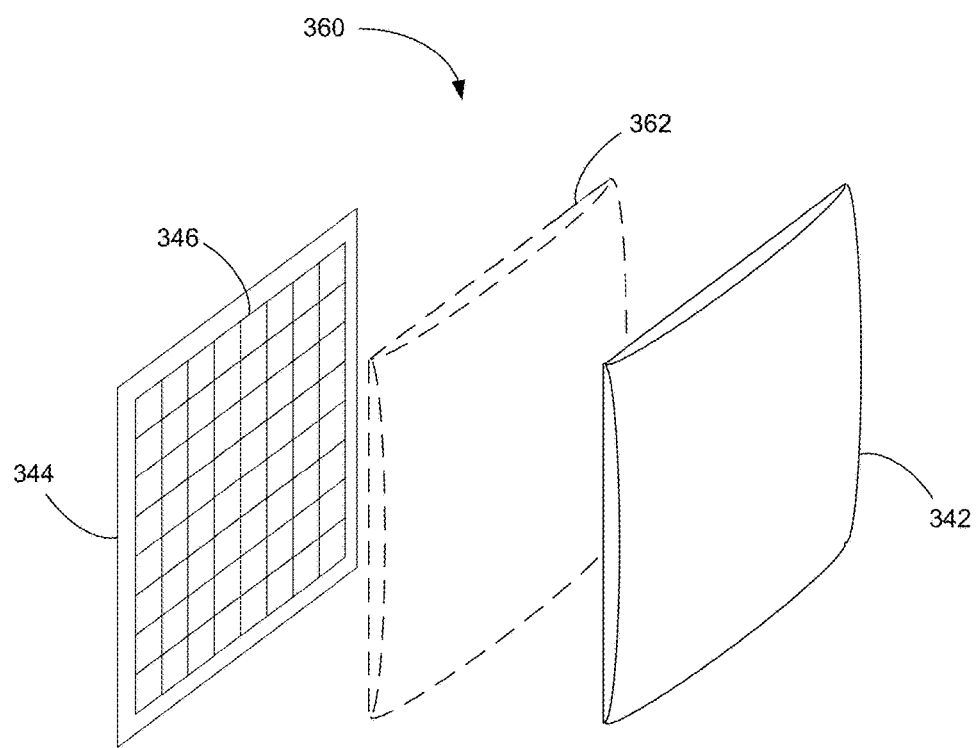
FIG. 3C is a perspective view of a tile in accordance with some embodiments.

FIG. 3C is a perspective view of tile 360 in accordance with some embodiments. As explained above, tile 360 includes two-dimensional array 344 of pixels 346 and lens 342, which may be a lenslet of a microlens array (e.g., microlens array 315 in FIG. 3A). In some embodiments, tile 360 includes a single lens. In some other embodiments, tile 360 includes two or more lenses along the optical axis (e.g., second lens 362 is located between pixels 346 and lens 342).

Figure 3D:
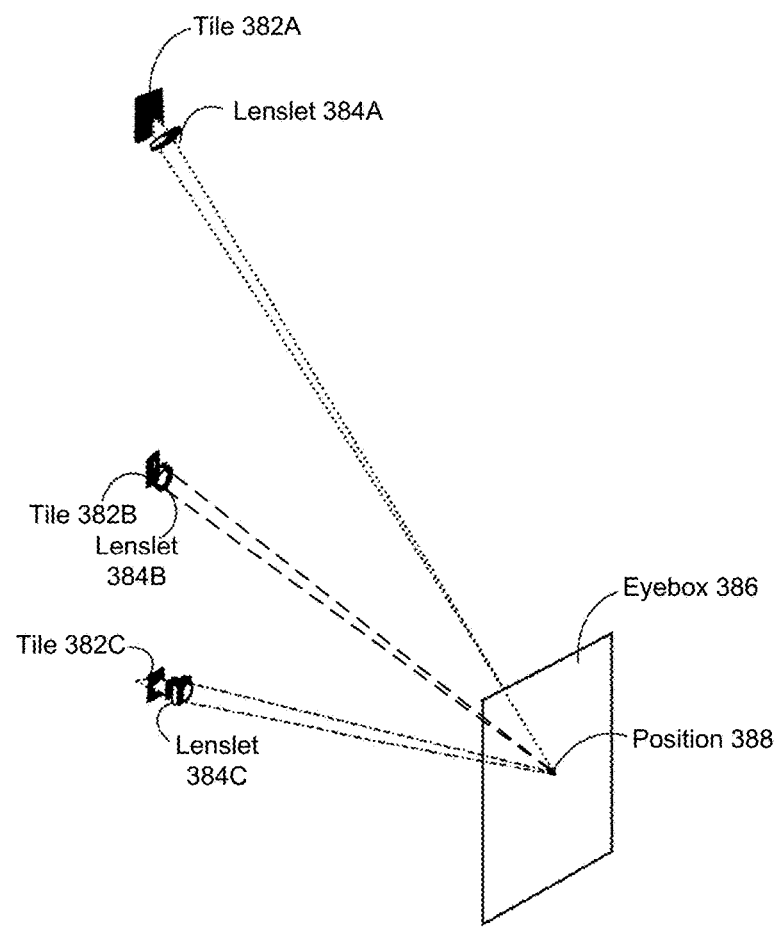
FIG. 3D is a perspective view of a portion of the adjustable electronic display element in accordance with some embodiments.

FIG. 3D is a perspective view of a portion of the adjustable electronic display element in accordance with some embodiments. The perspective view 380 includes a portion of the electronic display element and eyebox 386. For example, the portion includes tiles 382A, 382B, and 382C, and lenslets 384A, 384B, and 384C in those tiles. In some cases, eyebox 386 has a dimension of 10 mm×10 mm, although eyeboxes of different sizes can be used. When pupil 330 is at position 388, the image is rendered for this portion of eyebox 386, and light is directed from different tiles, including tiles 382A, 382B, and 382C to form an image on a retina of the eye.

Figure 3E:
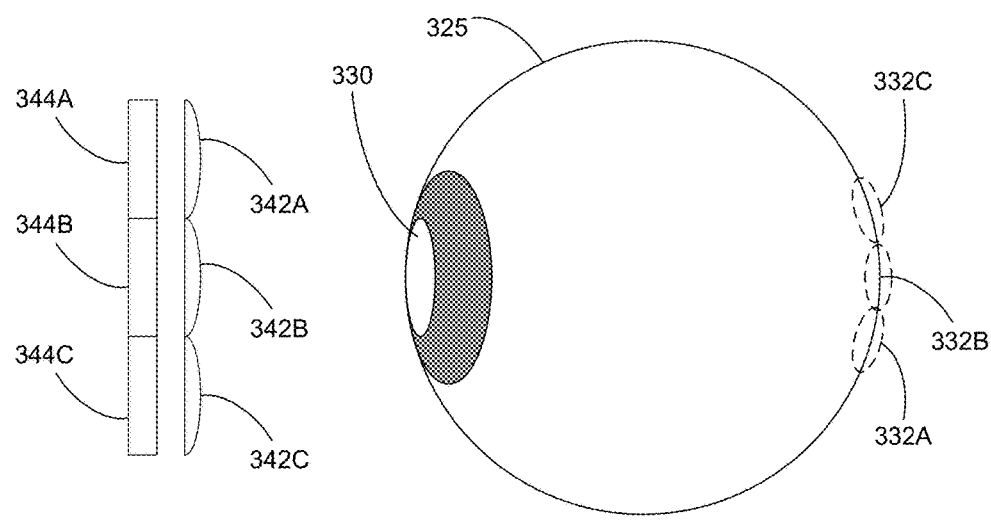
FIGS. 3E-3G are schematic diagrams illustrating an exemplary operation of tiles in accordance with some embodiments.
Figure 3F:
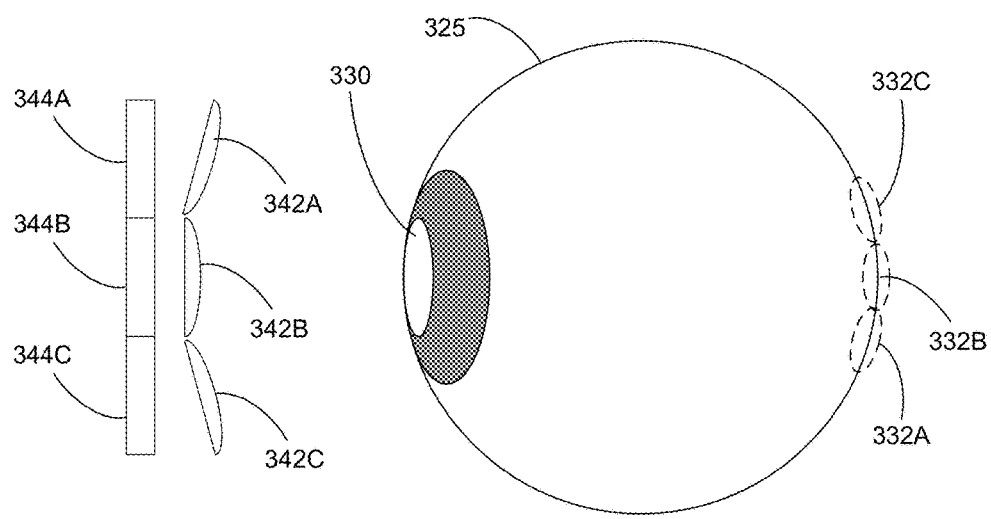
Figure 3G:
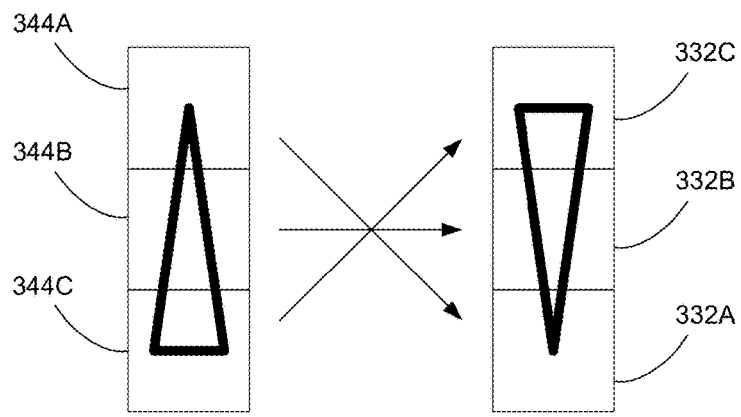

FIGS. 3E-3G are schematic diagrams illustrating exemplary operations of tiles in accordance with some embodiments.

FIG. 3E illustrates three tiles (e.g., a first tile with group 344A of pixels and lens 342A, a second tile with group 344B of pixels and lens 342B, and a third tile with group 344C of pixels and lens 342C). Pixels 344 in each tile render a respective pattern of light, which is directed by lens 342 in the tile to pupil 330 of eye 325. The respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325, as shown in FIG. 3G. Thus, the respective patterns of light from pixel groups 344A, 344B, and 344C form a collective pattern of light, which is seamlessly projected onto the retina of eye 325, which is perceived by the eye as a single image. In some embodiments, as shown in FIG. 3F, one or more lenses (e.g., lens 342A and 342C) are tilted to better direct light toward pupil 330 of eye 325.

It should be noted that display devices described herein are distinct from what is known as light field displays. Light field displays project partially overlapping series of images. However, light field displays have a limited field of view. In comparison, the disclosed display devices provide a large field of view that has not been possible with light field displays, and therefore, can be used for a wider range of applications.

Figure 3H:
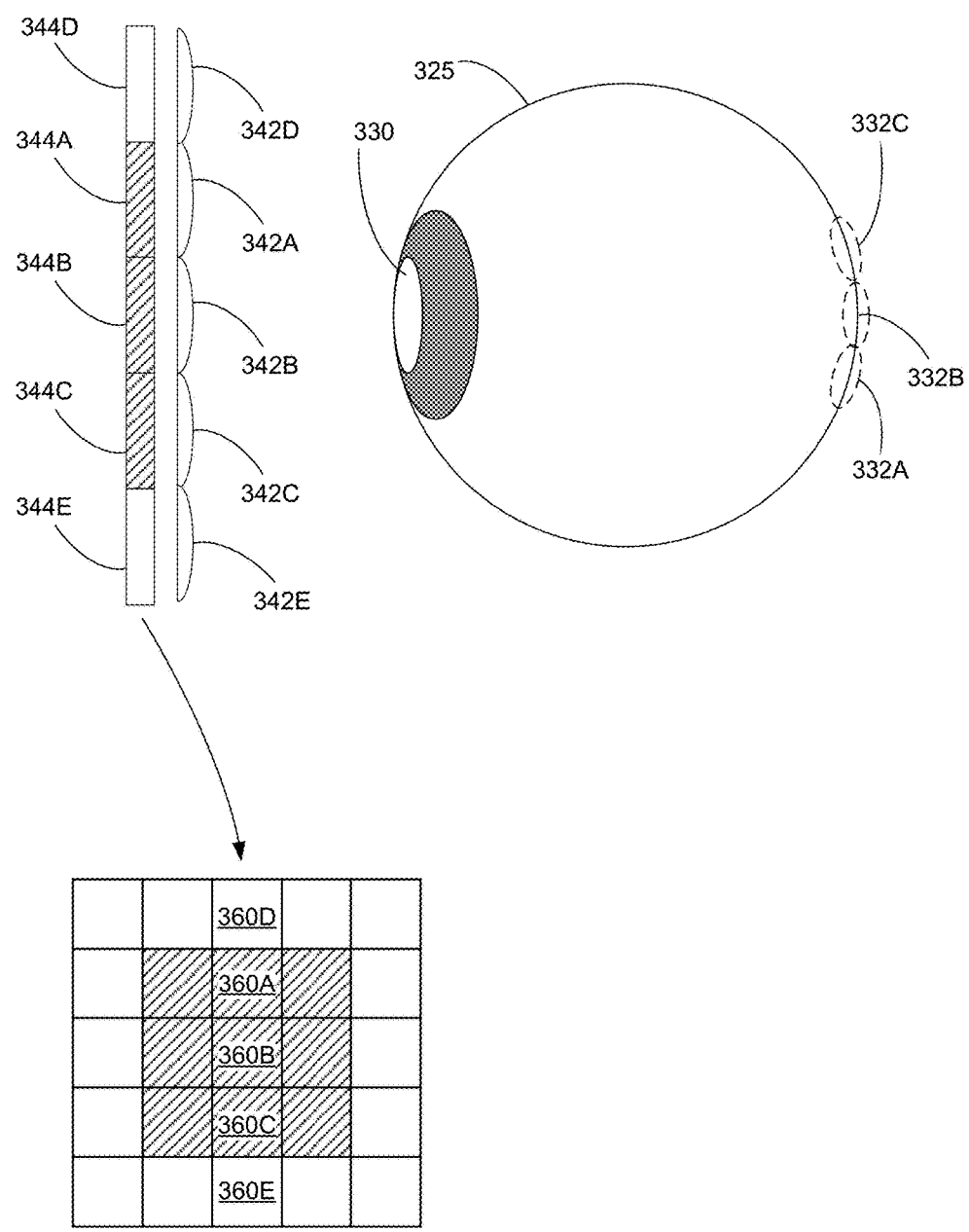
FIGS. 3H and 3I are schematic diagrams illustrating exemplary operations of activating a subset of tiles in accordance with some embodiments.
Figure 3I:
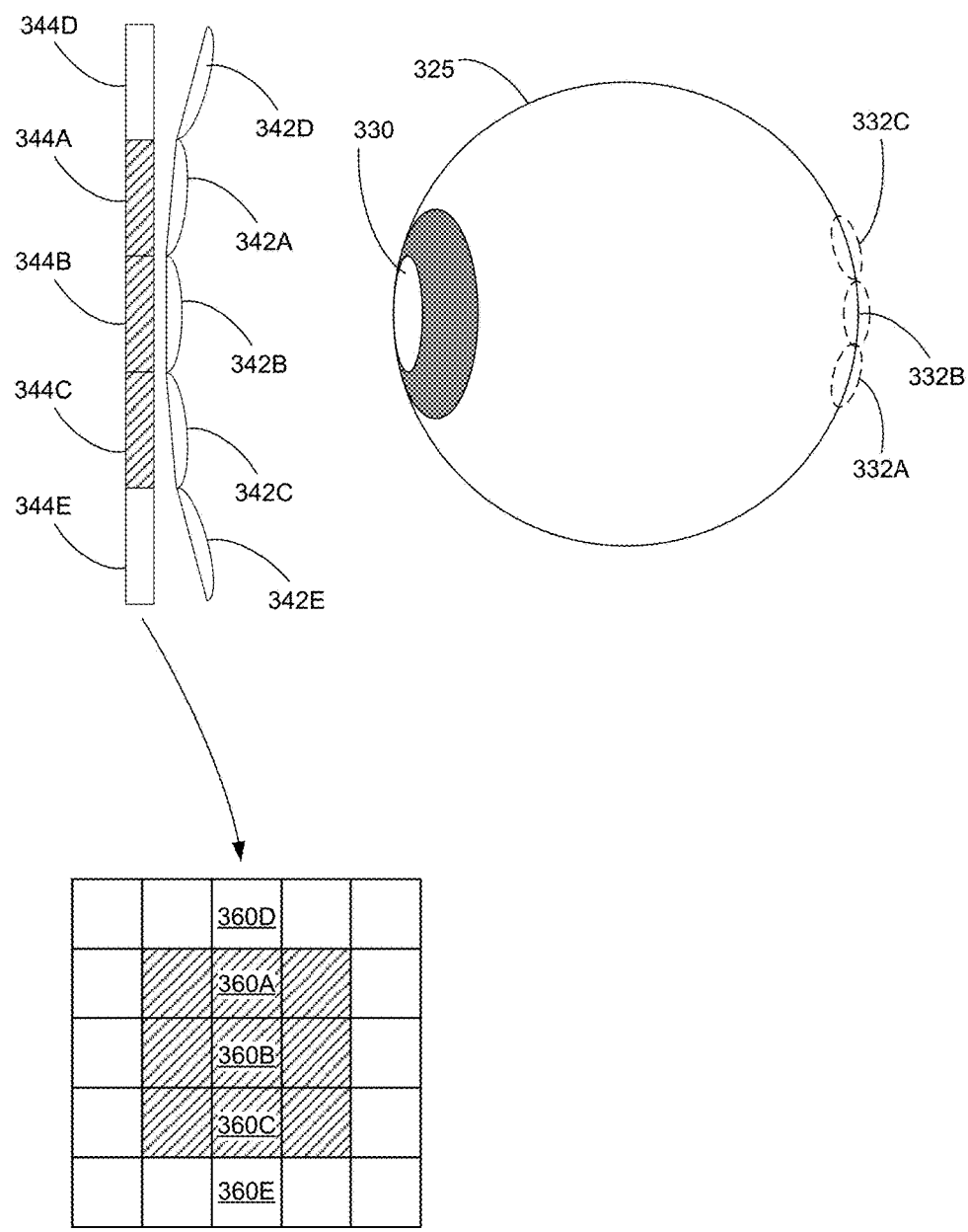

FIGS. 3H and 3I are schematic diagrams illustrating exemplary operations of activating a subset of tiles in accordance with some embodiments. FIG. 3H illustrates an array of 5-by-5 tiles, where five tiles out of the 25 tiles are shown in the side view (e.g., tiles with pixel groups 344D, 344A, 344B, 344C, and 344E and corresponding lenses 342D, 342A, 342B, 342C, and 342E). As explained above with respect to FIGS. 3E-3G, the respective pattern of light from group 344A of pixels forms an image on a first portion 332A of a retina of eye 325, the respective pattern of light from group 344B of pixels forms an image on a second portion 332B of the retina of eye 325, and the respective pattern of light from group 344C of pixels forms an image on a third portion 332C of the retina of eye 325. However, group 344D of pixels and group 344E of pixels are not activated. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325). In some embodiments, group 344D of pixels and group 344E of pixels are not activated, because the light output from group 344D of pixels and group 344E of pixels are not necessary for forming an image on the retina of eye 325. In some embodiments, group 344D of pixels and group 344E of pixels are not activated, because light output from group 344D of pixels and group 344E of pixels cannot be directed to pupil 330 of eye 325 (or because the light output from group 344D of pixels and group 344E of pixels cannot form an image on the retina of eye 325).

In some embodiments, a group of pixels that is not activated does not output light toward the pupil of the eye. In some embodiments, a group of pixels that is not activated does not output light at all. In some embodiments, a group of pixels that is not activated is turned off or remains in a power savings mode, thereby reducing consumption of energy.

FIG. 3H also illustrates that out of the twenty-five tiles, nine contiguous tiles (including tiles 360A, 360B, and 360C) are activated (which are shaded in FIG. 3H) and the remaining sixteen tiles (including tiles 360D and 360E) are not activated (which are not shaded in FIG. 3H).

In some embodiments, as shown in FIG. 3I, one or more lenses (e.g., lens 342A, 342C, 342D, and 342E) are tilted to better direct light toward pupil 330 of eye 325.

Figure 4A:
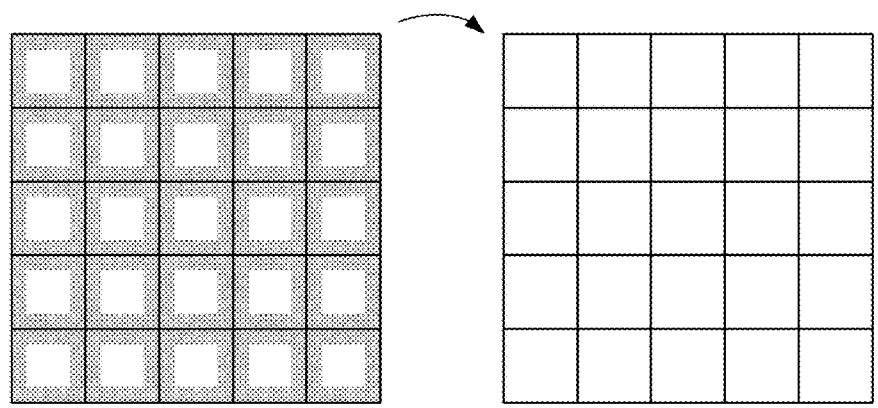
FIGS. 4A and 4B illustrate prophetic examples of correcting brightness variations in accordance with some embodiments.
Figure 4B:
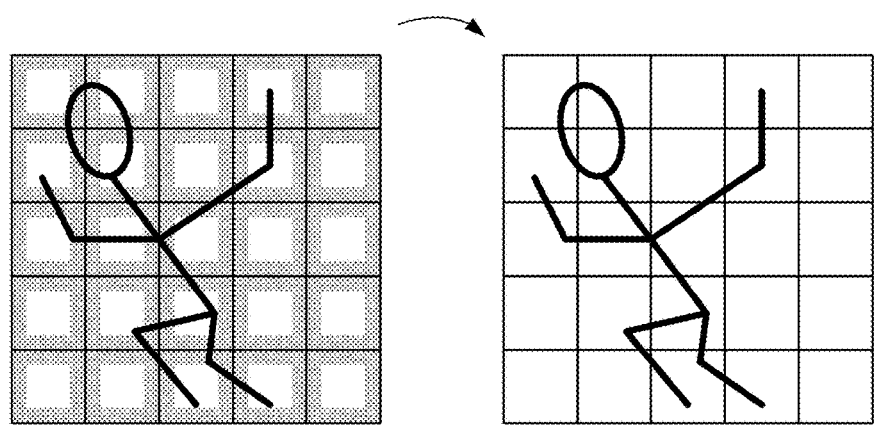

FIGS. 4A and 4B illustrate prophetic examples of correcting brightness variations in accordance with some embodiments.

FIG. 4A illustrates (on the left side) an image projected onto a retina of an eye by a two-dimensional array of tiles (e.g., 5-by-5 array of tiles). As shown in FIG. 4A, in some cases, each portion of the image projected by a single tile has a variation in brightness (e.g., due to the optics). For example, a mono-color image (e.g., an image of a blue sky or a white drywall), when projected onto the retina by the two-dimensional array of tiles, may have a variation in the brightness. To compensate for the variation in the brightness, the image is modified by the one or more processors (e.g., 216 in FIG. 2). For example, if the brightness of pixels along the edges of each tile is higher than the brightness of pixels in the middle of the tile, the brightness of pixels along the edges of the tile is reduced and/or the brightness of pixels in the middle of the tile is increased, thereby providing a corrected distribution of brightness across the tile. Conversely, if the brightness of pixels along the edges of each tile is lower than the brightness of pixels in the middle of the tile, the brightness of pixels along the edges of the tile is increased and/or the brightness of pixels in the middle of the tile is reduced, thereby providing a corrected distribution of brightness across the tile. The right side image in FIG. 4A shows that the image formed on the retina based on the brightness correction has no or reduced brightness variation.

FIG. 4B illustrates another example, in which an image of a person is projected onto the retina of the eye by the two-dimensional array. In the left side image in FIG. 4B, the brightness variation reduces the quality of the image formed on the retina of the eye. The right side image in FIG. 4B shows that correcting the brightness variation improves the quality of the image formed on the retina of the eye.

Certain embodiments based on these principles are described below.

In accordance with some embodiments, display device 100 includes a two-dimensional array of tiles (e.g., two-dimensional array 340 of tiles 360 in FIG. 3B). Each tile (e.g., tile 360 in FIG. 3C) includes a two-dimensional array of pixels (e.g., two-dimensional array 344 of pixels 346 in FIG. 3C) and a lens (e.g., lens 342 in FIG. 3C), of a two-dimensional array of lenses, configured to direct at least a portion of the respective pattern of light from two-dimensional array 344 of pixels to a pupil of an eye of a user (e.g., FIG. 3E). Each pixel is configured to output light so that the two-dimensional array of pixels outputs a respective pattern of light (e.g., two-dimensional array 344A of pixels in FIG. 3G outputs a pattern of light that corresponds to a top portion of a triangle, two-dimensional array 344B of pixels in FIG. 3G outputs a pattern of light that corresponds to a middle portion of the triangle, and two-dimensional array 344C of pixels in FIG. 3G outputs a pattern of light that corresponds to a bottom portion of the triangle). The display device also includes one or more processors (e.g., processors 216 in FIG. 2) coupled with the two-dimensional array of tiles and configured to activate a subset of the two-dimensional array of tiles for outputting, from at least the subset of the two-dimensional array of tiles, a collective pattern of light that is directed to the pupil of the eye of the user (e.g., the subset of the two-dimensional array of tiles is turned on or instructed to output light).

In some embodiments, the display device is a head-mounted display device (e.g., FIG. 1).

In some embodiments, the two-dimensional array of tiles is configured to direct the light from each pixel that outputs light to a pupil of an eye of the user. For example, for any pixel that outputs light, at least a portion of the light output by the pixel is directed to the pupil of the eye of the user. This is distinct from light field displays, in which certain pixels output light that is not directed to the pupil of the eye (e.g., the light is sent to a direction other than a direction toward the pupil of the eye). In some embodiments, tiles that cannot output light that can enter the pupil of the eye of the user (e.g., based on the position of the pupil of the eye) are not activated (e.g., turned off).

In some embodiments, the collective pattern of light is configured to form an image on a retina of the eye of the user (e.g., the image form on the retina of the eye as shown in FIG. 3G).

In some embodiments, a first tile of the two-dimensional array of tiles outputs a first pattern of light; a second tile, adjacent to the first tile, of the two-dimensional array of tiles outputs a second pattern of light; the first pattern of light corresponds to a first portion of the image; the second pattern of light corresponds to a second portion of the image; and the first portion of the image does not overlap at least partially with the second portion of the image. For example, as shown in FIG. 3G, the first tile with group 344A of pixels outputs a pattern of light that corresponds to the top portion of a triangle and the second tile with group 344B of pixels, adjacent to (i.e., next to) the first tile, outputs a pattern of light that corresponds to the middle portion of the triangle. As shown in FIG. 3G, a portion of the image formed by light from group 344A of pixels and a portion of the image formed by light from group 344B of pixels do not overlap. In some embodiments, these portions of the image do not overlap at all (e.g., there is not even a partial overlap between the two portions) for a group of tiles for a same eye. This is distinct from light field displays, which use light output from pixels that are located apart to illuminate a same location on the retina of the eye.

In some embodiments, no two tiles (including two tiles that are adjacent to each other) output patterns of light that correspond to respective portions of the image that at least partially overlap with each other. As explained above, light output from each tile is used to project a unique portion of an image on the retina of the eye. Thus, light output by any two different tiles forms portions of the image that do not overlap with each other at all (e.g., the projected portions of the image do not even partially overlap with each other, as shown in FIG. 3G). However, in some embodiments, a tile configured for projecting a portion of a left-eye image to a left eye and a tile configured for projecting a portion of a right-eye image to a right eye, and the left-eye image and the right-eye image may partially overlap due to the stereoscopic nature of the left-eye image and the right-eye image for providing depth perception.

In some embodiments, no two tiles, that are not adjacent to each other, output patterns of light that correspond to respective portions of the image that at least partially overlap with each other. In such embodiments, the portions of images projected by two adjacent tiles partially overlap (e.g., one or more edges of the portions of the image overlap) to ensure that there is no gap between the projected portions of images.

In some embodiments, the two-dimensional array of tiles is arranged so that a distance between two adjacent pixels in a first tile is distinct from a distance between a first pixel, in the first tile, that is located closest to a second tile that is adjacent to the first tile and a second pixel, in the second tile, that is located closest to the first pixel. For example, as shown in FIG. 3B, a pixel-to-pixel distance within a tile is different from a pixel-to-pixel distance between two adjacent tiles (e.g., due to the portion of tile 360 not covered by the pixels 346, such as an area along a periphery of tile 360).

In some embodiments, the one or more processors are configured to adjust intensity of pixels (e.g., FIGS. 4A and 4B). In some embodiments, the one or more processors are configured to decrease the intensity of pixels along an edge of each tile. In some embodiments, the one or more processors are configured to increase the intensity of pixels at a center of each tile. Alternatively, in some embodiments, the one or more processors are configured to increase the intensity of pixels along an edge of each tile. In some embodiments, the one or more processors are configured to decrease the intensity of pixels at a center of each tile.

In some embodiments, the one or more processors are configured to activate less than all of the tiles of the two-dimensional array of tiles. For example, processors 216 activate only a selection of tiles that can direct light to the pupil of the eye (e.g., FIG. 3H). In comparison, light field displays output light from all of the pixels, which is distinct from the claimed display devices.

In some embodiments, the subset of the two-dimensional array of tiles is a contiguous set of tiles of the two-dimensional array of tiles (e.g., the contiguous set of tiles including tiles 360A, 360B, and 360C in FIG. 3H).

In some embodiments, the two-dimensional array of tiles includes a left-side array of tiles and a right-side array of tiles that does not overlap with the left-side array of tiles. The one or more processors are configured to activate less than all of the tiles of the left-side array of tiles for outputting a first pattern of light that is directed to a pupil of a left eye of the user (e.g., only tiles of the left-side array that can direct light to the pupil of the left eye are activated and the remaining tiles of the left-side array are not activated) and activate less than all of the tiles of the right-side array of tiles for outputting a second pattern of light that is directed to a pupil of a right eye of the user (e.g., only tiles of the right-side array that can direct light to the pupil of the right eye are activated and the remaining tiles of the left-side array are not activated).

Figure 5:
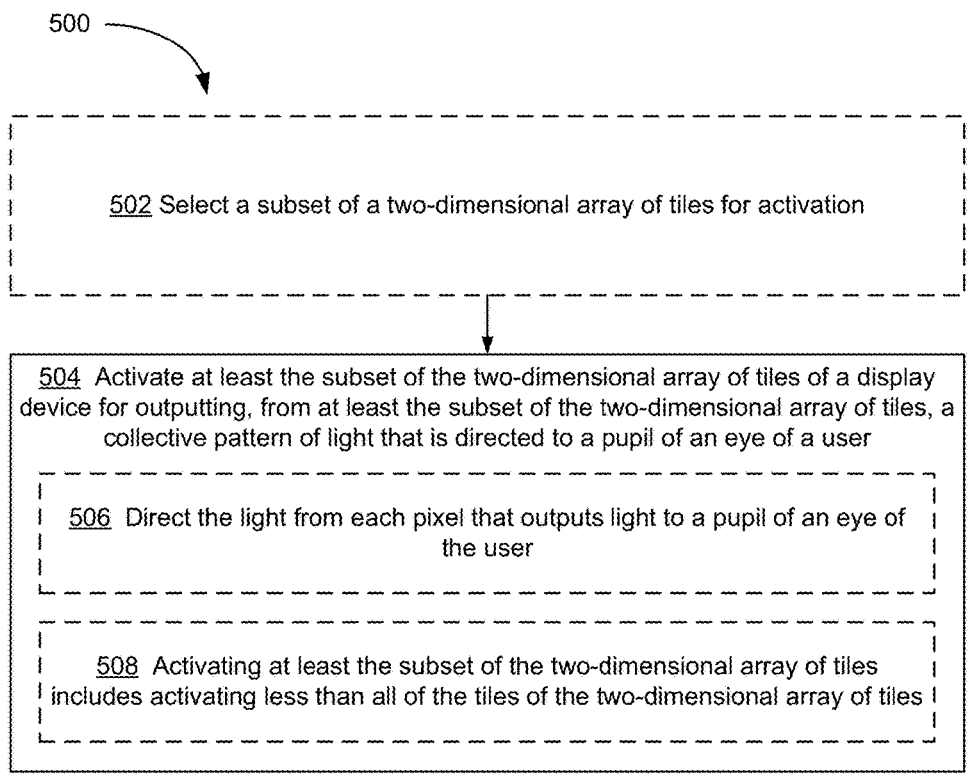
FIG. 5 is a flow diagram illustrating a method of activating a subset of a two-dimensional array of tiles of a display device in accordance with some embodiments.

FIG. 5 is a flow diagram illustrating method 500 of activating a subset of a two-dimensional array of tiles of a display device in accordance with some embodiments. Method 500 is performed at a display device (e.g., display device 100 in FIG. 1) comprising a two-dimensional array of tiles (e.g., FIG. 3B). Each tile includes (e.g., FIG. 3C): a two-dimensional array of pixels (e.g., 344), and a lens (e.g., 342), of a two-dimensional array of lenses, configured to direct at least a portion of the respective pattern of light from the two-dimensional array of pixels to a pupil of an eye of a user (e.g., FIG. 3D). Each pixel is configured to output light so that the two-dimensional array of pixels outputs a respective pattern of light (e.g., FIG. 3G).

In some embodiments, prior to activating at least a subset of a two-dimensional array of tiles, the device selects (502) the subset of the two-dimensional array of tiles for activation. For example, the device determines the subset of the two-dimensional array of tiles based on a position of a pupil of an eye (e.g., the device determines the position of the pupil of the eye, and the device selects the subset of the two-dimensional array of tiles based on the position of the pupil of the eye from a lookup table).

The device activates (504) at least the subset of the two-dimensional array of tiles of the display device for outputting, from at least the subset of the two-dimensional array of tiles, a collective pattern of light that is directed to a pupil of an eye of the user (e.g., FIG. 3G). For example, the device initiates sending power to the subset of the two-dimensional array of tiles. Alternatively, the device sends instructions to the subset of the two-dimensional array of tiles to output light. In some embodiments, the device activates only a subset of the two-dimensional array of tiles for outputting, from the subset of the two-dimensional array of tiles, a collective pattern of light that is directed to a pupil of an eye of the user. In some embodiments, the device deactivates (e.g., turns off or places in a power savings mode) the rest of the two-dimensional array of tiles.

In some embodiments, the device directs (506) the light, from each pixel that outputs light, to a pupil of an eye of the user. For example, light from each pixel that outputs light is directed through a microlens toward the pupil of the eye of the user, as shown in FIG. 3D. In determining whether the device directs the light from each pixel that outputs light to the pupil of the eye, pixels that do not output light are not considered.

In some embodiments, activating at least the subset of the two-dimensional array of tiles includes (508) activating less than all of the tiles of the two-dimensional array of tiles. Activating less than all of the tiles of the two-dimensional array of tiles has an additional advantage in reducing the power consumption, thereby increasing the interval between battery charges.

Figure 6A:
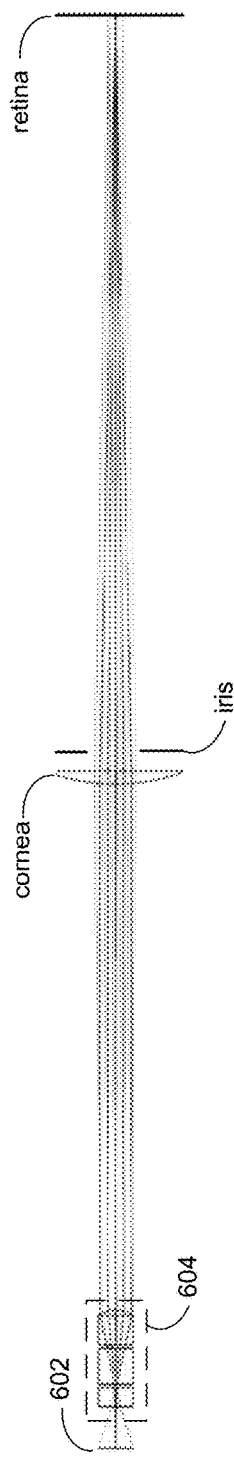
FIG. 6A is a schematic diagram illustrating a lens assembly in accordance with some embodiments.

FIG. 6A is a schematic diagram illustrating lens assembly 604 in accordance with some embodiments. Lens assembly 604 is configured to direct at least a portion of a pattern of light from a two-dimensional array of pixels 602 to a pupil of an eye of a user. For example, lens assembly 604 projects an image on two-dimensional array of pixels 602 onto a retina of the eye of the user. In some embodiments, the image projected on the retina of the eye of the user is a demagnified image of the image on two-dimensional array of pixels 602 (e.g., a size of the image projected on the retina of the eye of the user is smaller than a size of the image on two-dimensional array of pixels 602). This reduces visibility of the spacing between pixels (or sub-pixels) of two-dimensional array of pixels 602, which is often called a screen door effect.

Figure 6B:
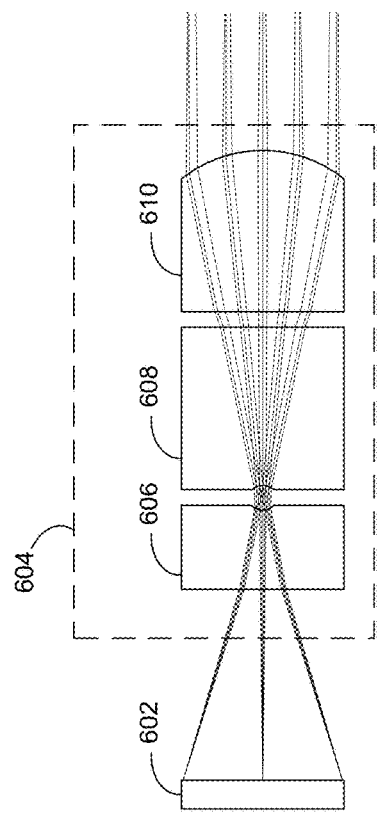
FIG. 6B is a zoomed-in view of the lens assembly shown in FIG. 6A.

FIG. 6B is a zoomed-in view of lens assembly 604 shown in FIG. 6A.

Lens assembly 604 includes multiple distinct optical elements. In some embodiments, lens assembly 604 includes two or more lenses. In some embodiments, lens assembly 604 includes three or more lenses, such as lens 606, lens 608, and lens 610, as shown in FIG. 6B. As shown in FIG. 6B, lens 606 and lens 608 are divergent lenses (e.g., plano-concave lenses) and lens 610 is a convergent lens (e.g., a plano-convex lens). The use of multiple lenses allows large demagnification, such as ¼× demagnification. In some embodiments, curved surfaces of the lenses are aspheric surfaces. This allows a high modulation transfer function.

In some embodiments, lens assembly 604 includes a configuration of an inverted telescope (e.g., an inverted refracting telescope). In some embodiments, lens assembly 604 includes a configuration of an inverse Galileo telescope (e.g., a combination of a divergent lens and a convergent lens), as shown in FIG. 6B. In some embodiments, lens assembly 604 includes a configuration of an inverse Keplerian telescope (e.g., a combination of two or more convergent lenses).

Figure 6C:
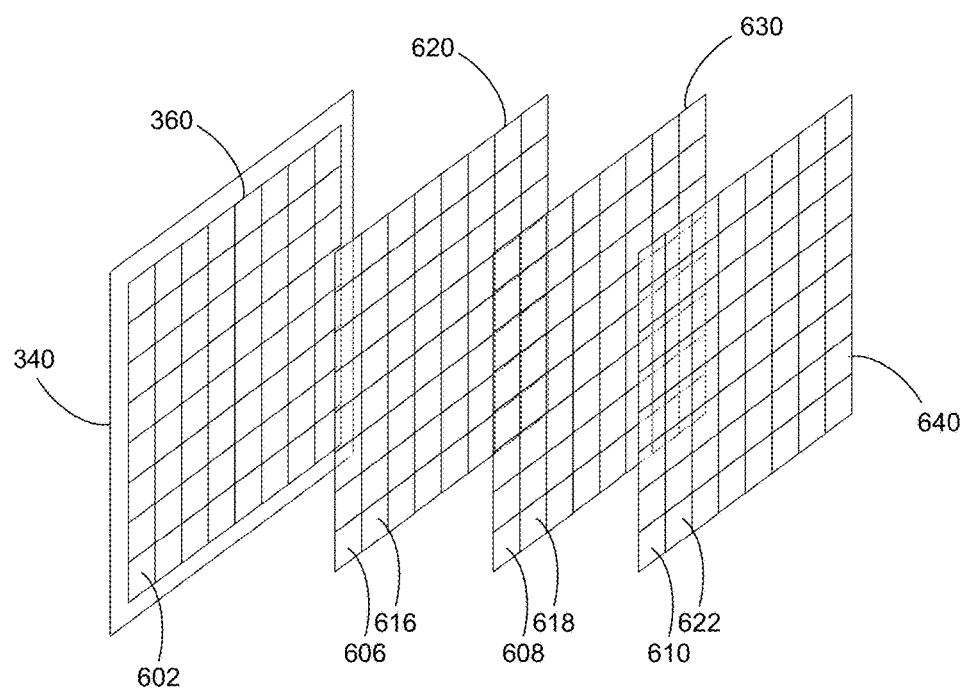
FIG. 6C is a perspective view of a two-dimensional array of tiles in accordance with some embodiments.

Although lenses 606, 608, and 610 are illustrated as single lenses in FIG. 6B, in some embodiments, one or more of lenses 606, 608, and 610 are included in one or more lens arrays. For example, the display device (e.g., 100, FIG. 1) includes three separate lens arrays (e.g., arrays 620, 630, and 640), which collectively form an array of lens assemblies, as shown in FIG. 6C. First array 620 includes a first lens (e.g., lens 606). Second array 630 is distinct and separate from first array 620 and includes a second lens (e.g., lens 608). Third array 640 is distinct and separate from first array 620 and second array 630, and includes a third lens (e.g., lens 610). The first lens, the second lens, and the third lens are included in a same lens assembly of a respective tile.

In some embodiments, a lens assembly includes baffles to reduce cross-talk. For example, one or more baffles reduce transmission of light from two-dimensional array of pixels 602 to lens 616, transmission of light from lens 606 to lens 618, transmission of light from 616 to lens 608, transmission of light from lens 608 to lens 622, and/or transmission of light from lens 618 to lens 610. Additionally or alternatively, in some cases, lenses in a respective array are configured so that a light entering one lens of the respective array is not transmitted to one or more adjacent lenses within the same respective array. For example, transmission of light from lens 606 to adjacent lens 616 (e.g., due to leaking, scattering, etc.) is reduced by a baffle. Similarly, transmission of light from lens 608 to adjacent lens 618 and transmission of light from lens 610 to adjacent lens 622 are reduced by one or more baffles.

Certain embodiments based on these principles are described below. Some of the details described above are not repeated for brevity.

In accordance with some embodiments, a display device includes two-dimensional array of tiles 340. Each tile includes a two-dimensional array of pixels (e.g., FIG. 3B). Each pixel is configured to output light so that the two-dimensional array of pixels outputs a respective pattern of light. Each tile also includes a lens assembly (e.g., 604 in FIG. 6B), of a two-dimensional array of lens assemblies (e.g., lens assemblies formed by multiple lens arrays as shown in FIG. 6C), configured to direct at least a portion of the respective pattern of light from the two-dimensional array of pixels to a pupil of an eye of a user. The lens assembly includes multiple distinct optical elements (e.g., lenses and/or diffraction elements, such as gratings).

In some embodiments, the display device includes at least two microlens arrays (e.g., arrays 620 and 640 in FIG. 6C). The lens assembly of a first tile of the two-dimensional array of tiles includes a first microlens (e.g., lens 606) of a first microlens array (e.g., array 620) of the at least two microlens arrays and a second microlens (e.g., lens 610) of a second microlens array (e.g., array 640) of the at least two microlens arrays, and both the first microlens and the second microlens are located on a first optical axis (e.g., FIG. 6B).

In some embodiments, the display device includes a third microlens array (e.g., array 630) located between the first microlens array (e.g., 620) and the second microlens array (e.g., array 640). The lens assembly of the first tile also includes a third microlens (e.g., lens 608) of the third microlens array (e.g., array 630), and the third microlens is located on the first optical axis between the first microlens and the second microlens (e.g., FIG. 6B).

In some embodiments, the lens assembly of a second tile of the two-dimensional array of tiles includes a fourth microlens (e.g., lens 616) of the first microlens array and a fifth microlens (e.g., lens 622) of the second microlens array, and both the fourth microlens and the fifth microlens are located on a second optical axis that is distinct from the first optical axis.

In some embodiments, the second microlens is configured to collimate the respective pattern of light output by the two-dimensional array of pixels of the first tile (e.g., light output from lens 610 is collimated, as shown in FIG. 6B).

In some embodiments, a distance from the two-dimensional array of pixels to the second microlens array is 9 mm or less. This allows reducing the size of the display device, facilitating its use in a wearable device. In some embodiments, a distance from the two-dimensional array of pixels to the second microlens array is 6 mm or less. In some embodiments, a distance from the two-dimensional array of pixels to the second microlens array is 5 mm or less. In some embodiments, a distance from the two-dimensional array of pixels to the second microlens array is 4 mm or less.

In some embodiments, the lens assembly in each tile is configured to project a demagnified image of the respective pattern of light from the two-dimensional array of pixels on a retina of the eye of the user. In some embodiments, the demagnified image on the retina of the eye of the user is at least four times smaller than the two-dimensional array of pixels.

In some embodiments, each tile includes one or more baffles configured to reduce transmission of light among tiles.

In some embodiments, the two-dimensional array of tiles is configured to direct the light from each pixel that outputs light to a pupil of an eye of the user.

In some embodiments, the display device is a head-mounted display device.

In some embodiments, the display device includes one or more processors coupled with the two-dimensional array of tiles and configured to activate a subset of the two-dimensional array of tiles for outputting, from at least the subset of the two-dimensional array of tiles, a collective pattern of light that is directed to the pupil of the eye of the user and projecting a demagnified image of the collective pattern of light on the retina of the eye.

In some embodiments, the one or more processors are configured to activate less than all of the tiles of the two-dimensional array of tiles.

In some embodiments, the subset of the two-dimensional array of tiles is a contiguous set of tiles of the two-dimensional array of tiles.

In some embodiments, a first tile of the two-dimensional array of tiles outputs a first pattern of light; a second tile, adjacent to the first tile, of the two-dimensional array of tiles outputs a second pattern of light; the first pattern of light corresponds to a first portion of the image; the second pattern of light corresponds to a second portion of the image; and the first portion of the image does not overlap at least partially with the second portion of the image.

In some embodiments, the collective pattern of light is configured to form an image on a retina of the eye of the user.

Figure 7A:
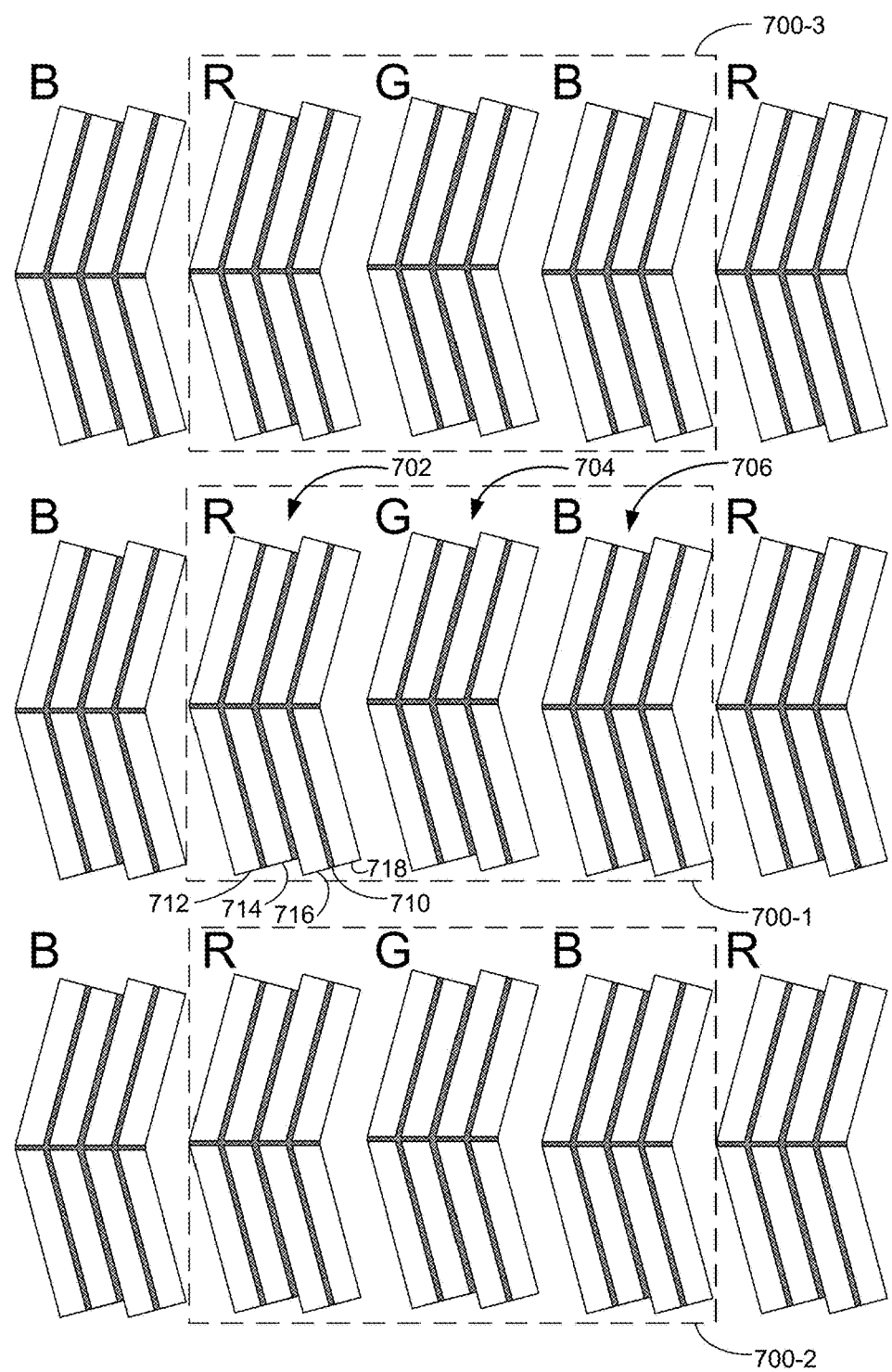
FIG. 7A is a plan view of a two-dimensional array of pixels in accordance with some embodiments.

FIG. 7A is a plan view of a two-dimensional array of pixels (e.g., 700-1, 700-2, and 700-3) in accordance with some embodiments.

In some embodiments, a pixel includes multiple subpixels for providing respective colors. In FIG. 7A, pixel 700-1 includes three subpixels, first subpixel 702 for providing red light, second subpixel 704 for providing green light, and third subpixel 706 for providing blue light.

FIG. 7A also illustrates that a subpixel is divided into multiple regions 712, 714, 716, and 718 by an electrode 710 (e.g., an in-plane switching line or a fringe field switching line).

Figure 7B:
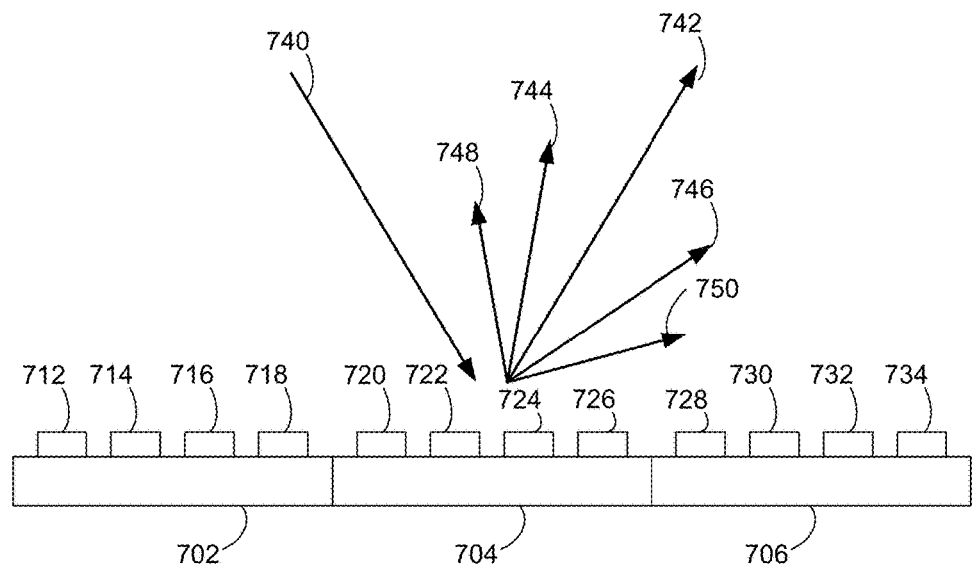
FIGS. 7B-7D are cross-sectional views of a pixel in accordance with some embodiments.
Figure 7C:
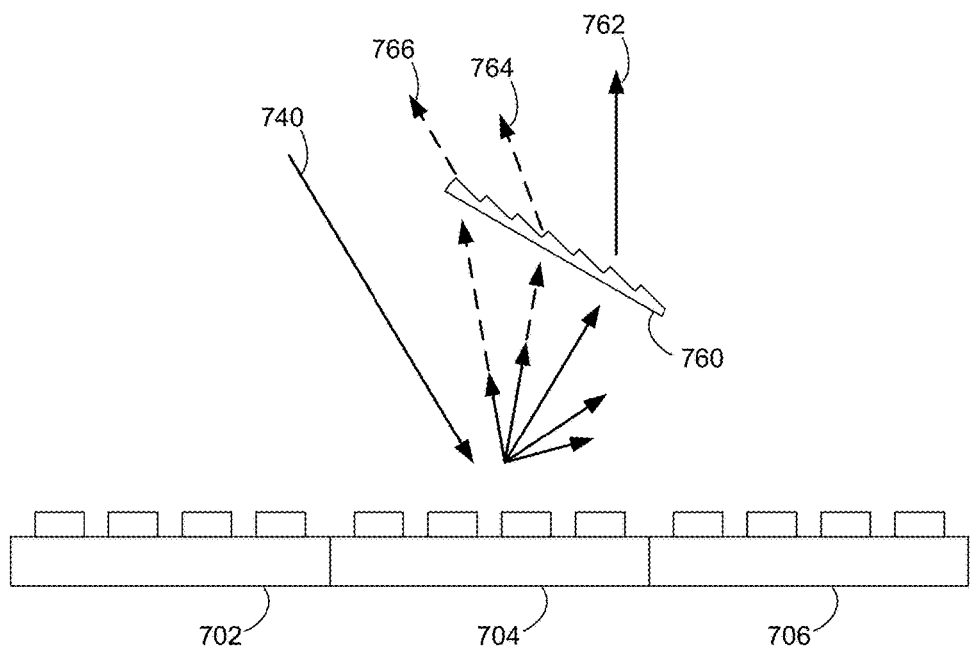
Figure 7D:
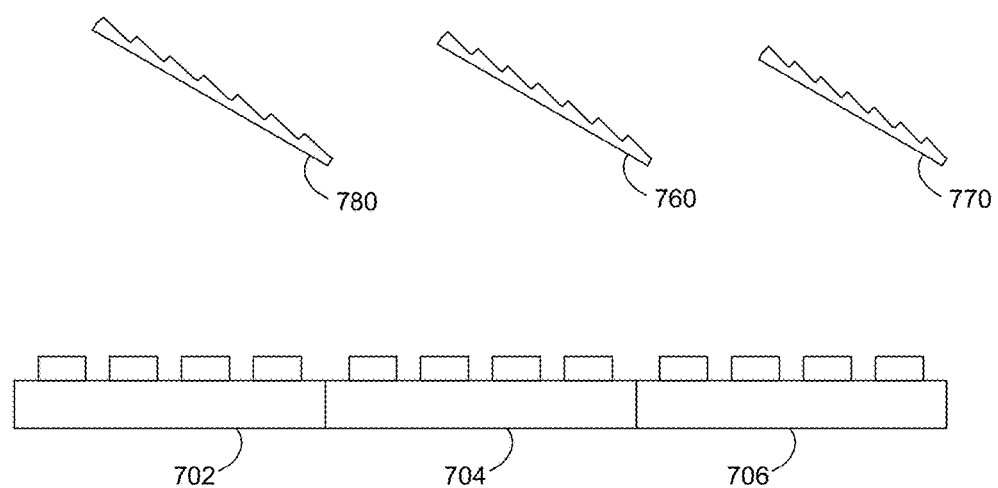

FIGS. 7B-7D are cross-sectional views of a pixel in accordance with some embodiments. The pixel includes subpixels 702, 704, and 706, and each subpixel includes multiple regions (e.g., regions separated by an electrode). For example, subpixel 702 includes regions 712, 714, 716, and 718, subpixel 704 includes regions 720, 722, 724, and 726, and subpixel 706 includes regions 728, 730, 732, and 734. Electrode 710 is omitted in FIGS. 7B-7D so as not to obscure other features illustrated in FIGS. 7B-7D.

A periodic structure within the subpixels can cause diffraction of light. In some cases, the multiple regions of a subpixel cause diffraction of light. For example, as shown in FIG. 7B, when subpixel 704 is lit by laser beam 740 (e.g., a green laser beam), a diffraction causes the laser light to propagate in multiple directions (e.g., zeroth order direction 742, first order directions 744 and 746, and second order directions 748 and 750). This reduces the quality of an image projected on the retina of the eye. The diffraction is more significant when the size of the subpixels is reduced.

FIG. 7C illustrates that diffraction grating 760 (e.g., a transmission grating) is positioned so that at least a portion of light diffracted from subpixel 704 enters diffraction grating 760. In some embodiments, diffraction grating 760 is a transmission blazed grating. Alternatively, a reflective diffraction grating may be used. Diffraction grating 760 further disperses light entering diffraction grating 760. For example, blazed diffraction grating 760 causes subsequent diffraction of light into a first order direction for each diffraction pattern. Because the incoming angle of each diffraction pattern is different, the subsequent diffraction by diffraction grating 760 further increases the angular separation of the diffracted patterns. This facilitates spatial separation of diffraction patterns (e.g., diffracted light other than light in the zeroth order direction is blocked by one or more optical components or the iris of the eye of the user).

FIG. 7D illustrates that each subpixel in a tile has a respective diffraction grating (e.g., subpixel 702 has diffraction grating 780, subpixel 704 has diffraction grating 760, and subpixel 706 has diffraction grating 770). Because diffraction gratings are configured to operate with light of a particular wavelength, in some embodiments, different diffraction gratings are used with multiple subpixels in a pixel. For example, diffraction grating 780 is configured for causing diffraction of red light, diffraction grating 760 is configured for causing diffraction of green light, and diffraction grating 770 is configured for causing diffraction of blue light.

In some embodiments, each pixel includes multiple diffraction gratings (e.g., FIG. 7D). In some embodiments, each pixel includes multiple subpixels, and each subpixel is conditionally illuminated with a respective laser beam (e.g., a subpixel is illuminated with a respective laser beam when the subpixel is to provide light toward the pupil of the eye of the user and the subpixel ceases to be illuminated with the respective laser beam when the subpixel is to remain dark) and is coupled with a respective diffraction grating for directing the respective laser beam to the pupil of the eye of the user.

Although lenses are not illustrated in FIGS. 7C and 7D, one or more lenses can be used with the diffraction gratings illustrated in FIGS. 7C and 7D. For example, in some embodiments, a lens assembly shown in FIGS. 6A-6C includes one or more diffraction gratings shown in FIGS. 7C and 7D. For brevity, these details are not repeated herein.

Figure 8:
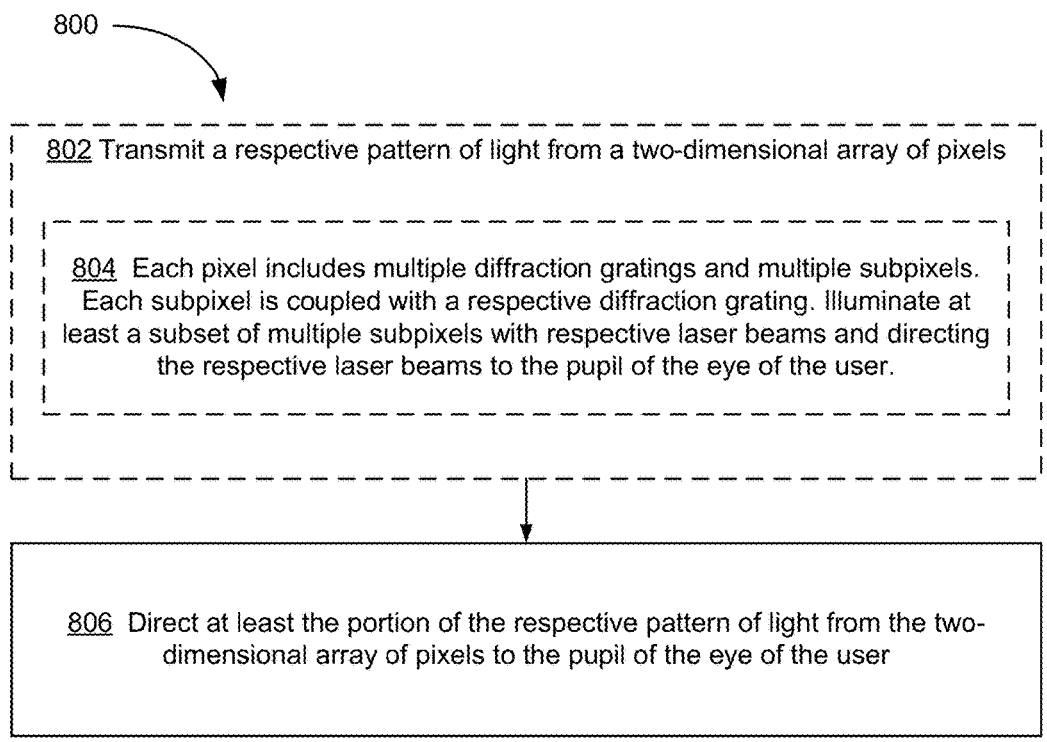
FIG. 8 is a flow diagram illustrating a method of transmitting a respective pattern of light from a two-dimensional array of pixels in accordance with some embodiments.

FIG. 8 is a flow diagram illustrating method 800 of transmitting a respective pattern of light from a two-dimensional array of pixels in accordance with some embodiments. Method 800 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344). Each pixel is configured to output light so that the two-dimensional array of pixels outputs a respective pattern of light (e.g., FIG. 3G). Each tile also includes a lens assembly (e.g., 604 in FIG. 6B), of a two-dimensional array of lens assemblies, configured to direct at least a portion of the respective pattern of light from the two-dimensional array of pixels to a pupil of an eye of a user (e.g., FIG. 6A). The lens assembly includes multiple distinct optical elements (e.g., lenses and/or gratings).

The device transmits (802) the respective pattern of light from the two-dimensional array of pixels. For example, at least a subset of the two-dimensional array of pixels generates light (e.g., the two-dimensional array of pixels is an array of light generating elements, such as light emitting diodes or organic light emitting diodes). Alternatively, at least a subset of the two-dimensional array of pixels reflects or transmits light provided to the two-dimensional array of pixels (e.g., liquid crystal matrices).

In some embodiments, each pixel includes multiple diffraction gratings and multiple subpixels (e.g., gratings 760, 770, and 780 and subpixels 702, 704, and 706). Each subpixel is coupled with a respective diffraction grating (e.g., subpixel 702 is coupled with grating 780, subpixel 704 is coupled with grating 760, and subpixel 706 is coupled with grating 770). The device illuminates (804) at least a subset of the multiple subpixels with respective laser beams and directs the respective laser beams to the pupil of the eye of the user (e.g., FIG. 7C).

The device directs (806) at least the portion of the respective pattern of light from the two-dimensional array of pixels to the pupil of the eye of the user. For example, lenses in the lens assembly are used to direct at least the portion of the respective pattern of light from the two-dimensional array of pixels to the pupil of the eye of the user, as shown in FIG. 6A.

Figure 9:
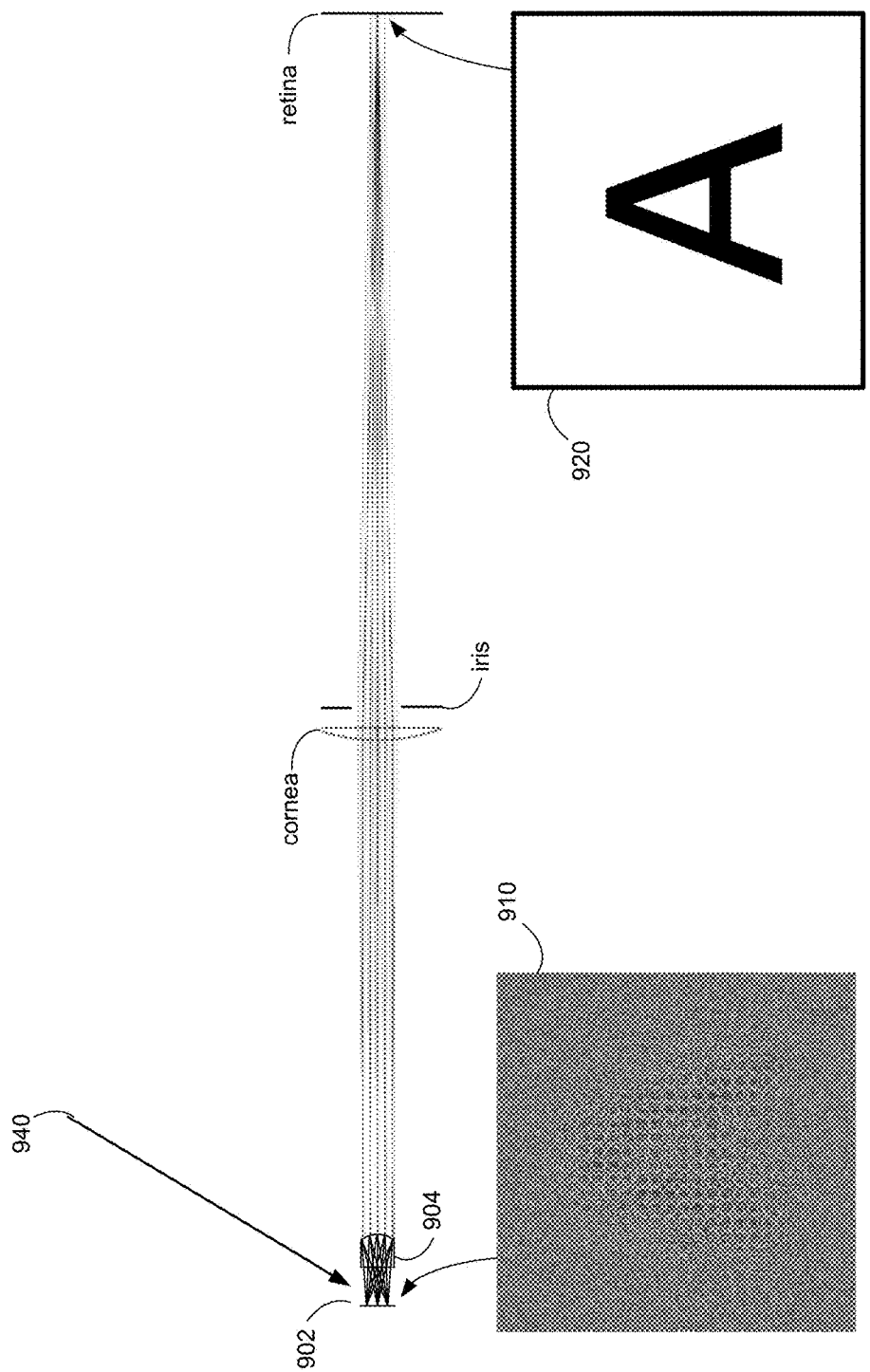
FIG. 9 is a schematic diagram of a tile in accordance with some embodiments.

FIG. 9 is a schematic diagram of a tile in accordance with some embodiments. As illustrated in FIG. 6C, a display device includes a two-dimensional array of tiles 360. For brevity, only one of the tiles is illustrated in FIG. 9. However, a person having ordinary skill in the art would understand that each tile of the rest of the two-dimensional array of tiles has an analogous structure and operates in an analogous manner. These details are not repeated herein for brevity.

In some embodiments, the tile includes a two-dimensional array of pixels 902. Each pixel is configured to output light so that the two-dimensional array of pixels outputs a respective pattern of light. The tile also includes lens 904. In some embodiments, lens 904 is part of a two-dimensional array of lenses. Lens 904 is configured to direct at least a portion of the respective pattern of light from the two-dimensional array of pixels to a pupil of an eye of a user. In some embodiments, the tile includes a two-dimensional array of lenses. For example, the tile may have the same number of pixels and lenses so that each pixel is coupled with a respective lens. In some embodiments, the tile includes a lens and a single pixel (e.g., the tile includes not more than one pixel). In some embodiments, each single lens is integrated with a respective pixel.

As discussed above, in some cases, light emitted from the two-dimensional array of pixels is caused to undergo diffraction (e.g., due to the period structures in a pixel and/or due to the size of subpixels), which reduces the quality of image formed on a retina of the eye.

In order to reduce the effect of diffraction, the two-dimensional array of pixels is configured to output the respective pattern of light that corresponds to at least a portion of hologram 910. Fine structures in hologram 910, due to diffraction, smooth out one another, thereby reducing the effect of diffraction. As a result, a high quality image 920 is formed on the retina of the eye.

FIG. 9 also illustrates that the two-dimensional array of pixels is illuminated with one or more laser beams 940. Because a laser beam is generally coherent, it facilitates smoothing of the fine structures through interference.

Figure 10:
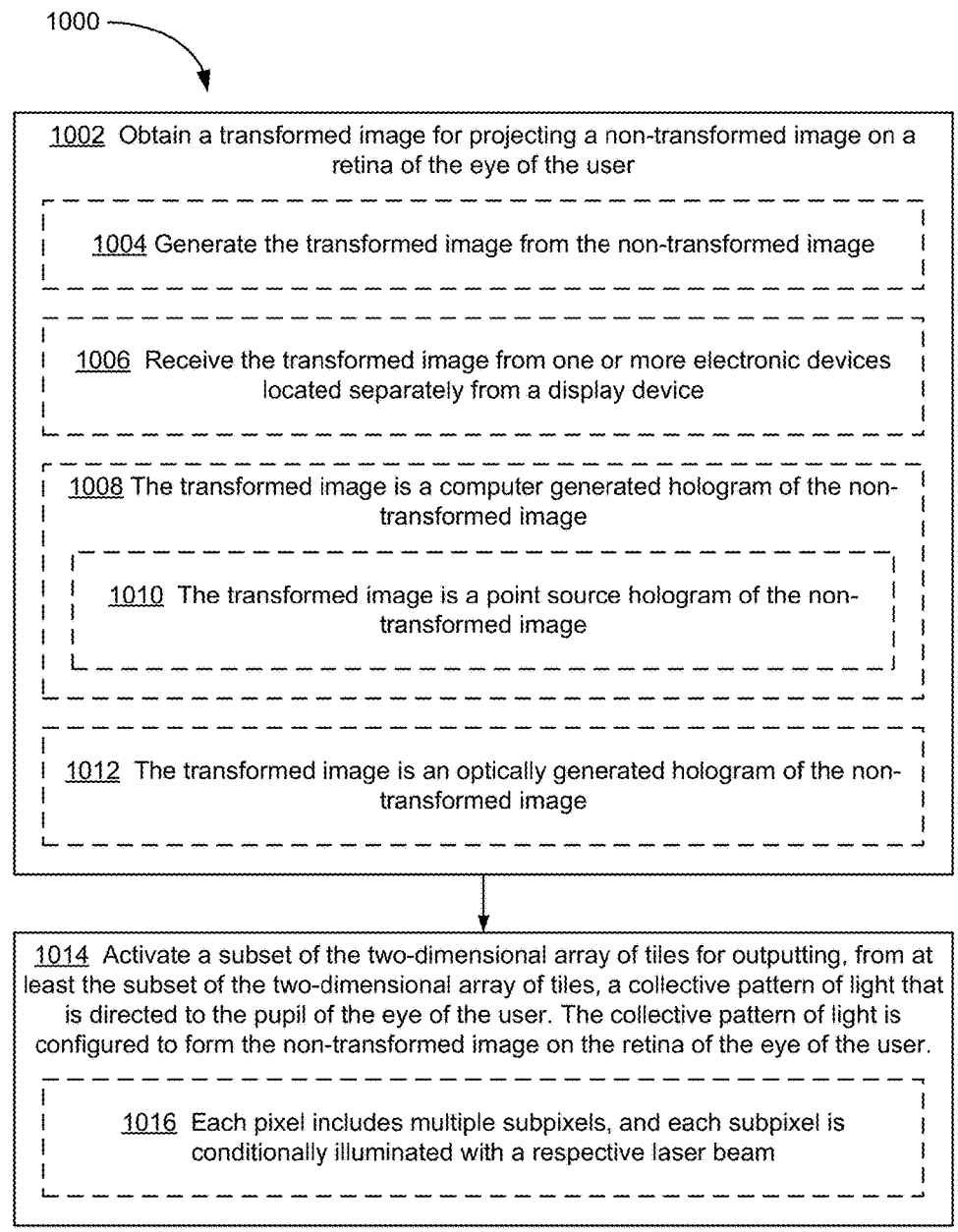
FIG. 10 is a flow diagram illustrating a method of forming a non-transformed image by projecting a transformed image in accordance with some embodiments.

FIG. 10 is a flow diagram illustrating method 1000 of forming a non-transformed image by projecting a transformed image in accordance with some embodiments. Method 1000 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344). Each pixel is configured to output light so that the two-dimensional array of pixels outputs a respective pattern of light (e.g., FIG. 3G). Each tile also includes a lens (e.g., 342), of a two-dimensional array of lenses, configured to direct at least a portion of the respective pattern of light from the two-dimensional array of pixels to a pupil of an eye of a user (e.g., FIG. 3D).

The device obtains (1002) a transformed image (e.g., hologram 910) for forming a non-transformed image (e.g., image 920) on a retina of the eye of the user. In some embodiments, one or more processors (e.g., processor 216) of the device obtain the transformed image for forming the non-transformed image on the retina. The transformed image is distinct from the non-transformed image. For example, the transformed image is not an enlarged or reduced image of the non-transformed image. In addition, the transformed image is not a rotated or flipped (e.g., horizontally and/or vertically) image of the non-transformed image. The transformed image is not a color-adjusted image of the non-transformed image. Rather, in some embodiments, the transformed image is a hologram of the non-transformed image.

In some embodiments, the device generates (1004) the transformed image from the non-transformed image. For example, the device generates a hologram of the non-transformed image (e.g., using adjustment module 218, FIG. 2). In some embodiments, obtaining the transformed image includes generating the transformed image from the non-transformed image.

In some embodiments, the device receives (1006) the transformed image from one or more electronic devices located separately from the display device. For example, the device receives the transformed image from console 210, FIG. 2). In some embodiments, obtaining the transformed image includes receiving the transformed image from the one or more electronic devices located separately from the display device.

In some embodiments, the transformed image is (1008) a computer generated hologram of the non-transformed image. For example, processor 216 digitally generates a hologram of the non-transformed image.

In some embodiments, the transformed image is (1010) a point source hologram of the non-transformed image (e.g., hologram 910, FIG. 9). For each pixel, the device determines a projection of the pixel based on a point spread function. Subsequently, the device determines a superposition of the projections to obtain the point source hologram.

In some other embodiments, the transformed image is a Fourier transform hologram. The device performs a Fourier transform of the non-transformed image to obtain the transformed image.

In some embodiments, the transformed image is (1012) an optically generated hologram of the non-transformed image. For example, when an image plane is positioned at a focal length from a lens, away from the eye, and the optically generated hologram is formed at a focal length from the lens, toward the eye.

The device activates (1014) a subset of the two-dimensional array of tiles for outputting, from at least the subset of the two-dimensional array of tiles, a collective pattern of light that is directed to the pupil of the eye of the user. In some embodiments, the collective pattern of light corresponds to the transformed image. The collective pattern of light is configured to form the non-transformed image on the retina of the eye of the user. In some embodiments, the one or more processors of the device activate the subset of the two-dimensional array of tiles in accordance with the transformed image for outputting, from at least the subset of the two-dimensional array of tiles, the collective pattern of light that is directed to the pupil of the eye of the user.

In some embodiments, each pixel includes (1016) multiple subpixels, and each subpixel is conditionally illuminated with a respective laser beam (e.g., laser beam 940, FIG. 9).

Figure 11A:
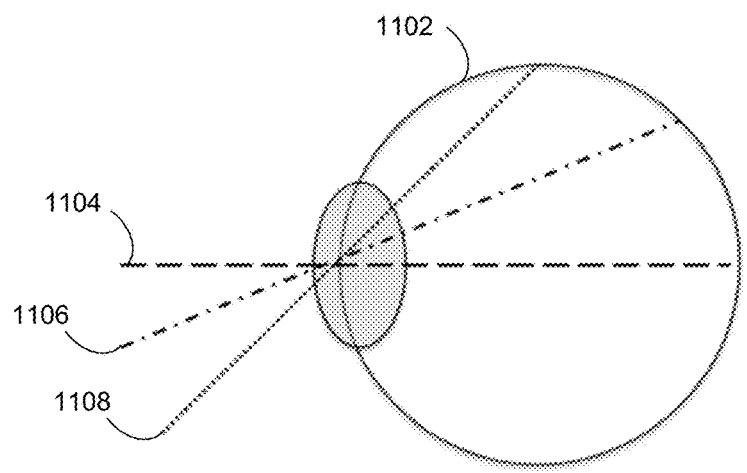
FIGS. 11A and 11B are schematic diagrams illustrating back reflection of light entering an eye in accordance with some embodiments.
Figure 11B:
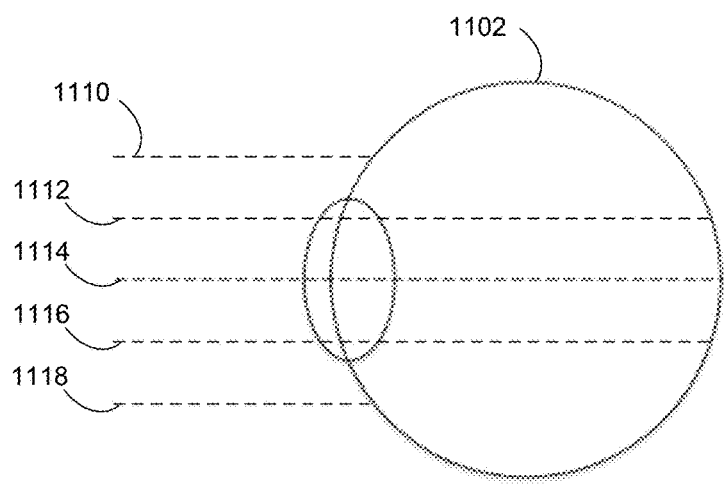

FIGS. 11A and 11B are schematic diagrams illustrating back reflection of light entering eye 1102 in accordance with some embodiments.

In some embodiments, a retina of an eye reflects infrared light (e.g., a deer in the headlights). In particular, a central region of the retina has a higher reflectivity than a non-central region of the retina. For example, in FIG. 11A, ray 1104 of light hitting a central region of the retina is reflected better than rays 1106 and 1108 of light hitting non-central regions of the retina. Thus, by measuring the intensity of the reflected light, an angle (or a gaze) of eye 1102 can be determined.

In FIG. 11B, rays 1112, 1114, and 116 of light entering eye 1102 are reflected better by the retina of eye 1102 than rays 1110 and 1118 of light, which are reflected by a sclera of eye 1102. In addition, ray 1114 of light that is reflected by a central region of eye 1102 is reflected better than rays 1112 and 1116 of light that are reflected by non-central regions of eye 11102.

Figure 11C:
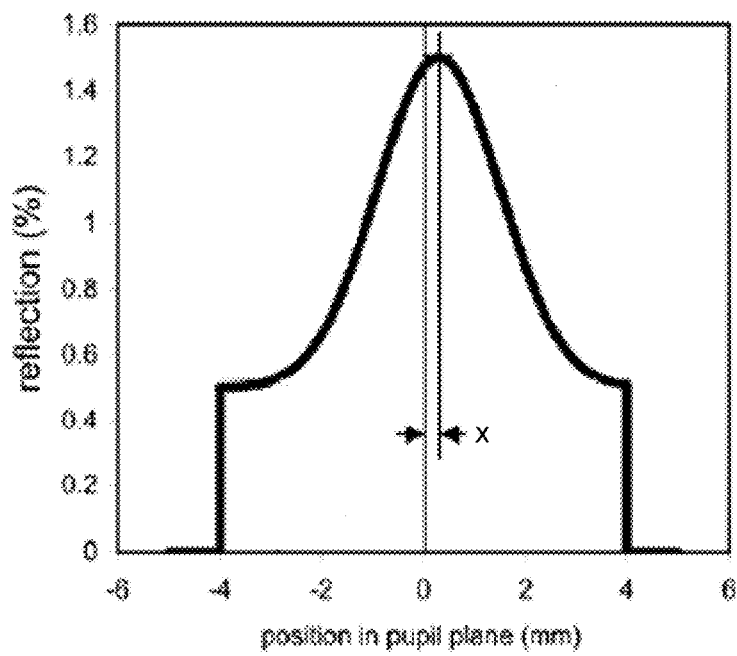
FIG. 11C is a graph representing intensity of light reflected by an eye in accordance with some embodiments.

FIG. 11C is a graph representing intensity of light reflected by an eye in accordance with some embodiments. As shown in FIG. 11C, light reflected by a central region of an eye has a higher intensity than a non-central region of the eye. Thus, in some embodiments, a location of the eye (e.g., a location of a pupil of the eye) is determined from a profile of the intensity of light reflected by the eye (e.g., a location with the highest intensity of reflected light corresponds to a position of a center of the eye).

Figure 11D:
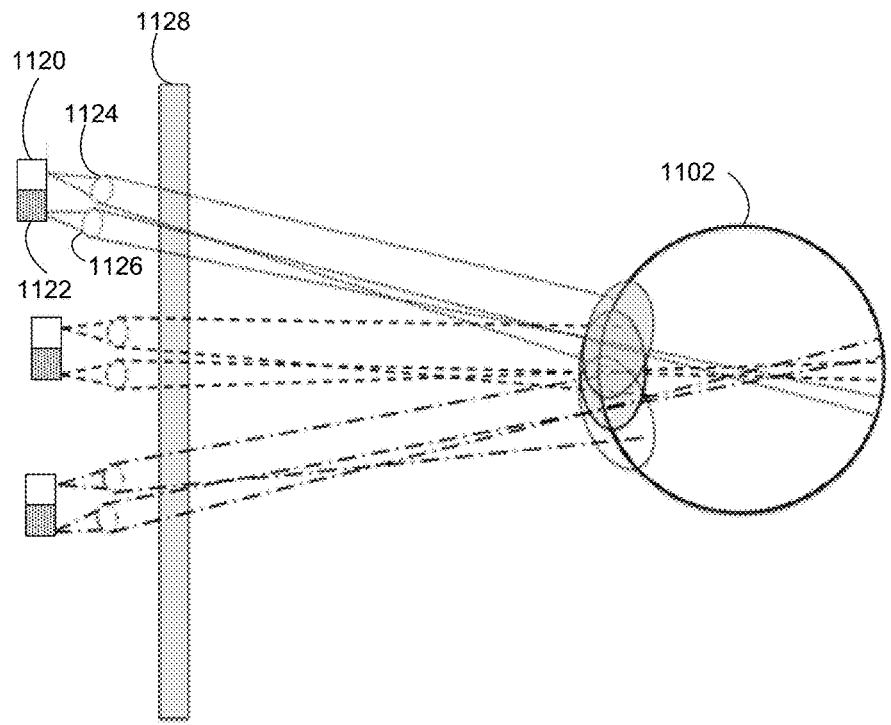
FIGS. 11D-11F are schematic diagrams illustrating methods of determining a location of a pupil in accordance with some embodiments.
Figure 11E:
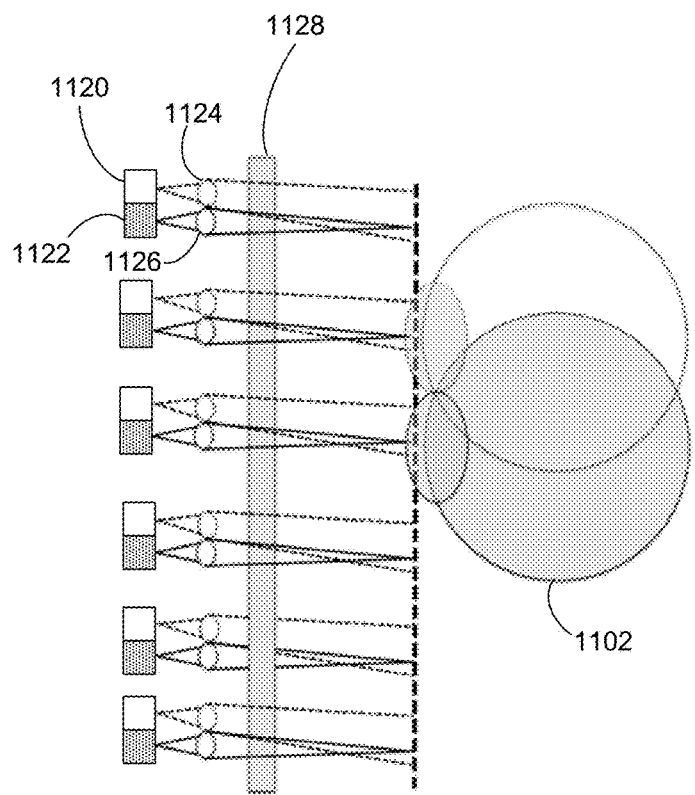
Figure 11F:
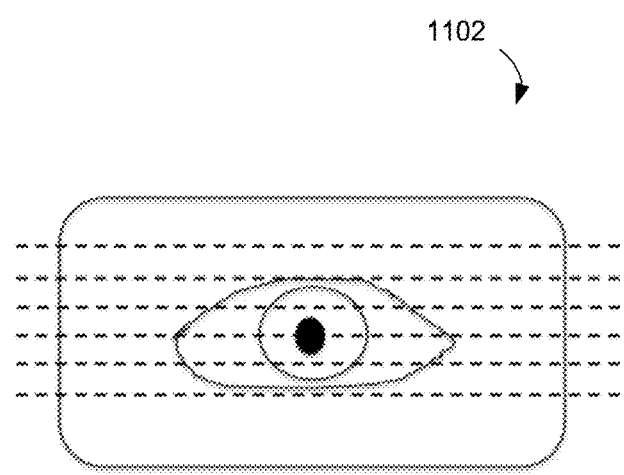

FIGS. 11D-11F are schematic diagrams illustrating methods of determining a location of a pupil in accordance with some embodiments.

In FIG. 11D, emitters 1122 and sensors 1120 are used to determine a location of a pupil of eye 1102. In some embodiments, as shown in FIG. 11D, one emitter 1122 is paired with one sensor 1120 to determine the location of the pupil of eye 1102. For example, emitter 1122 is configured to emit non-visible light (e.g., infrared light). Sensor 1120 is configured to receive reflected non-visible light (e.g., non-visible light reflected by eye 1102). From a profile of the intensity of light received by sensors 1120, an angle (or a gaze) of eye 1102 is determined. In some embodiments, when light from emitters 1122 is directed toward a pupil of eye 1102, sensor 1120 with a highest intensity of the reflected light is determined to correspond to the angle (or the gaze) of eye 1102. In some embodiments, the device includes a single emitter. In some embodiments, the device includes a single sensor. In some embodiments, sensors 1120 are arranged in an array (e.g., the device includes an array of sensors). In some embodiments, emitters 1122 are arranged in an array (e.g., the device includes an array of emitters).

In some embodiments, as shown in FIG. 11D, the display device includes lens 1124 and/or lens 1126. Lens 1126 is configured to direct light from emitter 1122 toward eye 1102. Lens 1124 is configured to direct light reflected by eye 1102 toward sensor 1120.

In some embodiments, the display device includes one or more polarizers 1128 (e.g., a combination of a linear polarizer and a quarter wave plate) to reduce specular reflection of light by a cornea of eye 1102.

In FIG. 11E, an array of emitter-sensor pairs is used to determine a position of eye 1102. Lens 1126 is configured to direct light independently of a location of eye 1102 (e.g., forward). In FIG. 11E, light from an array of emitters 1122 is directed forward, instead of being directed toward a single location (e.g., a pupil of eye 1102) as shown in FIG. 11D. In some embodiments, sensor 1120 with a highest intensity of the reflected light is determined to correspond to a position of eye 1102 (or a position of a pupil of eye 1102).

FIG. 11F illustrates that, in some embodiments, an intensity of light reflected from different positions of eye 1102 is sequentially measured. For example, at least a portion of the eye is linearly scanned (e.g., in a raster pattern).

Figure 11G:
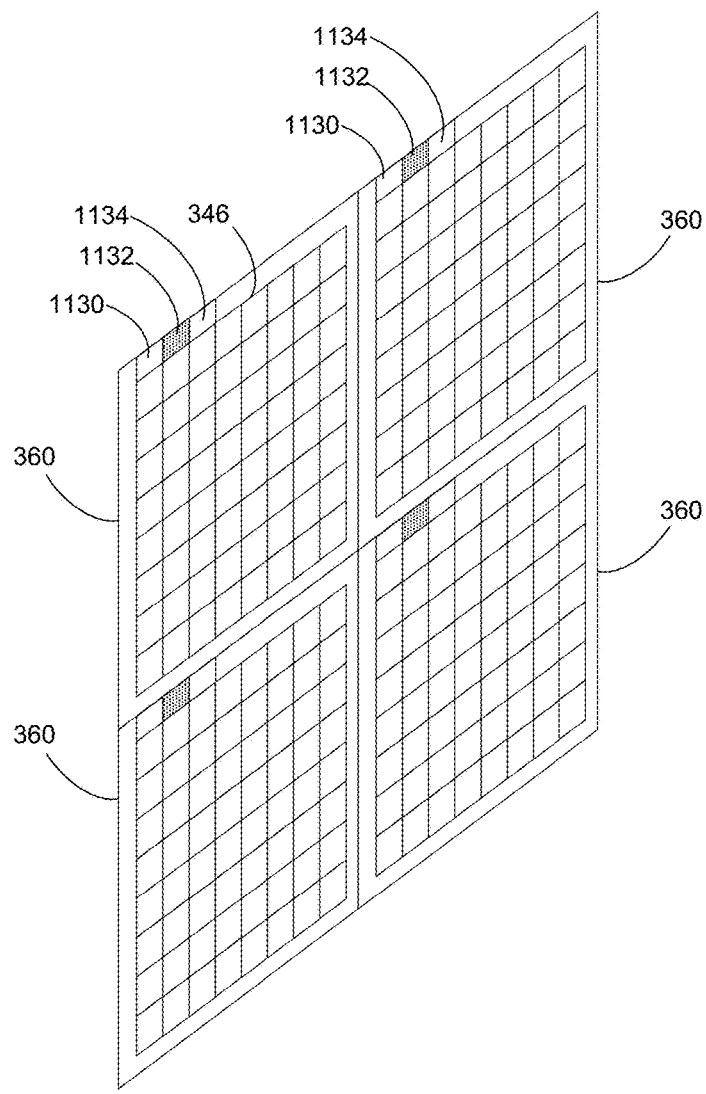
FIG. 11G is a perspective view of a portion of a two-dimensional array of tiles in accordance with some embodiments.

FIG. 11G is a perspective view of a portion of a two-dimensional array of tiles 360 in accordance with some embodiments. As shown in FIG. 11G, each tile 360 in FIG. 11G includes a two-dimensional array of pixels 346 formed on a substrate. FIG. 11G also illustrates that each tile 360 includes emitter 1132 and one or more sensors 1130 and 1134 formed on the same substrate. Thus, the two-dimensional array of pixels 346, emitter 1132, and one or more sensors 1130 and 1134 are located on a same plane. Although FIG. 11G shows that each tile 360 has one emitter 1132, in some embodiments, each tile 360 has multiple emitters (e.g., each tile 360 may have as many emitters as a number of pixels in tile 360). In some embodiments, multiple tiles collectively have one emitter (e.g., a group of two or four tiles has only one emitter).

Figure 11H:
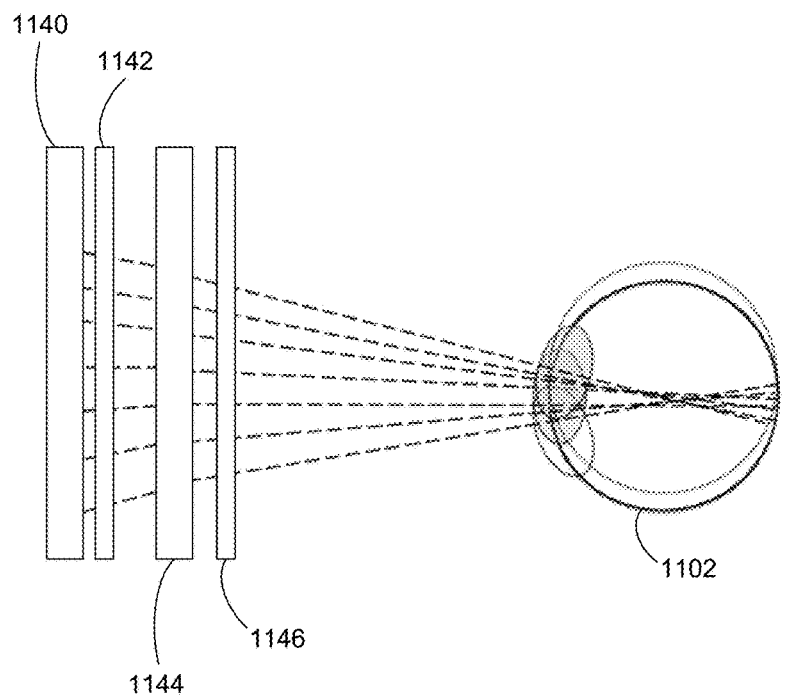
FIG. 11H is a schematic diagram of a display device in accordance with some embodiments.

FIG. 11H is a schematic diagram of a display device in accordance with some embodiments.

The display device includes sensor panel 1140 that includes one or more emitters (e.g., an array of emitters) and one or more sensors (e.g., an array of sensors). In some embodiments, the emitters are interspersed within the sensors.

In some embodiments, the display device also includes array 1142 of lenses configured for directing light from emitters toward eye 1102 and direct light, reflected by eye 1102, toward sensors.

The display device includes two-dimensional array 1144 of tiles. In some embodiments, two-dimensional array 1144 of tiles is transparent to infrared light. Thus, infrared light emitted by emitters in sensor panel 1140 passes through two-dimensional array 1144 of tiles toward eye 1102. Similarly, infrared light, reflected by eye 1102, passes through two-dimensional array 1144 of tiles toward sensor panel 1140.

In some embodiments, the display device also includes array 1146 of lenses (or an array of lens assemblies), which are described above. For brevity, the detailed description of array 1146 of lenses is not repeated herein.

Figure 11I:
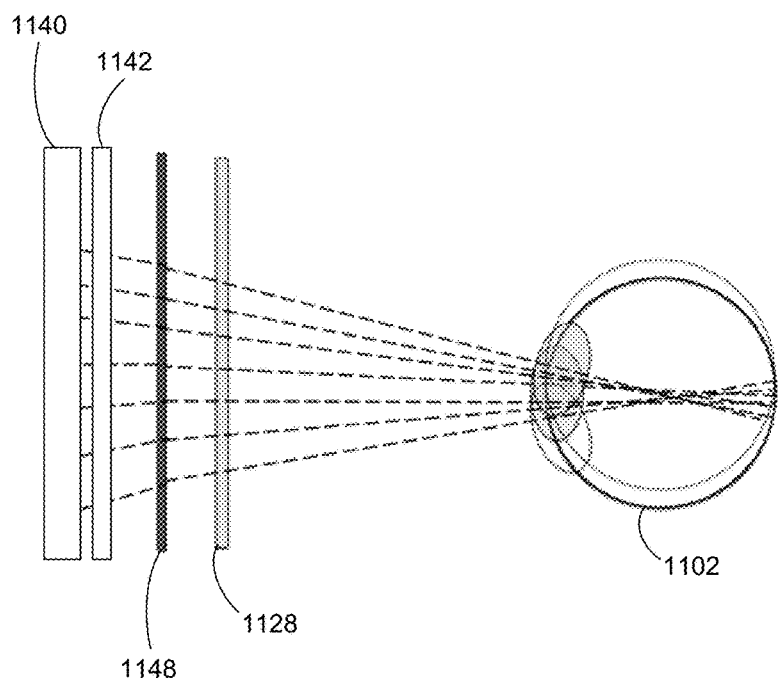
FIG. 11I is a schematic diagram of a display device in accordance with some embodiments.

FIG. 11I is a schematic diagram of a display device in accordance with some embodiments.

In FIG. 11I, the display device includes electro-optics 1148 (or an array of electro-optical elements). Electro-optics 1148 is configured to adjust focusing and/or steering of light propagating from and/or toward sensor panel 1140. In some embodiments, electro-optics 1148 includes a liquid crystal layer.

In some embodiments, the two-dimensional array of tiles is integrated in sensor panel 1140. Thus, the same lens array 1142 is used for directing light from emitters and light from the two-dimensional array of pixels. This reduces, or eliminates, the need for complex processing of image collected by the sensors, because the sensors are collocated with the display pixels. Light from a display pixel and light collected by a sensor adjacent to the display pixel follow paths, that are proximate to each other, through a same lens.

Figure 11J:
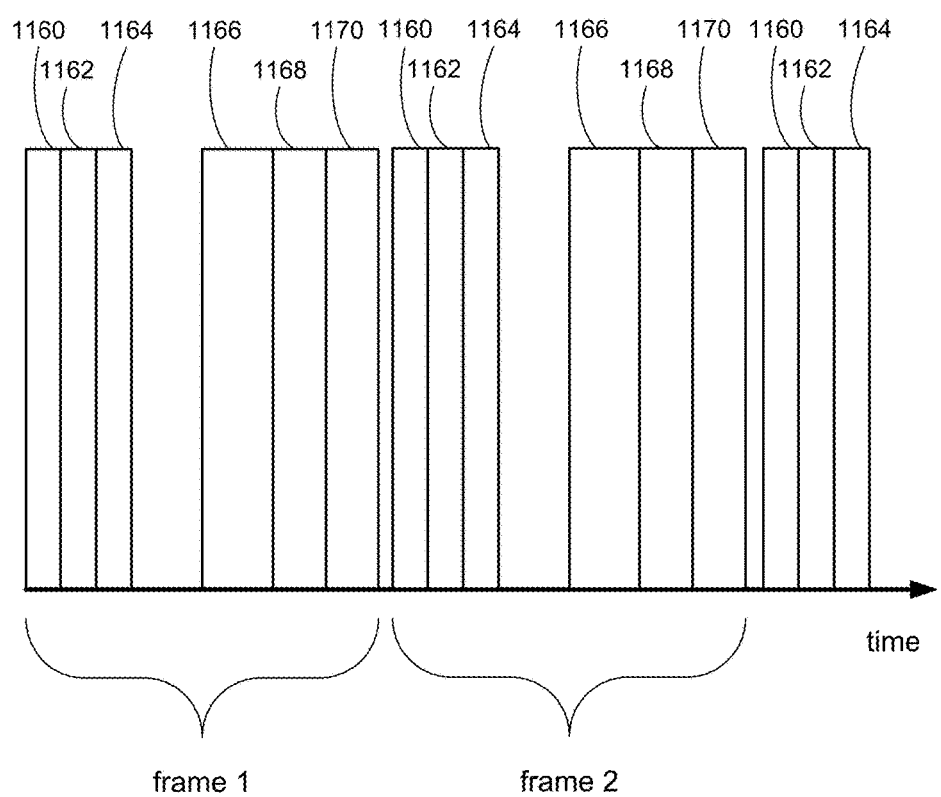
FIG. 11J is a timing diagram illustrating an operation of an eye tracker in accordance with some embodiments.

FIG. 11J is a timing diagram illustrating an operation of an eye tracker in accordance with some embodiments.

In FIG. 11J, the operation of the eye tracker is illustrated with respect to frames. Each frame corresponds to preselected time duration (e.g., 10 ms). A series of operations is performed within a single frame.

In some embodiments, a reset voltage (e.g., a global pixel voltage) is provided (1160) to the pixels, which clears (or resets) liquid crystals in pixels. Subsequently, an eye tracking operation is performed (1162) to determine a location of a pupil of an eye (and an angle of the eye). Information about the location of the eye (e.g., the location of the pupil of the eye and/or the angle of the eye) is provided (1164) to one or more processors (e.g., processor(s) 216, FIG. 2). In some embodiments, the one or more processors subsequently render one or more frames for display.

Pixel voltages are applied (1166) to the pixels, which initiates placing the pixels in respective states for displaying a rendered frame. In some embodiments, voltages are applied to activate electro-optic components (e.g., liquid crystal lenses and/or beam steerers). In some embodiments, the display device waits (1168) until liquid crystals in respective pixels settle. Subsequently, the display device turns on a backlight so that a respective pattern of light is output from a respective tile.

In some embodiments, these steps are repeated for subsequent frames.

Certain embodiments based on these principles are described below.

In accordance with some embodiments, display device 100 includes a two-dimensional array of tiles (e.g., two-dimensional array of tiles 340 in FIG. 3B). Each tile (e.g., tile 360 in FIG. 3C) includes a two-dimensional array of pixels (e.g., two-dimensional array 340 of pixels 346 in FIG. 3C). Each pixel is configured to output light so that the two-dimensional array of pixels outputs a respective pattern of light (e.g., two-dimensional array of pixels 344A in FIG. 3G outputs a pattern of light that corresponds to a top portion of a triangle, two dimensional array of pixels 344B in FIG. 3G outputs a pattern of light that corresponds to a middle portion of the triangle, and two-dimensional array of pixels 344C in FIG. 3G outputs a pattern of light that corresponds to a bottom portion of the triangle). The tile also includes a lens (e.g., lens 342 in FIG. 3C), of a two-dimensional array of lenses, configured to direct at least a portion of the respective pattern of light from the two-dimensional array of pixels to a pupil of an eye of a user. Display device 100 includes one or more sensors for determining a location of the pupil of the eye of the user (e.g., sensor plate 1140 in FIG. 11H). In some embodiments, display device 100 includes an array of sensors for determining the location of the pupil of the eye of the user.

In some embodiments, display device 100 includes a substrate (e.g., sensor plate 1140). The two-dimensional array of pixels and the one or more sensors are located on the same substrate. In some embodiments, the array of sensors is located on the same substrate.

In some embodiments, each tile includes one or more sensors. In some embodiments, each tile includes at least one sensor of the array of sensors (e.g., each tile 360 includes sensor 1130, FIG. 11G). In some embodiments, display device 100 includes only one sensor for determining the location of the pupil of the eye of the user.

In some embodiments, display device 100 includes an array of emitters configured to emit non-visible light (e.g., an array of emitters 1132 in FIG. 11G). Each emitter is coupled with a respective sensor (e.g., each emitter 1132 is coupled with respective sensor 1130). In some embodiments, each emitter is coupled with a respective sensor of the array of sensors. In some embodiments, display device 100 includes only a single emitter.

In some embodiments, display device 100 includes an array of emitters (e.g., an array of emitters 1132 in FIG. 11G) configured to emit non-visible light (e.g., infrared light). Each emitter is coupled with a respective group of multiple sensors located adjacent to the emitter (e.g., in FIG. 11G, each emitter 1132 is coupled with adjacent sensors 1130 and 1134). In some embodiments, each emitter is coupled with a respective group of multiple sensors, of the array of sensors, located adjacent to the emitter.

In some embodiments, display device 100 includes multiple arrays of sensors for determining the location of the pupil of the eye of the user (e.g., an array of sensors 1130 and a separate array of sensors 1134). A respective array is separate from the rest of the multiple arrays of sensors. This allows a shorter interval between eye tracking operations. For example, each sensor may have a certain delay in collecting light received by the sensors so that an interval between determining positions of a pupil of an eye is 10 ms. By using a first half of the sensors (e.g., sensors 1130) concurrently and subsequently using a second half of the sensors (e.g., sensors 1134) together, the interval between determining positions of the pupil of the eye is reduced to 5 ms (=10 ms/2). When three groups of sensors are used, the interval between determining positions of the pupil of the eye is reduced to 3.3 ms 10 ms/3).

In some embodiments, display device 100 includes one or more polarizers (e.g., one or more polarizers 1128 in FIG. 11D) configured to reduce light reflected from a cornea of the eye of the user toward the one or more sensors. In some embodiments, display device 100 includes one or more polarizers (e.g., one or more polarizers 1128 in FIG. 11D) configured to reduce light reflected from a cornea of the eye of the user toward the array of sensors.

In some embodiments, display device 100 includes one or more processors (e.g., processor(s) 216, FIG. 2) coupled with the two-dimensional array of tiles and configured to select a subset of the two-dimensional array of tiles based on the location of the pupil of the eye of the user and activate the subset of the two-dimensional array of tiles for outputting, from at least the subset of the two-dimensional array of tiles, a collective pattern of light that is directed to the pupil of the eye of the user. For example, when the position of the pupil of the eye is determined, tiles that are located far from the position of the pupil of the eye are not selected. Because the tiles that are located far from the position of the pupil of the eye are not likely to output light that will enter the pupil of the eye of the user, by keeping the tiles that are located far from the position of the pupil of the eye off, the display device can save power.

In some embodiments, the one or more processors (e.g., processor(s) 216, FIG. 2) are configured to activate the one or more sensors for determining the location of the pupil of the eye of the user between activating the subset of the two-dimensional array of tiles. For example, the one or more sensors are activated in frame 2 (FIG. 11J) between determining activating a subset of a two-dimensional array of tiles in frame 1 and activating a subset of the two-dimensional array of tiles in frame 2. In some embodiments, the one or more processors are configured to activate the array of sensors for determining the location of the pupil of the eye of the user between activating the subset of the two-dimensional array of tiles.

In some embodiments, the one or more processors (e.g., processor(s) 216, FIG. 2) are configured to concurrently activate less than all of the sensors for determining the location of the pupil of the eye of the user. In some embodiments, the one or more processors are configured to activate at least a subset of the array of sensors concurrently for determining the location of the pupil of the eye of the user. For example, as shown in FIG. 11E, multiple sensors are activated concurrently to determine the location of the pupil of the eye of the user.

In some embodiments, the one or more processors are configured to sequentially activate at least a subset of the array of sensors for determining the location of the pupil of the eye of the user. For example, as shown in FIG. 11D, multiple sensors are activated to determine the angle (or the gaze) of eye 1102. In some embodiments, the multiple sensor are activated sequentially (e.g., in a raster pattern). In some embodiments, the multiple sensors are activated concurrently.

In some embodiments, the one or more processors are configured to sequentially activate less than all of the sensors for determining an angle of the pupil of the eye of the user. In some embodiments, the one or more processors are configured to activate at least a subset of the array of sensors sequentially for determining an angle of the pupil of the eye of the user. In some embodiments, the subset of the array of sensors is selected based on the location of the pupil of the eye of the user (e.g., the location of the pupil of the eye of the user is determined by activating at least a subset of the array of sensors concurrently, followed by sequentially activating the subset of the array of sensors for determining the angle of the pupil of the eye).

In some embodiments, the one or more processors are configured to concurrently activate at least a subset of the sensors for determining the location of the pupil of the eye of the user and subsequently activate sequentially at least a subset of the sensors for determining an angle of the pupil of the eye of the user. In some embodiments, the one or more processors are configured to concurrently activate at least a subset of the array of sensors for determining the location of the pupil of the eye of the user and subsequently activate sequentially at least a subset of the array of sensors for determining an angle of the pupil of the eye of the user.

In some embodiments, the one or more processors are configured to adjust the location of the pupil of the eye of the user for an interpupilary distance of the pupil of the eye of the user. For example, when the interpupilary distance of the pupil of the eye of the user is known (e.g., based on a manual input or a manual adjustment of the display device), the location of the pupil of the eye of the user is estimated based on the interpupilary distance of the pupil of the eye of the user.

Figure 12:
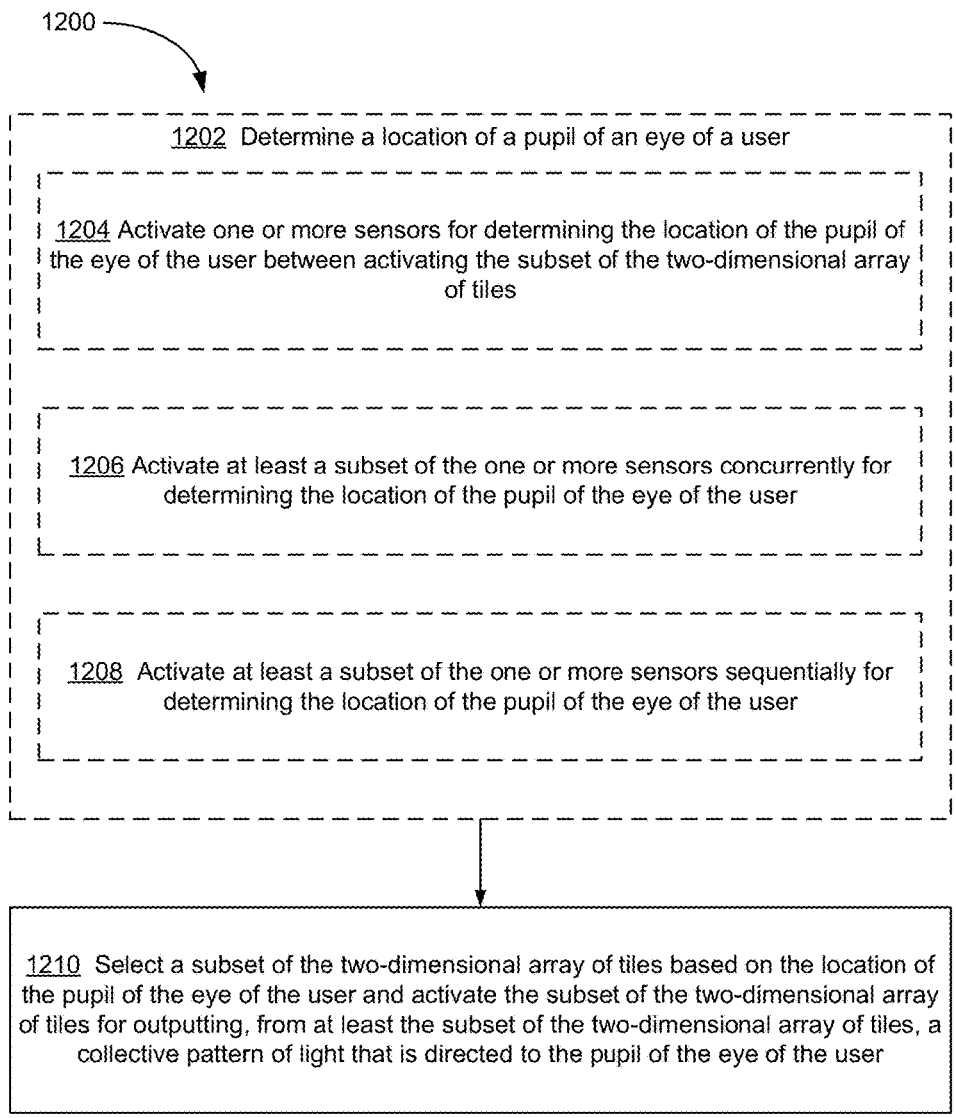
FIG. 12 is a flow diagram illustrating a method of activating a two-dimensional array of tiles based on a location of a pupil of an eye in accordance with some embodiments.

FIG. 12 is a flow diagram illustrating method 1200 of activating a two-dimensional array of tiles based on a location of a pupil of an eye in accordance with some embodiments. Method 1200 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344). Each pixel is configured to output light so that the two-dimensional array of pixels outputs a respective pattern of light (e.g., FIG. 3G). Each tile also includes a lens (e.g., 342), of a two-dimensional array of lenses, configured to direct at least a portion of the respective pattern of light from the two-dimensional array of pixels to a pupil of an eye of a user (e.g., FIG. 3D). The display device also includes one or more sensors (e.g., an array of sensors) for determining a location of the pupil of the eye of the user.

In some embodiments, the display device determines (1202) a location of a pupil of an eye of the user. For example, the display device sends non-visible light (e.g., infrared light) toward the eye of the user, and collects non-visible light that is reflected by the eye of the user. Based on an intensity profile of the light reflected by the eye of the user, the display device determines the location of the pupil of the eye of the user (e.g., a location with the highest intensity of the reflected light corresponds to the location of the pupil of the eye of the user).

In some embodiments, the display device activates (1204) the one or more sensors for determining the location of the pupil of the eye of the user between activating the subset of the two-dimensional array of tiles (e.g., FIG. 11J). In some embodiments, the display device activates the array of sensors for determining the location of the pupil of the eye of the user between activating the subset of the two-dimensional array of tiles.

In some embodiments, the display device concurrently activates (1206) at least a subset of the one or more sensors for determining the location of the pupil of the eye of the user (e.g., FIG. 11E). In some embodiments, the display device concurrently activates (1206) at least a subset of the array of sensors for determining the location of the pupil of the eye of the user. In some embodiments, the display device concurrently activates a subset of the array of emitters for determining the location of the pupil of the eye of the user. For example, the display device concurrently activates all of the emitters and detects reflected light with the one or more sensors (e.g., the array of sensors) for determining the location of the pupil of the eye.

In some embodiments, the display device activates (1208) at least a subset of the one or more sensors (e.g., the array of sensors) sequentially for determining the location of the pupil of the eye of the user (e.g., FIG. 11D). In some embodiments, the display device activates a subset of the array of emitters sequentially for determining the location of the pupil of the eye of the user. For example, the display device sequentially activates the array of emitters (in conjunction with sequentially activating the array of sensors) in a raster pattern.

In some embodiments, the display device activates a first subset of the array of emitters concurrently for determining the location of the pupil of the eye of the user and subsequently activates a second subset of the array of emitters sequentially for determining the location of the pupil of the eye of the user. For example, the display device activates the first subset of the array of emitters concurrently for determining the location of the pupil of the eye of the user with a first accuracy and the display device activates the second subset of the array of emitters sequentially for determining the location of the pupil of the eye of the user with a second accuracy that is distinct from the first accuracy. Alternatively, in some embodiments, the display device activates a first subset of the array of emitters sequentially for determining the location of the pupil of the eye of the user and subsequently activates a second subset of the array of emitters concurrently for determining the location of the pupil of the eye of the user.

The display device selects (1210) a subset of the two-dimensional array of tiles based on the location of the pupil of the eye of the user and activates the subset of the two-dimensional array of tiles for outputting, from at least the subset of the two-dimensional array of tiles, a collective pattern of light that is directed to the pupil of the eye of the user. For example, tiles that are located far from the location of the pupil of the eye are not selected (and as a result, the tiles that are located far from the location of the pupil of the eye are not activated).

Figure 13A:
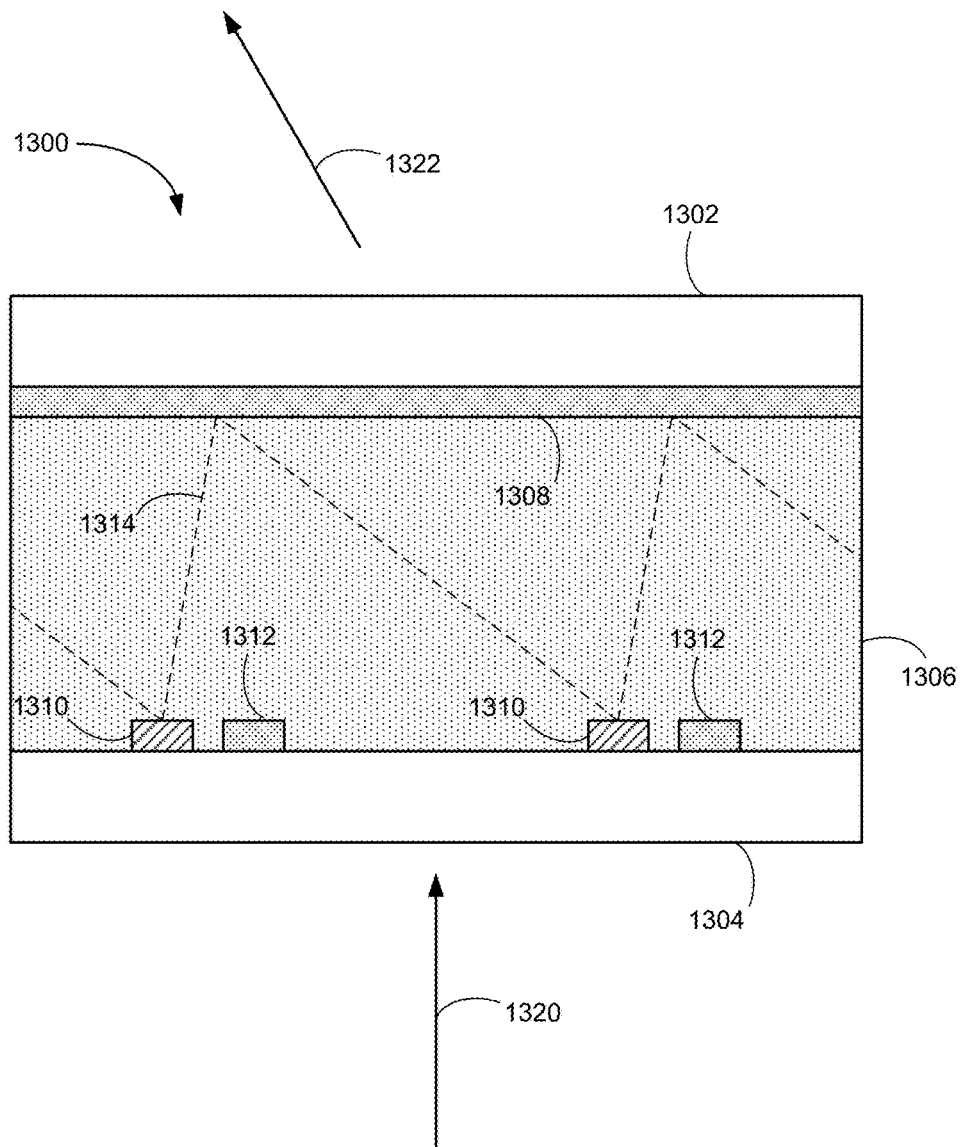
FIGS. 13A and 13B are partial cross-sectional views of an electro-optic element in accordance with some embodiments.
Figure 13B:
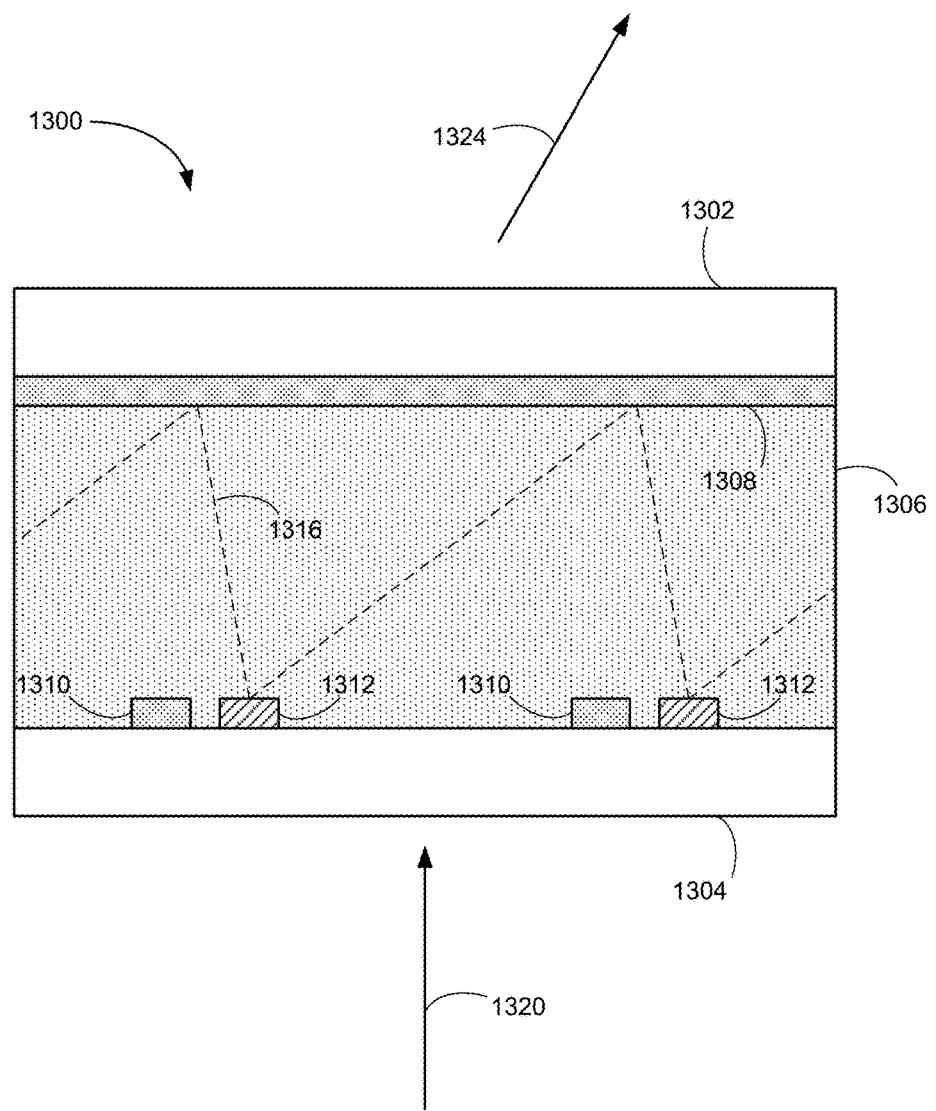

FIGS. 13A and 13B are partial cross-sectional views of an electro-optic element in accordance with some embodiments.

The electro-optic element includes transparent layers 1302 and 1304 (e.g., glass substrates) and liquid crystal layer 1306 between transparent layers 1302 and 1304. The electro-optic element also includes electrode 1308 (e.g., a planar electrode) on transparent layer 1302 and electrodes 1310 and 1312 (e.g., patterned electrodes) on transparent layer 1304. Although two electrodes 1310 and two electrodes 1312 are shown in FIGS. 13A and 13B, an electro-optic element may include three or more electrodes 1310 and three or more electrodes 1312 (e.g., 25 electrodes). In some embodiments, electrodes 1310 and 1312 are masked to reduce direct interaction between light and electrodes 1310 and 1312.

FIG. 13A illustrates that a first voltage (e.g., 5V) is applied to electrodes 1310 and a ground voltage (e.g., 0V) is applied to electrodes 1312 and 1308, which causes liquid crystals to align based on the distribution of the electrical potential generated by the voltages applied to electrodes 1308, 1310, and 1312.

Line 1314 represents a shape of an equivalent liquid crystal prism formed by the application of the voltages to electrodes 1308, 1310, and 1312. However, line 1314 does not necessarily represent a visible feature in the electro-optic element.

When a ray of light enters the electro-optic element from first direction 1320, due to the alignment of the liquid crystals, the direction of light changes to second direction 1322 that is distinct from first direction 1320 (e.g., when the ray of light enters the electro-optic element perpendicularly to substrate 1304, the ray of light exits from the electro-optic element at a slanted angle toward left).

FIG. 13B illustrates that the first voltage (e.g., 5V) is applied to electrodes 1312, and a ground voltage (e.g., 0V) is applied to electrodes 1310 and 1308, which causes liquid crystals to realign based on the changed distribution of the electrical potential generated by the voltages applied to electrodes 1308, 1310, and 1312.

Line 1316 represents a shape of an equivalent liquid crystal prism formed by the application of the changed voltages to electrodes 1308, 1310, and 1312. The orientation of the equivalent liquid crystal prism shown in FIG. 13B is opposite to the orientation of the equivalent liquid crystal prism shown in FIG. 13A. Thus, in FIG. 13B, when a ray of light enters the electro-optic element from first direction 1320, due to the changed alignment of the liquid crystals, the direction of light changes to third direction 1324 that is distinct from first direction 1320 and second direction 1322 (e.g., when the ray of light enters the electro-optic element perpendicularly to substrate 1304, the ray of light exits from the electro-optic element at a slanted angle toward right).

Thus, by changing the voltages applied to electrodes 1308, 1310, and 1312, the direction of light exiting from the electro-optic element can be adjusted (e.g., toward left or right). When no voltages are applied to electrodes 1308, 1310, and 1312, light exits from the electro-optic element without changing its direction.

In addition, by changing the amplitude of the voltages applied to electrodes 1308, 1310, and 1312, the extent of changes to the direction of light can be selected. For example, when a third voltage (e.g., 2.5V) that is lower than the first voltage (e.g., 5V) is applied to electrodes 1310, and aground voltage (e.g., 0V) is applied to electrodes 1312 and 1308, light exits from the electro-optic element at an angle (from a surface normal of substrate 1302) that is smaller than the angle of light (from the surface normal of substrate 1302)

exiting from the electro-optic element when the first voltage (e.g., 5V) is applied to electrodes 1310 and a ground voltage (e.g., 0V) is applied to electrodes 1312 and 1308.

Although FIGS. 13A-13B illustrate steering a beam (or a ray) of light on a same plane (e.g., from left to right), in some embodiments, the electro-optic element is configured to steer the beam (or the ray) of light in two dimensions (e.g., left, right, up, down, or a diagonal direction).

Figure 13C:
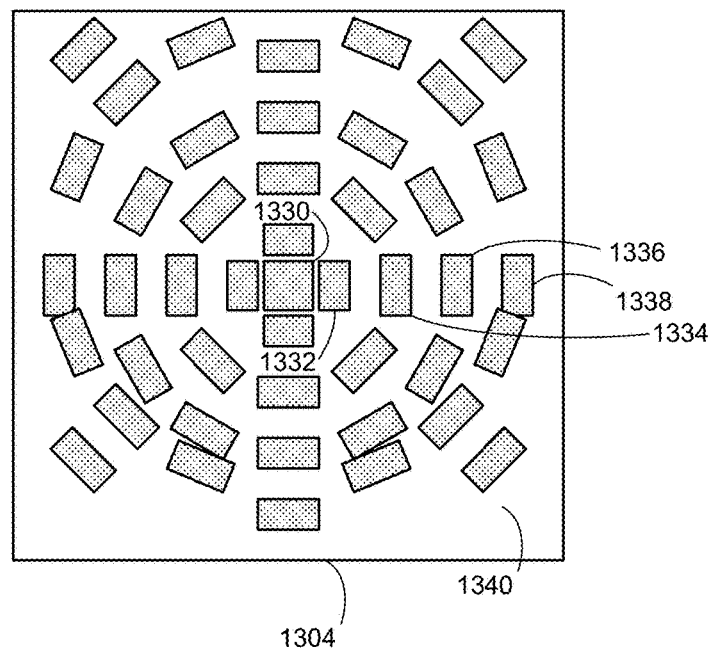
FIGS. 13C and 13D are plan views of an electro-optic element in accordance with some embodiments.

FIG. 13C is a plan view of an electro-optic element in accordance with some embodiments.

In FIG. 13C, the electro-optic element includes a plurality of electrodes 1330 that are axisymmetrically arranged. For example, electrode 1330 is located in a center of the electro-optic element, surrounded by a first group of electrodes 1332, which are, in turn, surrounded by a second group of electrodes 1334, a third group of electrodes 1336, a fourth group of electrodes 1338, and a fifth group of electrodes 1340. By applying different voltages to different groups of electrodes, the liquid crystals are arranged in such a way that the liquid crystals collectively operate as a lens. By changing the amplitude of voltages applied to different groups of electrodes, the liquid crystals operate as a lens of a different power (e.g., a focal length of an equivalent lens changes based on the amplitude of voltages applied to different groups of electrodes).

Figure 13D:
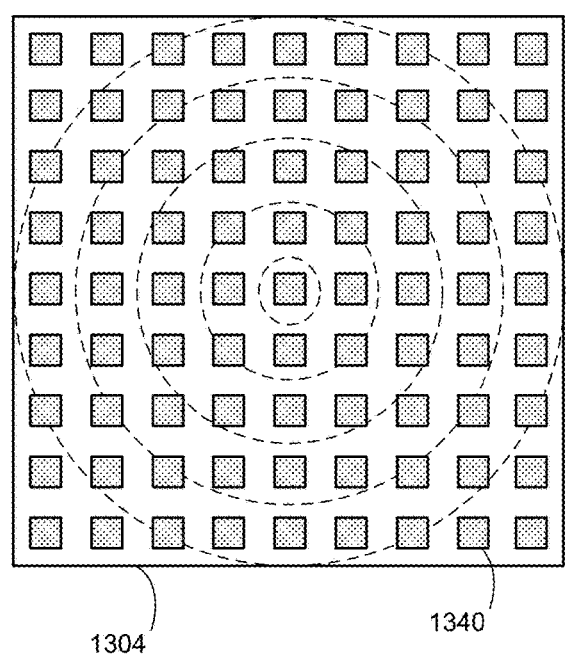

FIG. 13D is a plan view of an electro-optic element in accordance with some embodiments.

In FIG. 13D, the electro-optic lens includes a rectangular array of electrodes 1340. By selectively applying various voltages to respective electrodes 1340, the liquid crystals can be arranged in such a way that the liquid crystals collectively operate as a lens.

Figure 13E:
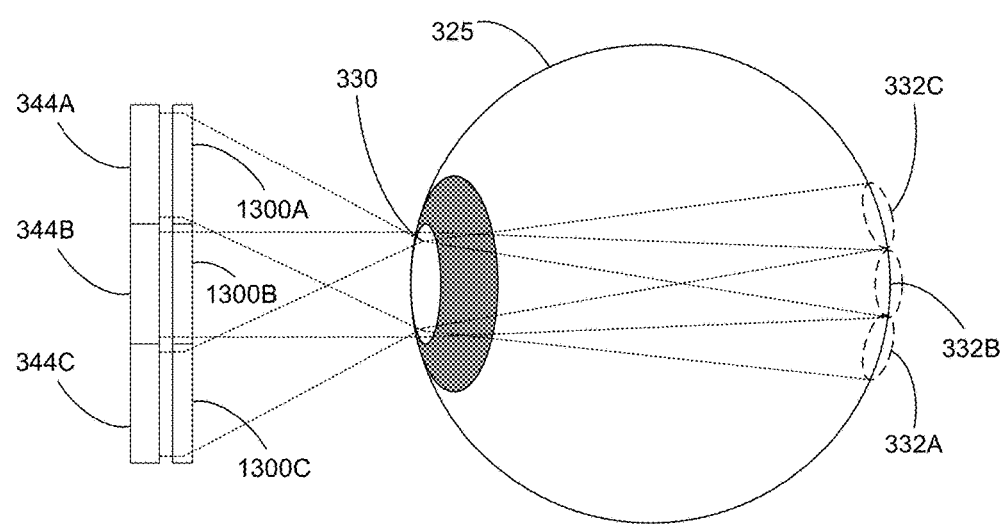
FIG. 13E is a schematic diagram illustrating an exemplary operation of tiles in accordance with some embodiments.

FIG. 13E is a schematic diagram illustrating an exemplary operation of tiles in accordance with some embodiments. FIG. 13E is similar to FIG. 3E except that electro-optic elements 1300A, 1300B, and 1300C are used in place of lenses 342A, 342B, and 342C shown in FIG. 3E.

As shown above, the electro-optic element can be used for directing (or steering) light as well as focusing (or defocusing) the light. The electro-optic element is used in place of a lens (e.g., lens 342 in FIG. 3C) or a lens assembly (e.g., lens assembly 604 in FIG. 6A) in a tile. Alternatively, the electro-optic element is used in conjunction with the lens or the lens assembly in a tile.

In some embodiments, the display device includes one or more prisms (e.g., a prism made of a cycloidal diffractive waveplate, a polarization grating, or a liquid crystal prism). In some embodiments, the one or more prisms are electro-optic elements, which allow electrically-controlled beam steering (e.g., discrete or continuous beam steering), beam shaping, and polarization conversion. When light is directed through the prism, the light is dispersed. In some embodiments, to correct for the dispersion, color separated images are projected by the display device so that corresponding pixels in the color separated images overlap when forming an image on the retina of the eye of the user. Thus, projecting the color separated images compensates for, or reduces the effect of, the dispersion by the prism. Accordingly, the user will see an overlap of the color separated images as a unified image.

Figure 14:
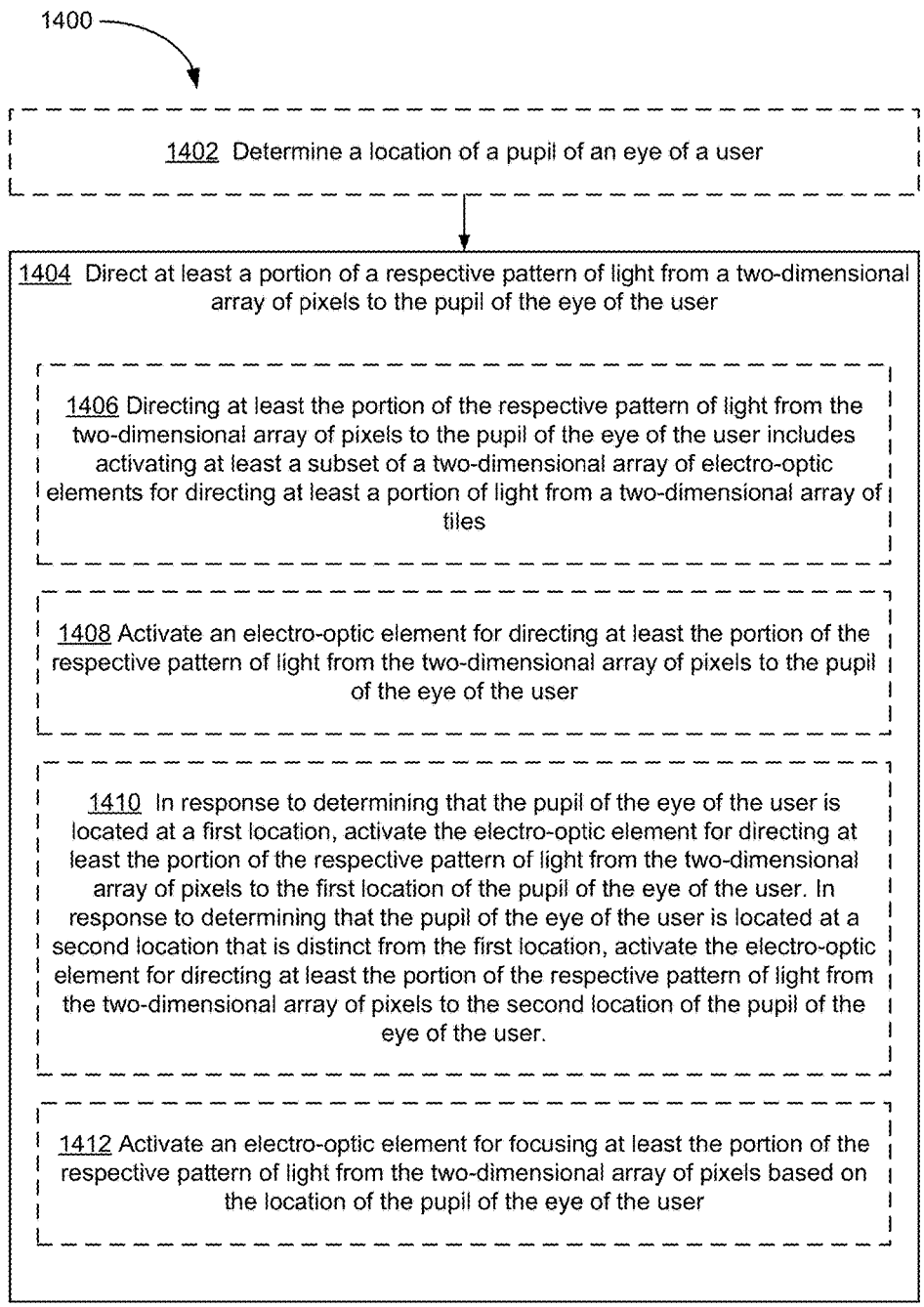
FIG. 14 is a flow diagram illustrating a method of directing light from a two-dimensional array of pixels with an electro-optic element in accordance with some embodiments.

FIG. 14 is a flow diagram illustrating method 1400 of activating a two-dimensional array of tiles based on a location of a pupil of an eye in accordance with some embodiments. Method 1400 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344).

Each pixel is configured to output light so that the two-dimensional array of pixels outputs a respective pattern of light (e.g., FIG. 3G). Each tile also includes an electro-optic element (e.g., electro-optic element 1300 in FIG. 13E), of a two-dimensional array of electro-optic elements, configured to direct at least a portion of the respective pattern of light from the two-dimensional array of pixels to a pupil of an eye of a user (e.g., FIG. 13E).

In some embodiments, the display device determines (1402) a location of a pupil of an eye of the user. For example, the display device sends non-visible light (e.g., infrared light) toward the eye of the user, and collects non-visible light that is reflected by the eye of the user. Based on an intensity profile of the light reflected by the eye of the user, the display device determines the location of the pupil of the eye of the user (e.g., a location with the highest intensity of the reflected light corresponds to the location of the pupil of the eye of the user).

The display device directs (1404) at least the portion of the respective pattern of light from the two-dimensional array of pixels to the pupil of the eye of the user (e.g., FIG. 13E).

In some embodiments, directing at least the portion of the respective pattern of light from the two-dimensional array of pixels to the pupil of the eye of the user includes (1406) activating at least a subset of the two-dimensional array of electro-optic elements for directing at least a portion of light from the two-dimensional array of tiles (e.g., in FIG. 13E, electro-optic elements 1300A and 1300B are activated for directing light from array 344A of pixels and array 344C of pixels).

In some embodiments, the display device activates (1408) the electro-optic element for directing at least the portion of the respective pattern of light from the two-dimensional array of pixels to the pupil of the eye of the user (e.g., voltages are applied to electrodes of the electro-optic element for steering the light from the two-dimensional array of tiles as shown in FIG. 13A).

In some embodiments, the display device, in response to determining that the pupil of the eye of the user is located at a first location, activates (1410) the electro-optic element for directing at least the portion of the respective pattern of light from the two-dimensional array of pixels to the first location of the pupil of the eye of the user (e.g., FIG. 13A); and, in response to determining that the pupil of the eye of the user is located at a second location that is distinct from the first location, activates the electro-optic element for directing at least the portion of the respective pattern of light from the two-dimensional array of pixels to the second location of the pupil of the eye of the user (e.g., FIG. 13B).

In some embodiments, the display device, in response to determining that the pupil of the eye of the user has moved from the first location to the second location, activates the electro-optic element for changing the direction of at least the portion of the respective pattern of light from the two-dimensional array of pixels so that at least the portion of the respective pattern of light from the two-dimensional array of pixels moves from the first location to the second location. Thus, the display device displays an image that is adjusted based on a lateral movement and/or a rotation of the eye.

In some embodiments, the display device activates (1412) the electro-optic element for focusing at least the portion of the respective pattern of light from the two-dimensional array of pixels based on the location of the pupil of the eye of the user.

Figure 15A:
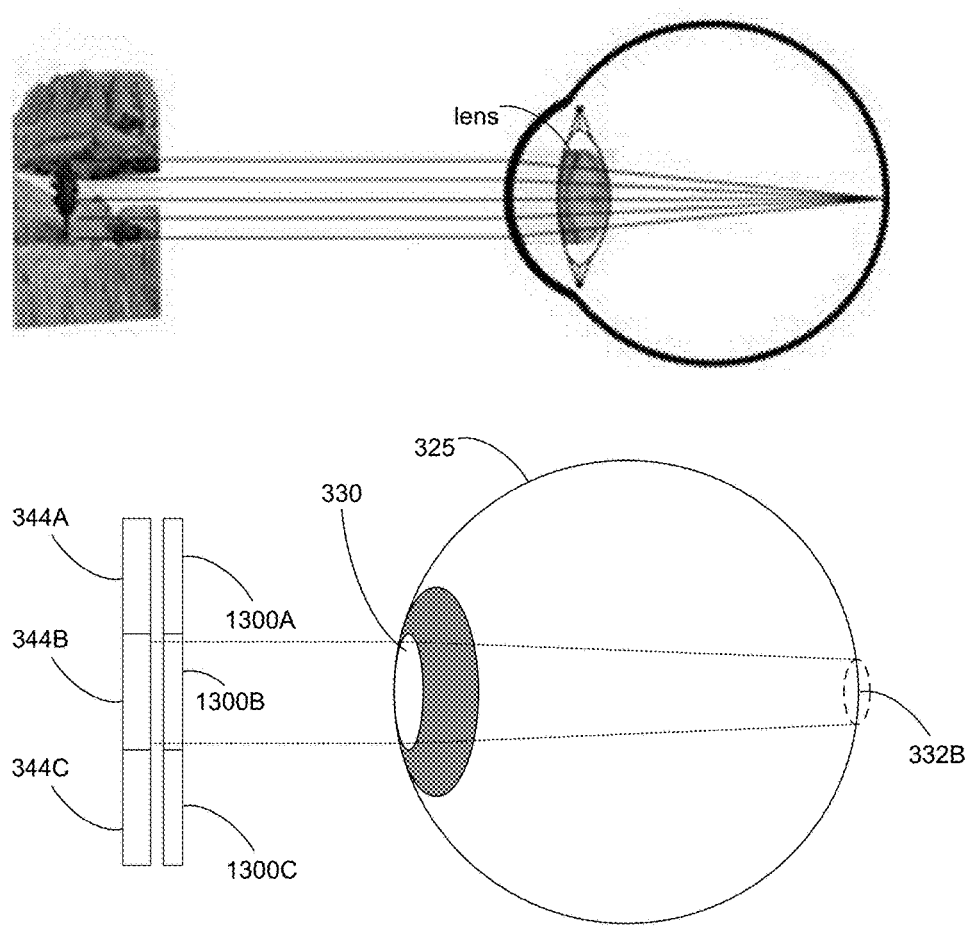
FIGS. 15A and 15B are schematic diagrams illustrating an exemplary operation of a tile in accordance with some embodiments.
Figure 15B:
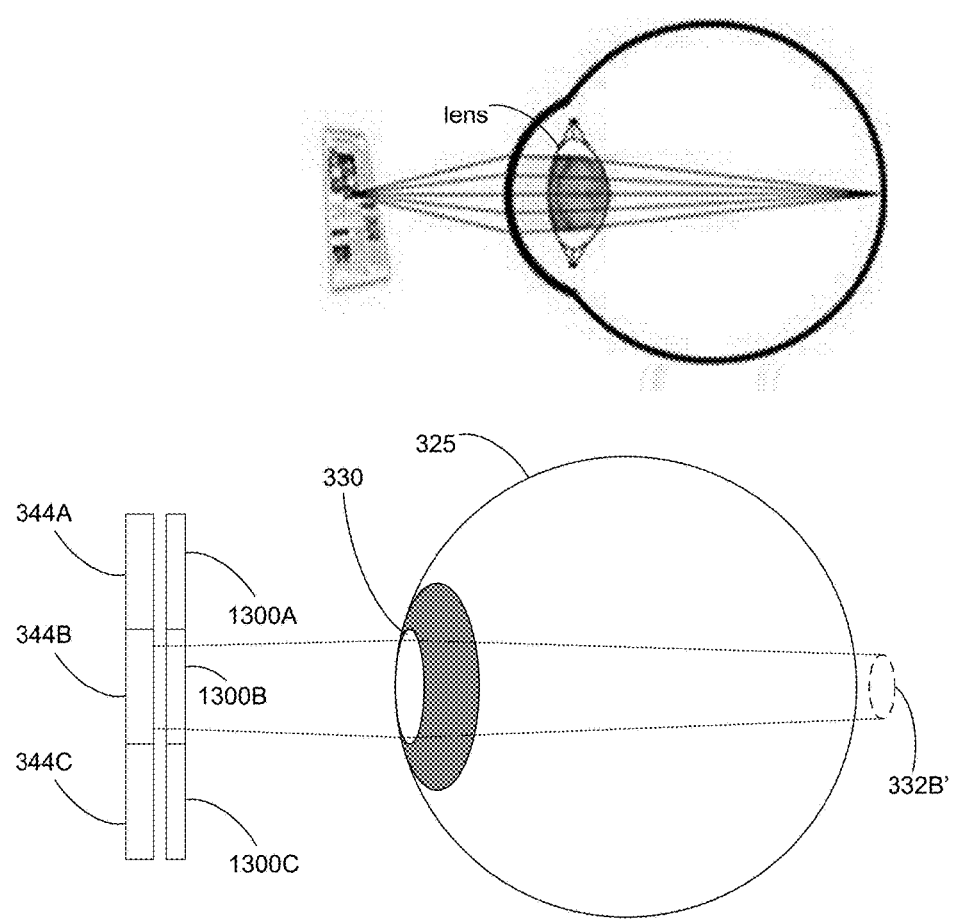

FIGS. 15A and 15B are schematic diagrams illustrating an exemplary operation of a tile in accordance with some embodiments.

A lower portion of FIG. 15A is similar to FIG. 13E except that only two-dimensional array 344B of pixels and electro-optic element 1300B are activated (e.g., two-dimensional arrays 344A and 344C and electro-optic elements 1300A and 1300C are not activated to simplify the illustration). A top portion of FIG. 15A illustrates a configuration of a lens inside an eye when the eye is viewing a far object (e.g., a tree that is located far from the eye). The lens is relaxed to focus light from the far object on the retina of the eye.

A top portion of FIG. 15B illustrates a configuration of the lens inside the eye when the eye is viewing an adjacent object (e.g., a newsletter or a magazine that the eye is reading). The lens changes its curvature to focus light from the adjacent object on the retina of the eye.

A lower portion of FIG. 15B illustrates that electro-optic element 1300B is adjusted so that light from two-dimensional array 344B of pixels is projected out of focus on the retina of the eye when the lens of eye 325 is relaxed (e.g., the focal length of electro-optic element 1300B is increased so that the light from two-dimensional array 344B of pixels is focused on plane 332B' that is behind the retina when the lens of eye 325 is relaxed). This allows the lens inside eye 325 to change its curvature so that the light from two-dimensional array 344B of pixels is focused on the retina of eye 325. Because a brain is trained to relax the lens inside the eye for viewing far objects and tighten the lens inside the eye for viewing adjacent objects, this provides natural and comfortable user experience.

Figure 15C:
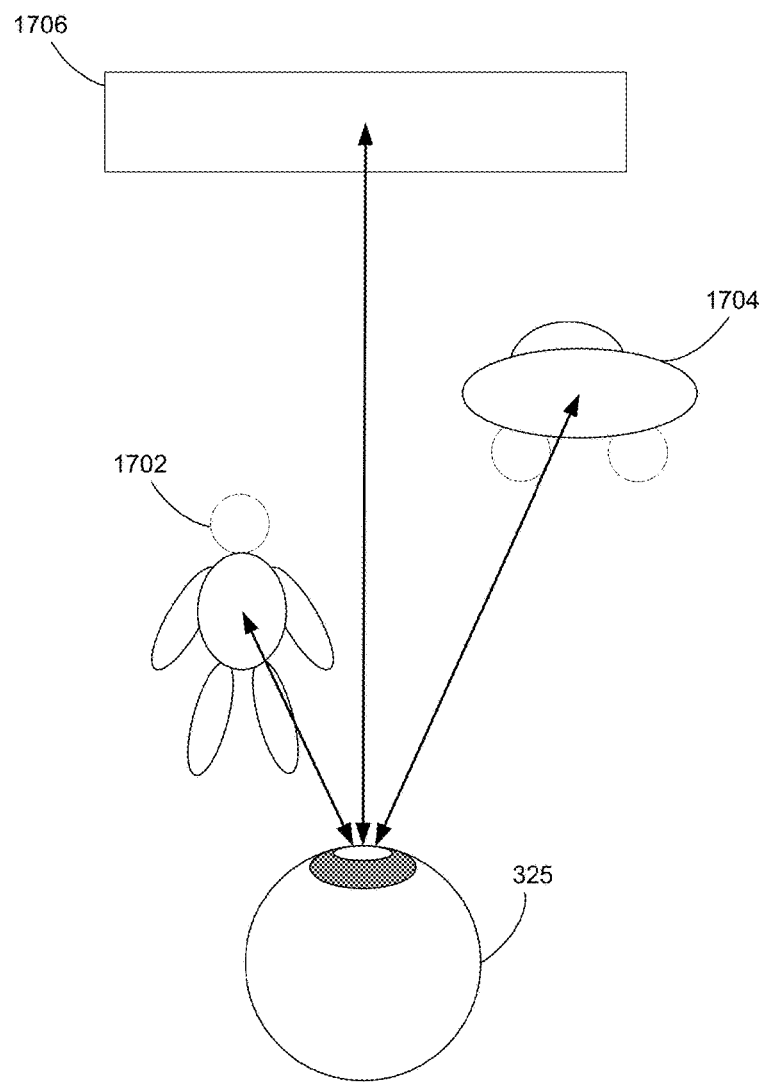
FIG. 15C is a schematic diagram illustrating a distance model in accordance with some embodiments.

FIG. 15C is a schematic diagram illustrating a distance model in accordance with some embodiments. Three-dimensional settings data (e.g., a data representation of a three-dimensional environment, such as a virtual reality environment or an augmented reality environment) includes information identifying shapes and locations of objects (and optionally their shading and/or texture information). From the information identifying the locations of the objects, the distance from the user to the object in the three-dimensional environment can be determined. For example, as shown in FIG. 15C, particular three-dimensional settings data includes information representing person 1702, automobile 1704, and building 1706 at respective locations. Based on a view point (e.g., a location of eye 325 in the three-dimensional environment), distances from eye 325 to person 1702, automobile 1704, and building 1706 in the three-dimensional environment are determined.

Figure 16:
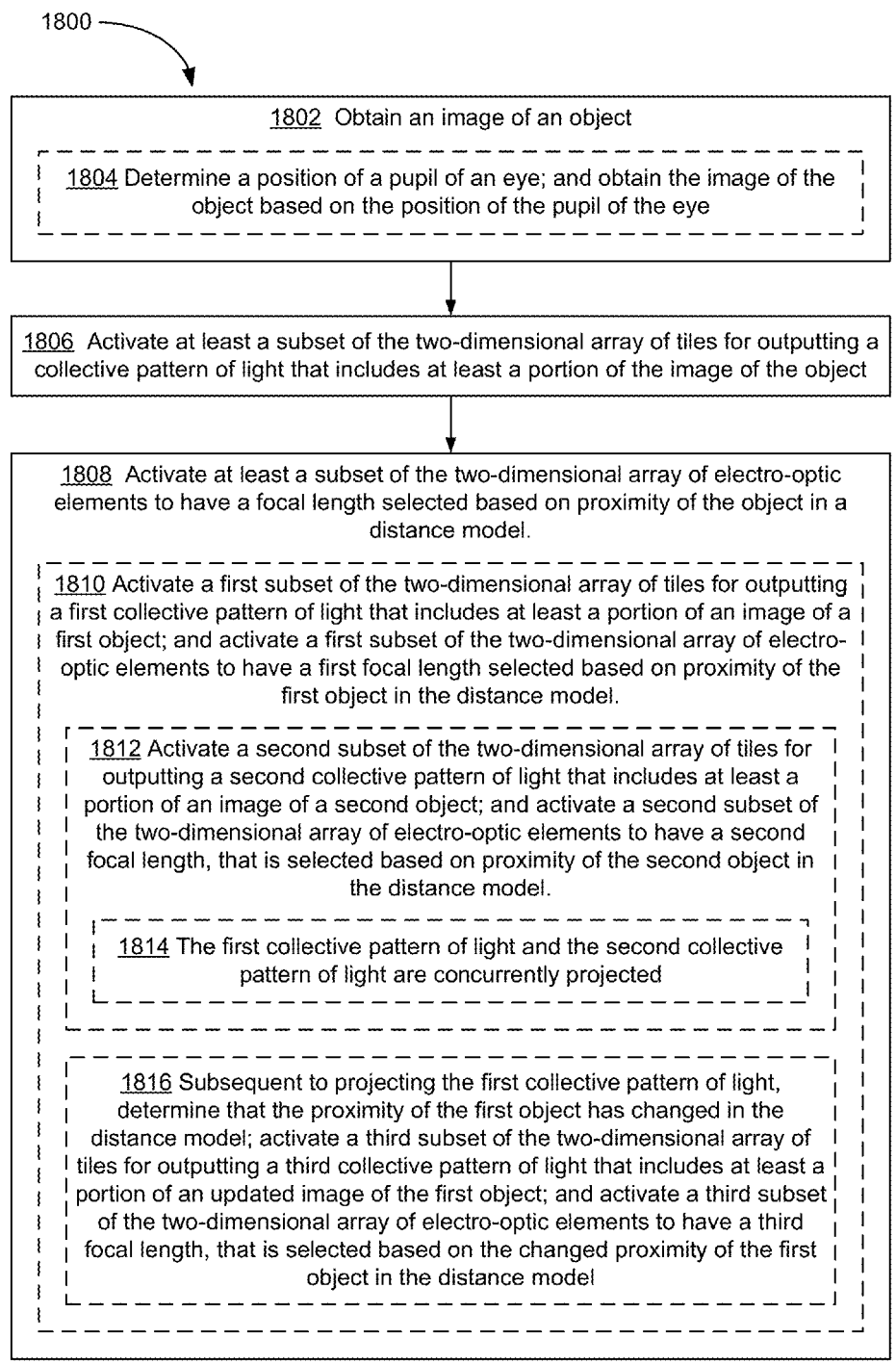
FIG. 16 is a flow diagram illustrating a method of projecting light with a focal length selected based on proximity of an object in a distance model in accordance with some embodiments.

FIG. 16 is a flow diagram illustrating a method of projecting light with a focal length selected based on proximity of an object in a distance model in accordance with some embodiments. Method 1800 is performed at a display device (e.g., display device 100 in FIG. 1) comprising a two-dimensional array of tiles (e.g., FIG. 3B). Each tile includes (e.g., FIG. 3C) a two-dimensional array of pixels (e.g., 344). Each pixel is configured to output light so that the two-dimensional array of pixels outputs a respective pattern of light (e.g., FIG. 3G). Each tile also includes an electro-optic element (e.g., electro-optic element 1300 in FIG. 13E), of a two-dimensional array of electro-optic elements, configured to direct at least a portion of the respective pattern of light from the two-dimensional array of pixels to a pupil of an eye of a user (e.g., FIG. 13E).

The device obtains (1802) an image of an object (e.g., a newspaper). In some embodiments, the device obtains a location of the object in a three-dimensional model (e.g., how far the object is located from the user in the three-dimensional model) with the image of the object.

In some embodiments, the device determines (1804) a position of the pupil of the eye; and obtains the image of the object based on the position of the pupil of the eye. For example, the device performs a scan to determine a position of the pupil of the eye (e.g., a location of the pupil of the eye and/or a viewing angle (or a gaze) of the eye).

In some embodiments, the display device includes one or more sensors (e.g., an array of sensors) for determining the position of the pupil of the eye (e.g., FIG. 11G).

The device activates (1806) at least a subset of the two-dimensional array of tiles for outputting, from at least the subset of the two-dimensional array of tiles, a collective pattern of light that includes at least a portion of the image of the object (e.g., a tile with two-dimensional array 344B of pixels in FIG. 15B is activated to output a respective pattern of light).

The device activates (1808) at least a subset of the two-dimensional array of electro-optic elements for projecting the collective pattern of light (e.g., electro-optic element 1300B in FIG. 15B is activated for projecting light from two-dimensional array 344B of pixels). At least the subset of the two-dimensional array of electro-optic elements is configured to have a focal length, that is selected based on proximity of the object in a distance model (e.g., FIG. 15C), for projecting the collective pattern of light (e.g., when the object is located far from the user in the three-dimensional model, a focal length that focuses a projected image on the retina of the eye when the lens inside the eye is relaxed is selected, and when the objected is located adjacent to the user in the three-dimensional model, a focal length which causes a defocused image to be projected on the retina of the eye when the lens inside the eye is relaxed is selected).

In some embodiments, the device activates at least the subset of the two-dimensional array of electro-optic elements for projecting the collective pattern of light before activating at least the subset of the two-dimensional array of tiles for outputting, from at least the subset of the two-dimensional array of tiles, the collective pattern of light that includes at least the portion of the image of the object. In some embodiments, the device activates at least the subset of the two-dimensional array of electro-optic elements for projecting the collective pattern of light after activating at least the subset of the two-dimensional array of tiles for outputting, from at least the subset of the two-dimensional array of tiles, the collective pattern of light that includes at least the portion of the image of the object. In some embodiments, the device activates at least the subset of the two-dimensional array of electro-optic elements for projecting the collective pattern of light, concurrently with activating at least the subset of the two-dimensional array of tiles for outputting, from at least the subset of the two-dimensional array of tiles, the collective pattern of light that includes at least the portion of the image of the object.

In some embodiments, the device activates (1810) a first subset of the two-dimensional array of tiles for outputting, from at least the first subset of the two-dimensional array of tiles, a first collective pattern of light that includes at least a portion of an image of a first object (e.g., a pattern of light that includes an image of an adjacent object); and activates a first subset of the two-dimensional array of electro-optic elements for projecting the first collective pattern of light. The first subset of the two-dimensional array of electro-optic elements is configured to have a first focal length, that is selected based on proximity of the first object in the distance model, for projecting the first collective pattern of light (e.g., the device selects a focal length, which causes a defocused image of the adjacent object to be projected on the retina of the eye when the lens inside the eye is relaxed).

In some embodiments, the device activates (1812) a second subset of the two-dimensional array of tiles for outputting, from at least the second subset of the two-dimensional array of tiles, a second collective pattern of light that includes at least a portion of an image of a second object (e.g., a pattern of light that includes an image of a far object); and activates a second subset of the two-dimensional array of electro-optic elements for projecting the second collective pattern of light. The second subset of the two-dimensional array of electro-optic elements is configured to have a second focal length, that is selected based on proximity of the second object in the distance model, for projecting the second collective pattern of light, and the second focal length is distinct from the first focal length (e.g., the device selects a focal length, which causes a focused image of the far object to be projected on the retina of the eye when the lens inside the eye is relaxed).

In some embodiments, the first collective pattern of light and the second collective pattern of light are (1814) concurrently projected. For example, an image includes both a far object and an adjacent object. Some of the tiles are used to project a focused image of the far object and a defocused image of the adjacent object at the same time when the eye is relaxed (e.g., the focused image of the far object is projected onto a first region of the retina and the defocused image of the adjacent object is projected onto a second region of the retina that is distinct from the first region of the retina). When the lens inside the eye is relaxed, the image of the far object projected on the first region of the retina remains focused and the image of the adjacent object projected on the second region of the retina remains defocused. When the lens inside the eye is tightened (e.g., by straining ciliary muscles connected to the lens inside the eye), the image of the far object projected on the first region of the retina becomes defocused and the image of the adjacent object projected on the second region of the retina becomes focused.

In some embodiments, the device, subsequent to projecting the first collective pattern of light while the first subset of the two-dimensional array of electro-optic elements is configured to have the first focal length, determines (1816) that the proximity of the first object has changed in the distance model (e.g., based on image processing, and/or proximity information for the object in the distance model, such as the three-dimensional model, received with the image of the object); activates a third subset of the two-dimensional array of tiles for outputting, from at least the third subset of the two-dimensional array of tiles, a third collective pattern of light that includes at least a portion of an updated image of the first object (e.g., a different number of tiles and/or pixels is used to output the updated image, such as a zoomed-in or zoomed-out image, of the first object); and activates a third subset of the two-dimensional array of electro-optic elements for projecting the third collective pattern of light. The third subset of the two-dimensional array of electro-optic elements is configured to have a third focal length, that is selected based on the changed proximity of the first object in the distance model, for projecting the third collective pattern of light (e.g., a focus of the updated image is changed based on the changed distance between the first object and the user).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
a two-dimensional array of tiles, each tile comprising:
a two-dimensional array of pixels, wherein each pixel is configured to output light so that the two-dimensional array of pixels outputs a respective pattern of light; and
an electro-optic element, of a two-dimensional array of electro-optic elements, configured to direct at least a portion of the respective pattern of light from the two-dimensional array of pixels to a pupil of an eye of a user, wherein each electro-optic element of the two-dimensional array of electro-optic elements is individually controllable to have a respective focal length; and
one or more processors coupled with the two-dimensional array of tiles and configured to:
obtain an image of a first object;
activate a first subset of the two-dimensional array of tiles for outputting, from the first subset of the two-dimensional array of tiles, a first collective pattern of light that includes at least a portion of the image of the first object, the first subset of the two-dimensional array of tiles including two or more contiguous tiles, a first tile of the two or more contiguous tiles outputting a first portion of the image and a second tile, adjacent to the first tile, of the two or more contiguous tiles outputting a second portion of the image that does not overlap with the first portion of the image;
activate, concurrently with activation of the first subset of the two-dimensional array of tiles for outputting the first collective pattern of light from the first subset of the two-dimensional array of tiles, a second subset of the two-dimensional array of tiles for outputting, from at least the second subset of the two-dimensional array of tiles, a second collective pattern of light that includes at least a portion of an image of a second object so that the first collective pattern of light and the second collective pattern of light are concurrently projected;
activate a first subset of the two-dimensional array of electro-optic elements for projecting the first collective pattern of light, wherein the first subset of the two-dimensional array of electro-optic elements is configured to have a first focal length, that is selected based on proximity of the first object in a distance model, for projecting the first collective pattern of light; and activate, concurrently with activation of the first subset of the two-dimensional array of electro-optic elements for projecting the first collective pattern of light so that the first subset of the two-dimensional array of electro-optic elements is configured to have the first focal length, a second subset of the two-dimensional array of electro-optic elements for projecting the second collective pattern of light, wherein the second subset of the two-dimensional array of electro-optic elements is configured to have a second focal length, that is selected based on proximity of the second object in the distance model, for projecting the second collective pattern of light, and the second focal length is distinct from the first focal length, wherein for any pixel of the activated subset of the two-dimensional array of tiles that outputs light, at least a portion of the light from the pixel is directed to the pupil of the eye of the user.

2. The display device of claim 1, wherein the one or more processors are configured to:

subsequent to projecting the first collective pattern of light while the first subset of the two-dimensional array of electro-optic elements is configured to have the first focal length:
determine that the proximity of the first object has changed in the distance model;
activate a third subset of the two-dimensional array of tiles for outputting, from at least the third subset of the two-dimensional array of tiles, a third collective pattern of light that includes at least a portion of an updated image of the first object; and
activate a third subset of the two-dimensional array of electro-optic elements for projecting the third collective pattern of light, wherein the third subset of the two-dimensional array of electro-optic elements is configured to have a third focal length, that is selected based on the changed proximity of the first object in the distance model, for projecting the third collective pattern of light.

3. The display device of claim 1, wherein the one or more processors are configured to:
determine a position of the pupil of the eye; and
obtain the image of the first object based on the position of the pupil of the eye.

4. The display device of claim 3, including:
an array of sensors for determining the position of the pupil of the eye.

5. The display device of claim 1, wherein:
the electro-optic element has a first focal length while the first set of voltages is applied to the one or more electrodes on the first substrate and the plurality of electrodes on the second substrate;
the one or more electrodes are configured to receive one or more voltages of a second set of voltages that is distinct from the first set of voltages; and
the first subset of electrodes are configured to receive a first voltage of the second set of voltages and the second subset of electrodes configured to receive a second voltage, of the second set of voltages, that is distinct from the first voltage of the second set of voltages so that the electro-optic element has a second focal length that is distinct from the first focal length while the second set of voltages is applied to the one or more electrodes on the first substrate and the plurality of electrodes on the second substrate.

6. The display device of claim 1, wherein the display device is not a light field display device.

7. A method performed with a display device including a two-dimensional array of tiles and one or more processors coupled with the two-dimensional array of tiles, each tile including a two-dimensional array of pixels and an electro-optic element, of a two-dimensional array of electro-optic elements, the method comprising:
obtaining an image of a first object;
activating a first subset of the two-dimensional array of tiles for outputting, from the first subset of the two-dimensional array of tiles, a first collective pattern of light that includes at least a portion of the image of the first object, the first subset of the two-dimensional array of tiles including two or more contiguous tiles, a first tile of the two or more contiguous tiles outputting a first portion of the image and a second tile, adjacent to the first tile, of the two or more contiguous tiles outputting a second portion of the image that does not overlap with the first portion of the image, wherein each pixel of the two-dimensional array of pixels is configured to output light so that the two-dimensional array of pixels outputs a respective pattern of light and the electro-optic element of the two-dimensional array of electro-optic elements is configured to direct at least a portion of the respective pattern of light from the two-dimensional array of pixels to a pupil of an eye of a user, and each electro-optic element of the two-dimensional array of electro-optic elements is individually controllable to have a respective focal length;
activating, concurrently with activation of the first subset of the two-dimensional array of tiles for outputting the first collective pattern of light from the first subset of the two-dimensional array of tiles, a second subset of the two-dimensional array of tiles for outputting, from at least the second subset of the two-dimensional array of tiles, a second collective pattern of light that includes at least a portion of an image of a second object so that the first collective pattern of light and the second collective pattern of light are concurrently projected;
activating at least a first subset of the two-dimensional array of electro-optic elements for projecting the first collective pattern of light, wherein the first subset of the two-dimensional array of electro-optic elements is configured to have a first focal length, that is selected based on proximity of the first object in a distance model, for projecting the first collective pattern of light; and,
activating, concurrently with activation of the first subset of the two-dimensional array of electro-optic elements for projecting the first collective pattern of light so that the first subset of the two-dimensional array of electro-optic elements is configured to have the first focal length, a second subset of the two-dimensional array of electro-optic elements for projecting the second collective pattern of light, wherein the second subset of the two-dimensional array of electro-optic elements is configured to have a second focal length, that is selected based on proximity of the second object in the distance model, for projecting the second collective pattern of light, and the second focal length is distinct from the first focal length, wherein for any pixel of the activated subset of the two-dimensional array of tiles that outputs light, at least a portion of the light from the pixel is directed to the pupil of the eye of the user.

8. The method of claim 7, including:
subsequent to projecting the first collective pattern of light while the first subset of the two-dimensional array of electro-optic elements is configured to have the first focal length:
determining that the proximity of the first object has changed in the distance model;
activating a third subset of the two-dimensional array of tiles for outputting, from at least the third subset of the two-dimensional array of tiles, a third collective pattern of light that includes at least a portion of an updated image of the first object; and
activating a third subset of the two-dimensional array of electro-optic elements for projecting the third collective pattern of light, wherein the third subset of the two-dimensional array of electro-optic elements is configured to have a third focal length, that is selected based on the changed proximity of the first object in the distance model, for projecting the third collective pattern of light.

9. The method of claim 7, including:
determining a position of the pupil of the eye; and
obtaining the image of the first object based on the position of the pupil of the eye.

10. The method of claim 9, wherein the display device includes an array of sensors for determining the position of the pupil of the eye.

11. The method of claim 7, wherein:
the electro-optic element has a first focal length while the first set of voltages is applied to the one or more electrodes on the first substrate and the plurality of electrodes on the second substrate;
the one or more electrodes are configured to receive one or more voltages of a second set of voltages that is distinct from the first set of voltages; and
the first subset of electrodes are configured to receive a first voltage of the second set of voltages and the second subset of electrodes configured to receive a second voltage, of the second set of voltages, that is distinct from the first voltage of the second set of voltages so that the electro-optic element has a second focal length that is distinct from the first focal length while the second set of voltages is applied to the one or more electrodes on the first substrate and the plurality of electrodes on the second substrate.

12. A display device, comprising:
a two-dimensional array of tiles, each tile comprising:
a two-dimensional array of pixels, wherein each pixel is configured to output light so that the two-dimensional array of pixels outputs a respective pattern of light; and
an electro-optic element, of a two-dimensional array of electro-optic elements, configured to direct at least a portion of the respective pattern of light from the two-dimensional array of pixels to a pupil of an eye of a user, wherein each electro-optic element of the two-dimensional array of electro-optic element is individually controllable to have a respective focal length,
wherein the display device is configured to:
obtain an image of an object;
activate a first subset of the two-dimensional array of tiles for outputting, from the subset of the two-dimensional array of tiles, a first collective pattern of light that includes at least a portion of the image of the object, the first subset of the two-dimensional array of tiles including two or more contiguous tiles,
a first tile of the two or more contiguous tiles outputting a first portion of the image and a second tile, adjacent to the first tile, of the two or more contiguous tiles outputting a second portion of the image that does not overlap with the first portion of the image;
activate, concurrently with activation of the first subset of the two-dimensional array of tiles for outputting the first collective pattern of light from the first subset of the two-dimensional array of tiles, a second subset of the two-dimensional array of tiles for outputting, from at least the second subset of the two-dimensional array of tiles, a second collective pattern of light that includes at least a portion of an image of a second object so that the first collective pattern of light and the second collective pattern of light are concurrently projected;
activate a subset of the two-dimensional array of electro-optic elements for projecting the collective pattern of light, wherein the subset of the two-dimensional array of electro-optic elements is configured to have a focal length, that is selected based on proximity of the object in a distance model, for projecting the collective pattern of light; and,
activate, concurrently with activation of the first subset of the two-dimensional array of electro-optic elements for projecting the first collective pattern of light so that the first subset of the two-dimensional array of electro-optic elements is configured to have the first focal length, a second subset of the two-dimensional array of electro-optic elements for projecting the second collective pattern of light, wherein the second subset of the two-dimensional array of electro-optic elements is configured to have a second focal length, that is selected based on proximity of the second object in the distance model, for projecting the second collective pattern of light, and the second focal length is distinct from the first focal length, wherein
for any pixel of the activated subset of the two-dimensional array of tiles that outputs light, at least a portion of the light from the pixel is directed to the pupil of the eye of the user.

13. The display device of claim 12, wherein the display device is configured to:
subsequent to projecting the first collective pattern of light while the first subset of the two-dimensional array of electro-optic elements is configured to have the first focal length:
determine that the proximity of the first object has changed in the distance model;
activate a third subset of the two-dimensional array of tiles for outputting, from at least the third subset of the two-dimensional array of tiles, a third collective pattern of light that includes at least a portion of an updated image of the first object; and
activate a third subset of the two-dimensional array of electro-optic elements for projecting the third collective pattern of light, wherein the third subset of the two-dimensional array of electro-optic elements is configured to have a third focal length, that is selected based on the changed proximity of the first object in the distance model, for projecting the third collective pattern of light.

14. The display device of claim 12, wherein the display device is configured to:

determine a position of the pupil of the eye; and
obtain the image of the first object based on the position of the pupil of the eye.

15. The display device of claim 12, wherein:

the electro-optic element has a first focal length while the first set of voltages is applied to the one or more electrodes on the first substrate and the plurality of electrodes on the second substrate;

the one or more electrodes are configured to receive one or more voltages of a second set of voltages that is distinct from the first set of voltages; and the first subset of electrodes are configured to receive a first voltage of the second set of voltages and the second subset of electrodes configured to receive a second voltage, of the second set of voltages, that is distinct from the first voltage of the second set of voltages so that the electro-optic element has a second focal length that is distinct from the first focal length while the second set of voltages is applied to the one or more electrodes on the first substrate and the plurality of electrodes on the second substrate.

* * * * *

UNITED STATES PATENT AND TRADEMARK OFFICE
CERTIFICATE OF CORRECTION

PATENT NO.        : 10,451,876 B2
APPLICATION NO.   : 15/065796
DATED             : October 22, 2019
INVENTOR(S)       : Jepsen Page 1 of 1

It is certified that error appears in the above-identified patent and that said Letters Patent is hereby corrected as shown below:

In the Claims

Claim 5, Column 37, Line 50, please delete "while the" and insert --while a--;

Claim 5, Column 37, Line 57, please delete "electrodes are configured" and insert --electrodes is configured--;

Claim 5, Column 37, Line 59, please delete "electrodes configured" and insert --electrodes is configured--;

Claim 11, Column 39, Line 29, please delete "while the" and insert --while a--;

Claim 11, Column 39, Line 36, please delete "electrodes are configured" and insert --electrodes is configured--;

Claim 11, Column 39, Line 38, please delete "electrodes configured" and insert --electrodes is configured--;

Claim 12, Column 39, Line 57, please delete "element is" and insert --elements is--;

Claim 15, Column 41, Line 5, please delete "while the" and insert --while a--;

Claim 15, Column 41, Line 12, please delete "electrodes are configured" and insert --electrodes is configured--;

Claim 15, Column 41, Line 14, please delete "element is" and insert --elements is--.

Signed and Sealed this
Thirty-first Day of December, 2019

Andrei Iancu
*Director of the United States Patent and Trademark Office*